United States Patent [19]

Smith, Jr.

[11] 4,298,950
[45] Nov. 3, 1981

[54] MULTIPOINT PIPELINE PROCESSOR FOR COMPUTING THE DISCRETE FOURIER TRANSFORM

[75] Inventor: Winthrop W. Smith, Jr., Maitland, Fla.

[73] Assignee: Westinghouse Electric Corp., Pittsburgh, Pa.

[21] Appl. No.: 84,221

[22] Filed: Oct. 12, 1979

[51] Int. Cl.³ .......................................... G06F 15/332
[52] U.S. Cl. .................................................. 364/726
[58] Field of Search ................................ 364/726, 827

[56] References Cited

U.S. PATENT DOCUMENTS

| | | | |
|---|---|---|---|
| 3,777,131 | 12/1973 | Llewellyn | 364/726 |
| 4,058,715 | 11/1977 | Nina | 364/726 |
| 4,138,730 | 2/1979 | Ali | 364/726 |
| 4,156,920 | 5/1979 | Winograd | 364/726 |
| 4,164,021 | 8/1979 | Nishitani et al. | 364/726 |

Primary Examiner—Jerry Smith
Attorney, Agent, or Firm—W. E. Zitelli

[57] ABSTRACT

A pipeline processor of a radix-2 configuration including an input, intermediate and output processing sections for performing a discrete Fourier transformation (DFT) of an input array of N signal values to derive an output array of at least N signal values representative of the frequency transformation of the input array is disclosed. The input and output processing sections include first and second pluralities of cascadedly coupled computational elements respectively, which are governed to perform computations in a pipeline fashion and to propagate resulting interelement computed signal values through the input section in a first predetermined signal flow pattern and through the output section in a second predetermined signal flow pattern to render respectively a first intermediate array and the output array of signal values. All of the multiplication processing is concentrated in the intermediate section which multiplies each of the signal values of the first intermediate array with predetermined transformation values respectively associated therewith to generate a second intermediate array of signal values which is input to the output processing section. Accordingly, the signal values of the input, first and second intermediate and output arrays are input, processed and output through top and bottom rails of the three sections of the pipeline processor sequentially in respectively corresponding predetermined orders of coupled pairs.

48 Claims, 19 Drawing Figures

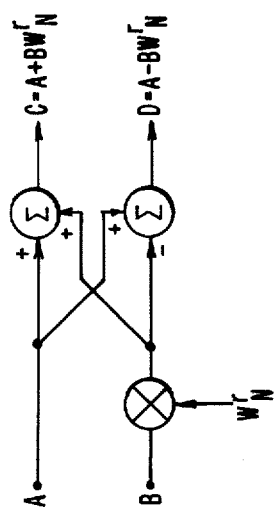
FIG.2 (BACKGROUND)
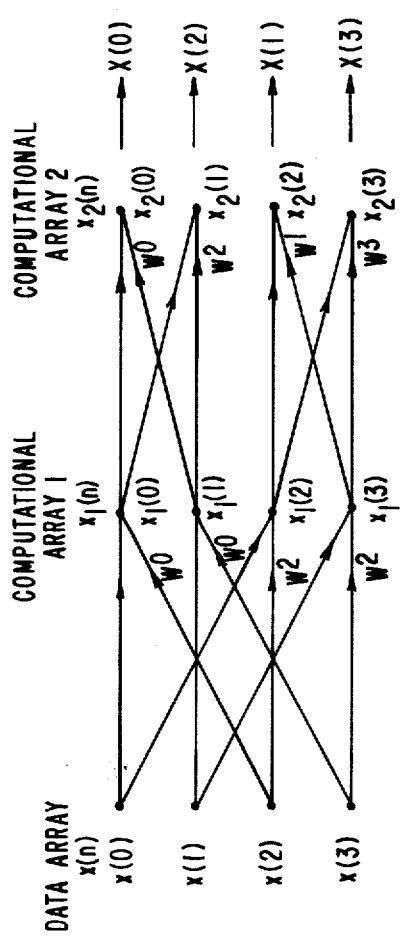
FIG.1 (BACKGROUND)
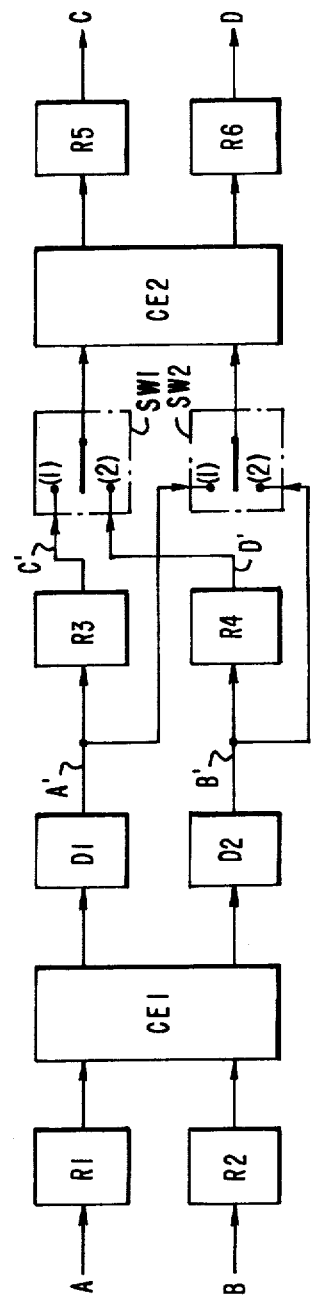
FIG.3 (BACKGROUND)

MULTIPOINT PIPELINE PROCESSOR FOR COMPUTING THE DISCRETE FOURIER TRANSFORM

BACKGROUND OF THE INVENTION

The present invention relates broadly to discrete Fourier transform (DFT) processors and more particularly, to a multipoint pipeline processor of radix 2 for computing a discrete Fourier transform based on a combination of techniques derived from fast Fourier transform (FFT) and Winograd discrete Fourier transform (WDFT) type algorithms.

The calculation of the discrete Fourier transform (DFT), as denoted generally by the following equation $$X(k) = \sum_{n=0}^{N-1} x(n) \exp(-j(2\pi/N)nk), \quad (1)$$

is one of the central operations in digital signal processing. In equation (1) above, the term x(n) denotes an input sequence of points sampled from a waveform over a time interval comprising N samplings, wherein the index n is often termed the input index; similarly, the term X(k) denotes an output sequence of frequency harmonics corresponding to the discrete Fourier transformation of the N sampled points of the waveform, wherein the index k is often termed the output index. Since the DFT is considered such a powerful mathematical tool, it is often applied to systems which deal with signals that are discrete in time, like Doppler spectrum analysis (Fourier analysis) digital filtering (convolution) and chirp filtering (correlation), for example.

The DFT equation (1) above may be more simply expressed in the form of equation (2) below $$X(k) = \sum_{n=0}^{N-1} x(n) W^{nk}, \quad (2)$$

where $$W = \exp[-j(2\pi/N)]. \quad (3)$$

Equation (2) is commonly expressed in the matrix representation $$\begin{bmatrix} X(0) \\ X(1) \\ \cdot \\ \cdot \\ X(N-1) \end{bmatrix} = \begin{bmatrix} 1 & 1 & \cdots & 1 \\ 1 & W^1 & W^2 & \cdots & W^{N-1} \\ \cdot & W^2 & W^4 & \cdots & \cdot \\ \cdot & \cdot & \cdot & & \cdot \\ \cdot & \cdot & \cdot & & \cdot \\ 1 & W^{N-1} & W^{2(N-1)} & W^{(N-1)(N-1)} \end{bmatrix} \begin{bmatrix} x(0) \\ x(1) \\ \cdot \\ \cdot \\ x(N-1) \end{bmatrix} \quad (4)$$

which is a linear transformation of the N-dimensional data vector $\bar{x}(n)$ into the vector $\bar{X}(k)$ of frequency samples. Assuming that the term x(n) is complex, the linear transformation of equation (4) requires $N^2$ complex multiplications and $N(N-1)$ complex additions. Consequently, the DFT becomes impractical, in a sense, as the number of points, N, increases in length because of the large number of complex operations required.

In 1965, a paper entitled "An Algorithm for the Machine Calculation of Complex Fourier Series" by Cooley and Tukey published in Math. Comput., vol. 19, pp. 297–301, (April, 1965), had a major impact on signal processing by stimulating the development and widespread use of what is commonly termed the fast Fourier transform (FFT). The FFT algorithms use the relationship $$W^{nk} = W^{nk} \bmod (N) \quad (5)$$

where [nk mod (N)] is the remainder of the division of nk by N. For example, if $N = 4 = 2^2$, then when n=2 and k=3, $W^6 = W^2$. For convenience, to illustrate the FFT algorithm the number of sample points, N, is choosen as a power of 2, say for example, N=4. The first step in the development of the FFT algorithm for the present example is to rewrite equation (4) as $$\begin{bmatrix} X(0) \\ X(1) \\ X(2) \\ X(3) \end{bmatrix} = \begin{bmatrix} 1 & 1 & 1 & 1 \\ 1 & W^1 & W^2 & W^3 \\ 1 & W^2 & W^0 & W^2 \\ 1 & W^3 & W^2 & W^1 \end{bmatrix} \begin{bmatrix} x(0) \\ x(1) \\ x(2) \\ x(3) \end{bmatrix} \quad (6)$$

where each element in the W square matrix is replaced with its mod (N) equivalent. Thereafter, the second step involves a matrix factorization, peculiar to the theory of the FFT algorithm which may include at least one row interchange and a permutation of at least one of the output and/or input indexes of the column vectors X(k) and x(n), respectively. In the present example, the resulting matrix equation after the second step may take the form of:

$$\begin{bmatrix} X(0) \\ X(2) \\ X(1) \\ X(3) \end{bmatrix} = \begin{bmatrix} 1 & W^0 & 0 & 0 \\ 1 & W^2 & 0 & 0 \\ 0 & 0 & 1 & W^1 \\ 0 & 0 & 1 & W^3 \end{bmatrix} \begin{bmatrix} 1 & 0 & W^0 & 0 \\ 0 & 1 & 0 & W^0 \\ 1 & 0 & W^2 & 0 \\ 0 & 1 & 0 & W^2 \end{bmatrix} \begin{bmatrix} x(0) \\ x(1) \\ x(2) \\ x(3) \end{bmatrix} \quad (7)$$

$$\text{MATRIX B} \quad \text{MATRIX A}$$

A signal flow graph is generally used to illustrate the operations performed in the matrix equation resulting from the matrix factorization process of the FFT algorithm. For equation (7) above, the signal flow graph may appear as that shown in FIG. 1. Note that, in the signal flow graph of FIG. 1, there are two computational arrays $x_1(n)$ and $x_2(n)$ resulting from the matrix computations of matrix A (equation 7) with the data vector x(n) and matrix B (equation 7) with the computational array $x_1(n)$, respectively. In general, there will be δ computational arrays where $N = 2^\delta$. Further scrutinization of the signal flow graph of FIG. 1, yield the fact that only four complex multiplications and only eight complex additions are required to compute each array $x_1(n)$ and $x_2(n)$. Consequently, only eight complex multiplications are required for the entire transformation reducing the required number of complex multiplications for N=4 from 16 for the DFT to 8 for the FFT.

In general, for $N = 2^\delta$, the number of complex multiplications for the FFT algorithm is in the order of $N \log_2(N)$ as compared with $N^2$ for the DFT. It is readily apparent that as N increases in number, the FFT algorithm provides even greater savings in complex multiplications than that shown for N=4. For example, if $N=2^{10}$, then for the DFT, the number of complex multiplications would be $2^{20}$; however for the FFT, the number would be on the order of $10.2^{10}$. This is a savings of complex multiplications on the order of 100/1 which makes the FFT algorithm convincingly superior to the DFT as a computational tool. For a more comprehensive study of the fast Fourier transform (FFT) for background purposes reference is made herein to the text "The Fast Fourier Transform" by E. Oran Brigham, published in 1974 by Prentice-Hall, Inc. In addition, for a generalized summary of the state of the art improvements to the FFT algorithm, reference is also made to a paper entitled "A Prime Factor FFT Algorithm Using High Speed Convolution" written by Dean P. Kolba and Thomas W. Parks for the IEEE Transactions on Acoustics, Speech and Signal Processing, Vol. ASSP-25, No. 4, August, 1977.

One known form of implementation of the FFT algorithm is the architecture of a pipeline of computational elements (CE's). The primary advantage of the pipeline FFT architecture is the parallel processing of the computational elements which substantially improve computational speed with a hardware structure involving virtually no overhead for control functions. A typical example of a basic computational element (commonly termed butterfly) of the radix-2, decimation in time version of the FFT algorithm is shown in FIG. 2. The butterfly or CE generally consists of one complex multiplication and two complex additions. These CE's are usually cascadedly coupled in the pipeline architecture to form the computational complexity of the FFT.

Generally, the number of computations required for a complete transform for an N-point, radix-2 FFT is $(N/2) \log_2 N$, since the FFT algorithm consists of $\log_2 N$ computational stages and each stage requires N/2 butterflies. A glance at FIG. 1 will verify these numbers for the case N=4. There are $\log_2 4 = 2$ computational stages and 4/2 butterflies for each stage making a total of $4/2 \log_2 4$ or 4 butterflies in all. However, realizing that $W^2 = -W^0$, and $W^3 = -W^1$, a pipeline structure of just two cascadedly coupled CE's may be arranged to perform the computations of the signal flow graph of FIG. 1. An exemplary schematic architecture of such a pipeline architecture is shown in FIG. 3 wherein $CE_1$ and $CE_2$ are in a circuit form similar to that shown in FIG. 2 and wherein the blocks denoted by R and D are merely information holding and delay registers, respectively, enabled for updating data by a conventional clock (not shown). The holding and delay registers permit the parallel processing of the CE's to occur. A set of commutator switches SW1 and SW2 appropriately align the data presented to $CE_2$ in a timely fashion.

A typical operation of the simplified pipeline embodiment of FIG. 3 may be described in connection with the signal flow graph of FIG. 1. To start with, the input data array points x(0) and x(2) may be presented at input points A and B, respectively. At the next clock pulse i, the data is captured by registers R1 and R2, respectively. During the interval between clock pulses i and i+1, $CE_1$, computes $x_1(0)$ and $x_1(2)$ and presents this data to registers D1 and D2, respectively. Concurrently, data points x(1) and x(3) are presented to registers R1 and R2. At the clock pulse i+1, all the registers are updated. Between clock pulse i+1 and i+2, $CE_1$ computes $x_1(1)$ and $x_1(3)$ in accordance with the signal flow graph of FIG. 1 and the previously calculated $x_1(0)$ is present at A'. Note that D1 is a one pulse delay register and D2 is a two pulse delay register. At the next clock pulse i+2, all the registers are again updated and switches SW1 and SW2 are controlled to position 1. Between clock pulses i+2 and i+3, CE computes $x_1'(Q)$ and $x_1'(2)$ from the second set of input data x'(0) and x'(2) presented thereto. In addition, present at A' and C' are the computed points $x_1(1)$ and $x_1(0)$, respectively, which are presented to $CE_2$ through switches SW1 and SW2 (position 1) wherein $x_2(0)$ and $x_2(1)$ are computed in accordance with the signal flow graph in FIG. 1. At the next clock pulse i+3, all the registers are again updated and switches SW1 and SW2 are controlled to position 2. Thereafter, $x_1(3)$ and $x_1(2)$ are present at B' and D', respectively. Between clock pulses i+3 and i+4, $CE_1$ computes $x_1'(1)$ and $x_1'(3)$ from the second set of input data points x'(1) and x'(3) presented thereto, and in a parallel processing manner, $CE_2$ computes $x_2(2)$ and $x_2(3)$ from $x_1(3)$ and $x_1(2)$ which are presented thereto from B' and D' through switches SW1 and SW2 (position 2). Note that $x_2(0)$ and $x_2(1)$ are present at the output C and D respectively after clock pulse i+3 and similarly, $x_2(2)$ and $x_2(3)$ are present at the outputs C and D, respectively after clock pulse i+4. The radix −2 pipeline processor FIG. 3 continues in a similar manner to process serially input pairs of data in a parallel processing fashion and serially output the computed results in predetermined data pairs in accordance with the computational array pattern of the signal flow graph of FIG. 1.

It is understood that the example described above in connection with FIGS. 1, 2 and 3 was used merely to provide a simple understanding of the FFT algorithm and pipeline processor architecture in connection therewith. For a more detailed explanation of FFT pipeline processors, reference is made herein to the text entitled "Application of Digital Signal Processing" edited by Alan V. Oppenhein published by Prentice-Hall, Inc. (1978), primarily Chapter 5 pp. 265-279 which was authored by J. H. McClellan and R. J. Purdy both of MIT and the text entitled "Theory and Application of Digital Signal Processing" by Rabiner and Gold published by Prentice-Hall, Inc. (1975) primarily Chapter 10.

As was stated above, the FFT pipeline processor consists of $\log_2 N$ stages for an N-point, radix-2 FFT and in general, each stage comprises a complex multiplication which in a hardware mechanization may involve two multipliers to better facilitate the subsequent complex additions of the butterfly computational element with respect to the parallel pipeline processing. It becomes readily evident that for a 32-point FFT pipeline processor, for example, as many as 10 hardware multipliers may be required, for a 64-point, as many as 12, and for a 128 point, as many as 14. It is well known to those skilled in the pertinent art that hardware multipliers, especially those of the digital variety of say 12 to 16 bits accuracy, involve many interconnected medium-scale-integrated (MSI) circuits which are very costly and take up excessive printed circuit (PC) board areas in the fabrication thereof and in addition, the hardware multipliers consume precious computational time in the operation thereof.

One of the first to successfully reduce the number of multiplication computations of the FFT by making use of the group theoretic properties of the W matrix was S. Winograd. In his concise paper entitled "On Computing the Discrete Fourier Transform", Proc. Nat. Acad. Sec. U.S.A., vol. 73, no. 4, pp. 1005-1006, April 1976, Winograd combines the conversion of a DFT to convolution for prime and prime power lengths with new convolution algorithms, which were being developed by Argarwal and Cooley at that time, for deriving short transforms. He proposed that long transforms be computed by nesting these short, high speed transforms and compared the number of operations required with that of the conventional FFT. For a comprehensive summary of the work by Winograd and others involving the conversion of a DFT to circular convolution and convolution with minimum number of multipliers, reference is again made to the paper to Kolba, et al. cited hereinabove.

In general, Winograd suggests that by combining the cyclical properties of the W matrix of the FFT with some theoretic properties of integers that the number of multipliers required to perform a DFT may be reduced by 5-10/1 over existing FFT algorithms. However, the Winograd discrete Fourier transform (WDFT) does not control the number of adds for all known results. Nonetheless, this does not produce disadvantageous results, because the number of adds of the WDFT stay within about 10% of the number required for an FFT. Accordingly, the overall number of computations of the FFT is reduced using the WDFT (see Kolba, et al. referenced above for more specific details).

One primary drawback of the WDFT algorithm is that it is not directly reduceable to practice in a pipeline processor because the structure of the WDFT is far less regular than the FFT and thus inefficient to implement in terms of a hardware pipeline machine as described supra. In addition, the input and output sequences to the computational stages are at times permitted in an unusual manner. The only implemented versions of the WDFT algorithm that are known to exist are general purpose digital computer programs where the structure of its nested signal flow graphs and permutations of its input/output sequences are handled in the programs. The paper, entitled "An Introduction to Programming the Winograd Fourier Transform Algorithm (WFTA)", by H. F. Silverman, published in the IEEE Transactions on Acoustics, Speech and Signal Processing, vol. ASSP-25, pp. 152-165, April 1977, provides a more detailed description of examples of programming the Winograd transform and is referenced herein for that purpose. Another paper, entitled "Fixed Point Error Analysis of the Winograd Fourier Transform Algorithm" by Robert W. Patterson submitted as a Masters Thesis to the Massachusetts Institute of Technology (MIT) in September 1977, makes light of the irregularities in the signal flow graph and the unusual permutations of the input/output sequence of the Winograd transform, particularly that of the 5 point DFT shown on page 86 therein. The Patterson thesis is additionally made reference to herein for a more detailed discussion of the WFTA. A most recently issued U.S. Pat. No. 4,156,920 issued May 29, 1979 to S. Winograd may provide additional background material.

In summary, the main drawbacks of the WDFT that have apparently precluded its implementation in hardware pipeline mechanization are: (1) it is less efficient to mechanize because of less regular structure, and (2) it requires complicated memory bookeeping in hardware because of the unusual input and output sequences to various computational stages of the short transforms nested therein. It is understood that as systems are required to perform increasingly complex functions more quickly, there is a need for a DFT, like that taught by Winograd, which is apparently noticeably faster than the FFT. For large transforms this step may make the complex computations feasible and for smaller transforms, this step may allow faster computation or at least computation with less implementable hardware.

Presented herebelow is a multipoint radix-2, pipeline processor which is believed to solve the aforementioned problems of the WDFT by providing an inherently faster more cost effective way of implementing the DFT of a relatively large number of data points as compared with a state of the art comparable multipoint FFT pipeline processor. The preferred embodiment described herebelow departs from the FFT and WDFT by combining the reduction in multiplicative computations of the WDFT with the structural regularity of the FFT to provide an improved multipoint, radix-2, pipeline processor.

SUMMARY OF THE INVENTION

In accordance with the broad principles of the present invention, a pipeline processor for performing a discrete Fourier transformation (DFT) on an input array of N signal values to derive an output array of at most N signal values representative of the frequency transformation of the input array comprises an input processing section, an intermediate processing section and an output processing section. The input processing section includes a first plurality of cascadedly coupled computational elements operative to perform only additions and subtractions substantially in butterfly-type arrangements, and is governed to operate on the input array of N signal values with the computational elements in a pipeline computational fashion and to propagate the resulting interelement computed signal values therethrough in a first predetermined signal flow pattern to render a first intermediate array of signal values. The intermediate processing section multiplies each signal value of the first intermediate array with at least one respectively corresponding predetermined transformation value to generate a second intermediate array of signal values. The output processing section includes a second plurality of cascadedly coupled computational elements operative to perform only additions and subtraction substantially in butterfly-type arrangements, and is governed to operate on said second intermediate array of signal values with the computational elements in a pipeline computational fashion and to propagate the resulting interelement computed signal values therethrough in a second predetermined signal flow pattern to render the output array of at most N signal values.

More specifically, the pipeline processor comprises a radix-2 configuration having top and bottom propagation rails. The signal values of the input array are, preferably, input sequentially at the top and bottom rails of the input processing section in a predetermined first order of coupled pairs. Similarly, the first intermediate array is preferably rendered sequentially from the top and bottom rails of the input processing section in a second predetermined order of coupled pairs. Accordingly, the second intermediate array is generated sequentially by the intermediate processing section in a third predetermined order of coupled pairs; the second intermediate array is input sequentially to the top and bottom rails of the output processing section in a fourth predetermined order of coupled pairs; and the output array of signal values is rendered sequentially from the top and bottom rails of the output processing section in a fifth predetermined order of coupled pairs. In one case, the third and fourth predetermined orders of coupled pairs are equivalent.

In one embodiment of the present invention, the first and second signal flow propagation patterns of the input and output processing sections, respectively, are based on a 30-point signal flow graph including a predetermined nesting configuration of selected 2-, 3-, and 5-point signal flow graphs. In addition, the transformation values of the intermediate processing section are compositely formed from the multiplication factors of the nested 2-, 3-, and 5-point transforms of the 30-point signal flow graph. And furthermore, the predetermined order of coupled pairs associated with the signal values of the input, first intermediate, second intermediate, and output array are additionally related to the nesting configuration of the 2-, 3- and 5-point transforms of the 30-point signal flow graph.

In another embodiment of the present invention, the first and second signal flow propagation patterns of the input and output processing sections, respectively, are based on a 60-point signal flow graph including a predetermined nesting configuration of selected 4-, 3- and 5-point signal flow graphs. In accordance with the embodiment, the transformation values of the intermediate processing section are compositely formed from the multiplication factors of the nested 4-, 3- and 5-point transforms of the 60-point signal flow graph and similarly, the predetermined orders of coupled pairs associated with the processing of each of the arrays are related to the predetermined nesting configuration in the 60-point transform.

In the case in which, each of N signal values comprises a first and second portion. The input processing section processes the input array of first portions and the input array of second portions, individually, and renders a first and second intermediate array, respectively associated therewith. A first and second composite array are formed in the intermediate processing section by selecting signal values from both the rendered first and second intermediate arrays. Third and fourth intermediate arrays are generated in the intermediate processing section from the multiplication of the signal values of the first and second composite arrays, respectively, with their corresponding predetermined transformation values. The output processing section processes the third and fourth arrays, individually, and renders first and second output arrays, respectively associated therewith, the first and second output arrays being compositely representative of the frequency transformation components of the input array.

BRIEF DESCRIPTION OF THE DRAWINGS

FIG. 1 exemplifies a standard signal flow graph for a discrete Fourier transformation for background reference purposes;

FIG. 2 is a functional schematic diagram of a conventional butterfly-type computational element standardly used in pipeline processors;

FIG. 3 is a schematic block diagram typifying a pipeline processor embodying the computational elements of FIG. 2 provided for background reference purposes;

DESCRIPTION OF THE PREFERRED EMBODIMENTS

Figure 4A:
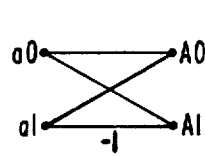
FIGS. 4A, 4B and 4C exhibit selected 2-, 3- and 5-point signal flow graphs, respectively.

The first embodiment of a multipoint pipeline processor to be described is that of a 30 point pipeline processor which is based on 2, 3 and 5 point transforms, the elemental signal flow graphs of which are shown respectively in 4A, 4B and 4C of FIG. 4. The 2 and 3 point transforms of 4A and 4B are described in sufficient detail in the Patterson thesis which was made reference to in the Background section of the instant application. However, the 5 point transform having the signal flow graph of 4C was conceived especially for the embodiment of the multipoint pipeline processor in accordance with the principles of the present invention. In the description heretofollow, the input data points are devoted as ax where x is an integer corresponding to the input index of the data point matrix of the DFT and likewise, the output frequency harmonics of the DFT are denoted as Ay where y is the output index of the frequency matrix. The multiplication constants Kz, where z is an integer, are derived from the nesting of small transforms within the large transforms according to known Winograd techniques.

Referring to FIG. 4, it is pointed out that the elemental 3 and 5 point transforms may each be partitioned into 3 sections—an input section comprising only additions and subtraction operations, a middle or intermediate section comprising only multiplication operations, and an output section comprising essentially only addition and subtraction operations. It is further pointed out that the real parts of the input data points ax may be first operated on by the input section of the transforms to yield an intermediate array a'x (real) of real data points. Thereafter, the imaginary parts of the inputs data points ax may be operated on by the input section of the transforms in accordance with the signal flow graph thereof to yield an intermediate array a'x (imaginary) of imaginary data points. It is understood that the imaginary parts of the input data points may be operated on by the input sections first followed by the real parts of the input data points without altering the transformation.

Since the constant multipliers Kz of the middle section of the transforms may be either real or imaginary, data points may be selected from the intermediate arrays a'x (real) and a'x (imaginary) such that when multiplied by their respectively corresponding multiplication constant Kz (and/or unity), the resultant array a"x is all real or all imaginary, but not complex. The resultant arrays a"x (real) and a"y (imaginary) may then be individually processed by the output section of the transforms in accordance with the signal flow graphs thereof to yield the real and imaginary portions of the frequency harmonics Ay. Both the input data point array ax and output frequency harmonic array Ay are permitted as shown in FIG. 4 to correspond to the construction and operation of their associated signal flow graph.

Figure 5A:
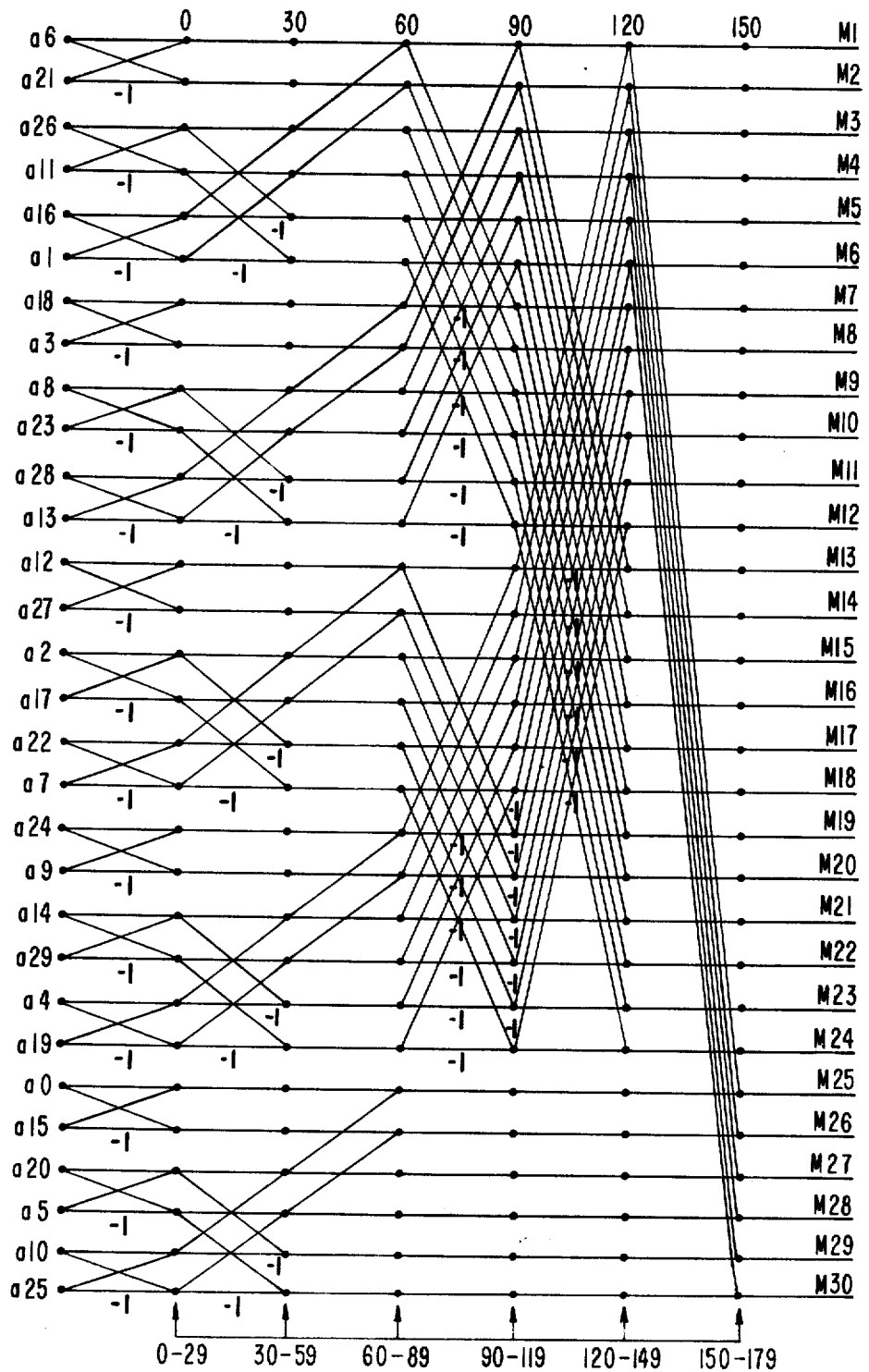
FIGS. 5A and 5B exhibit a 30-point signal flow graph including a predetermined nesting configuration of the selected 2-, 3-, and 5-point signal flow graphs.
Figure 5B:
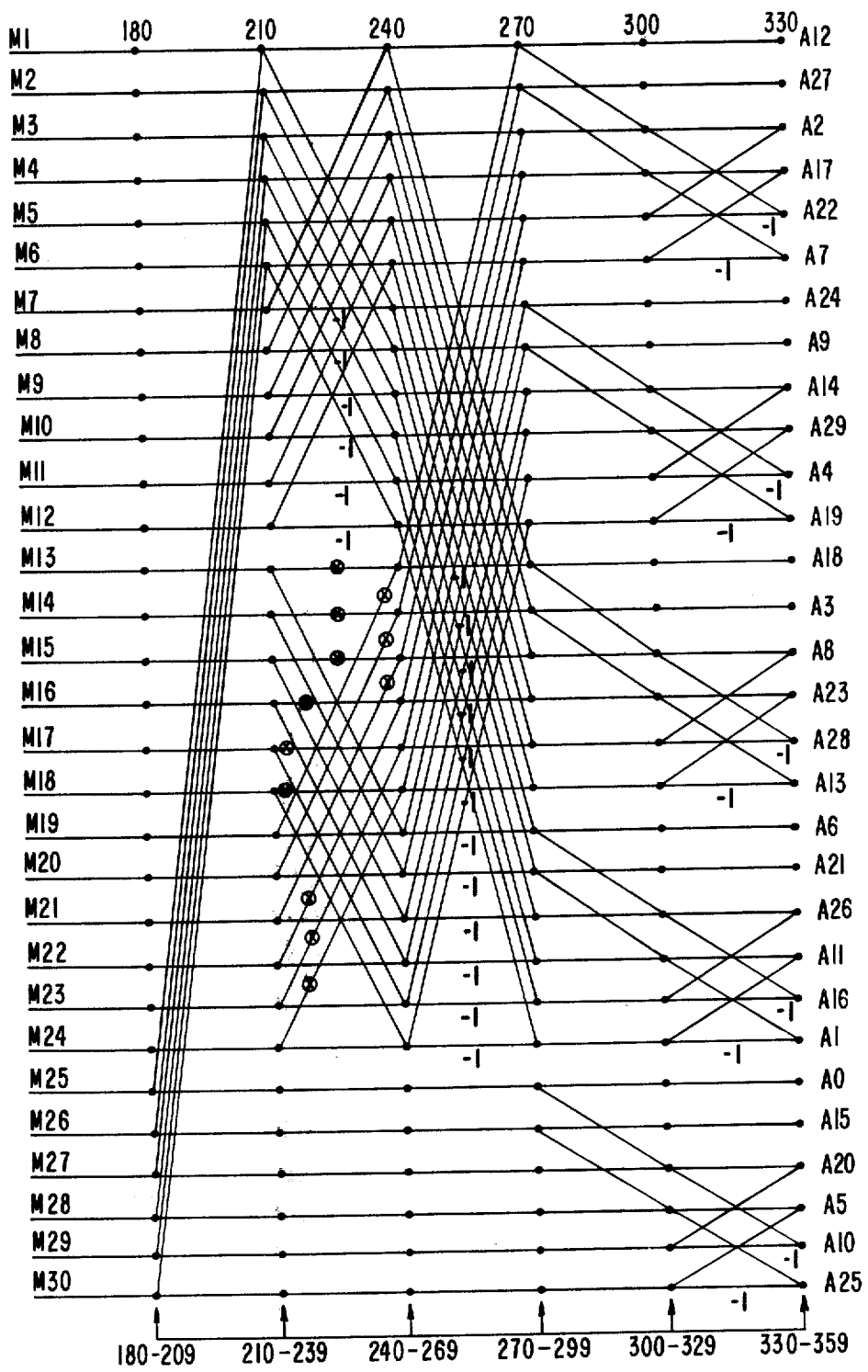

A 30 point signal flow graph which is shown in FIGS. 5A and 5B is used as a basis for the architecture of a 30 point pipeline processor for discrete Fourier transformations. The 30 point signal flow graph of 5A and 5B is constructed by nesting the smaller 2, 3 and 5 point transforms of 4A, 4B and 4C, respectively, according to the block diagram schematic of signal flow depicted in FIGS. 6A and 6B. For purposes of describing the signal flow graphs of the 30 point transform, the nodes of each intermediate array resulting from the preceeding computational stage are enumerated with consecutive integers. For example, starting at the extreme left of FIG. 5A, the nodes of the first intermediate array resulting from the first computational stage are denoted by the integers 0 through 29 consecutively, the nodes of the second intermediate array are denoted as 30 through 59, and so on through the 12 computational stage of the signal flow graph, yielding an output array of nodes denoted by the integers 330 through 359, consecutively. According to the signal flow graph of FIGS. 5A and 5B, the input and output arrays are preordered in a fashion to be consistent with the nesting of the smaller transforms within the 30 point transform and the signal data flow paths therethrough. For the present embodiment, the permutations of the input and output arrays with respect to the nodes 0 through 29 and 330 through 359 respectively are tabulated in Table 1 herebelow.

TABLE 1

| Node | Input Array Element | Node | Output Array Element |
| --- | --- | --- | --- |
| 0 | a6 | 330 | A12 |
| 1 | a21 | 331 | A27 |
| 2 | a26 | 332 | A2 |
| 3 | a11 | 333 | A17 |
| 4 | a16 | 334 | A22 |
| 5 | a1 | 335 | A7 |
| 6 | a18 | 336 | A24 |
| 7 | a3 | 337 | A9 |
| 8 | a8 | 338 | A14 |
| 9 | a23 | 339 | A29 |
| 10 | a28 | 340 | A4 |
| 11 | a13 | 341 | A19 |
| 12 | a12 | 342 | A18 |
| 13 | a27 | 343 | A3 |
| 14 | a2 | 344 | A8 |
| 15 | a17 | 345 | A23 |
| 16 | a22 | 346 | A28 |
| 17 | a7 | 347 | A13 |
| 18 | a24 | 348 | A6 |
| 19 | a9 | 349 | A21 |
| 20 | a14 | 350 | A26 |
| 21 | a29 | 351 | A11 |
| 22 | a4 | 352 | A16 |
| 23 | a19 | 353 | A1 |
| 24 | a0 | 354 | A0 |
| 25 | a15 | 355 | A15 |
| 26 | a20 | 356 | A20 |
| 27 | a5 | 357 | A5 |
| 28 | a10 | 358 | A10 |

TABLE 1-continued

| Node | Input Array Element | Node | Output Array Element |
| --- | --- | --- | --- |
| 29 | a25 | 359 | A25 |

Figure 6A:
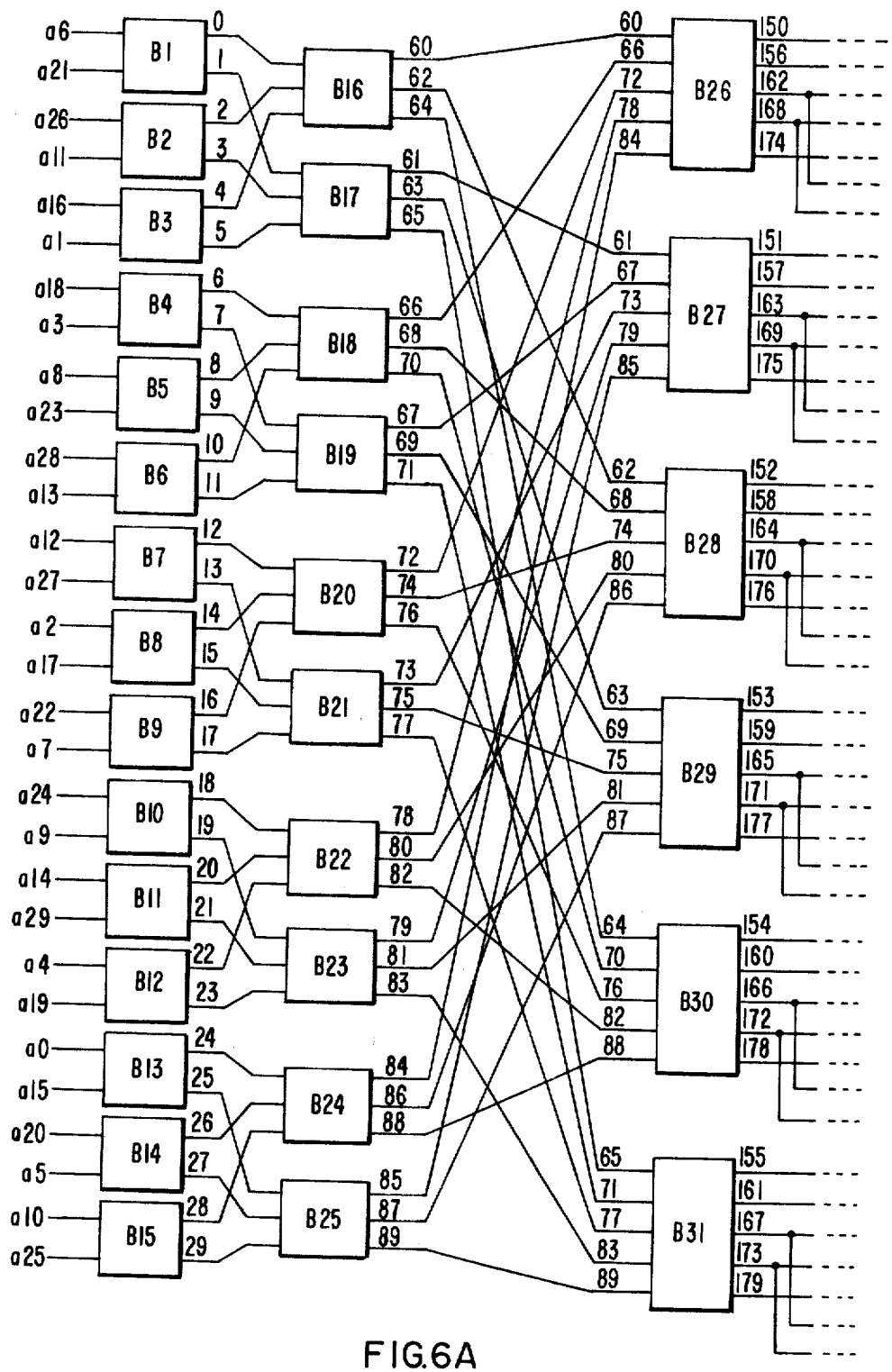
FIGS. 6A and 6B is a schematic block diagram detailing the interconnection of the predetermined nesting configuration of the selected 2-, 3- and 5-point signal flow graphs of the 30-point transform shown in FIGS. 5A and 5B.

In more particular detail, the first computational stage of the signal flow graph of FIG. 5A comprises 15-2 point transforms operating on predetermined ordered pairs of the input data point array as depicted by the first set of blocks B1-B15 shown at the extreme left in FIG. 6A. Accordingly, the second and third computational stages propagating from left to right in the 30 point signal flow graph are comprised of 10 nested 3 point transform input sections (4B) as depicted by a second set of blocks B16-B25. In the present embodiment the nesting alignment is such that the outputs represented by the nodes 0-5 of the first 3 blocks B1-B3 of the first column of blocks are coupled to inputs of the first 2 blocks B16 and B17 of the second column of blocks. More specifically, signal nodes 0, 2 and 4 are coupled respectively to the inputs of block 16 and signal nodes 1, 3 and 5 are coupled respectively to the inputs of block 17. Similarly, blocks B4-B6 are coupled to B18 and B19, blocks B7-B9 to B20 and B21, blocks B10-B12 to B22 and B23, and finally B13-B15 to B24 and B25.

Still further, the fourth, fifth and sixth computational stages of the 30 point signal flow graph going from left-to-right are comprised of nested input sections of the 5 point transform (4C) as depicted by a third column of blocks B26-B31 in the propagation of signal flow correspondingly from left to right in FIG. 6A. In more specific detail, the present embodiment couples the intermediate signal nodes 60, 66, 72, 78 and 84 resulting from the computational blocks B16, B18, B20, B22, and B24, respectively, to the corresponding inputs of the input section of the 5 point transform of block B26. Likewise, nodes 61, 67, 73, 79, and 85, resulting from the computations of blocks B17, B19, B21, B23, and B25, respectively, are coupled to the inputs of the block B27. In a similar fashion, the remaining nodes are partitioned in groups of 5 for alignment to the corresponding remaining input sections of the 5 point transforms (4C) represented by blocks B28, B29, B30, and B31 in accordance with block diagram schematic of FIG. 6A. What has just been described may be referred to as the input section of the 30 point signal flow graph of FIG. 5A.

As has been described hereabove in connection with the input sections of the 2, 3, and 5 point transforms of FIG. 4, input data point arrays comprising all real portions of the input data points are all imaginary portions of the input data points are individually operated on by the input section of the 30 point transform described in connection with FIGS. 5A and 5B rendering two sets of intermediate data points—one being all real values and the other being all imaginary values, both sets being represented by the nodes 150-179 in the FIGS. 5A and 6A. For the purposes of distinguishing one from the other, the real intermediate data points shall be denoted as 150R-179R and the imaginary ones as 1150I-179I. Note that both sets 150R-179R and 150I-179I may be computed by the input section of the 30 point transform prior to continuing signal flow operation by the intermediate multiplication section denoted by the multipliers M1 through M30.

Since it is known that, in deriving the composite multiplication constants M1 through M30 of the nested, 2, 3, and 5 point transforms for the 30 point transform, the resultant values may either be real or imaginary, but not complex. Thus, it can be appreciated that the previously computed elements of the intermediate arrays 150R-179R and 150I-179I may be scrambled prior to being operated on by the multiplication section to yield therefrom two sets of data points for the nodes 180-209 of the 30 point transform (see FIG. 5B)—one being all real values and the other being all imaginary values being denoted by 180R-209R and 180I-209I, respectively. The reason for this is that the output section of the 30 point transform may either operate on all real data array or on all imaginary data array, but not on elements of both concurrently. More details of one method of accomplishing the scrambling of the elements of the arrays 150R-179R and 150I-179I are provided herebelow.

It can be mathematically shown using the techniques of Winograd that the constant multiplies $K_1$-$K_6$ may be computed for the 30 point transform, depicted in FIGS. 5A and 5B, from the equations shown in Table 2.

TABLE 2

| | |
|---|---|
| $K_1 = (W^6 + W^{12} + W^{18} + W^{24})/4$ | Real |
| $K_2 = (-W^6 + W^{12} + W^{18} - W^{24})/4$ | Real |
| $K_3 = (-W^6 + W^{12} - W^{18} + W^{24})/4$ | Imag. |
| $K_4 = (-W^6 - W^{12} + W^{18} + W^{24})/4$ | Imag. |
| $K_5 = (W^{10} + W^{20})/2$ | Real |
| $K_6 = (W^{10} + W^{20})/2$ | Imag. |

Figure 7:
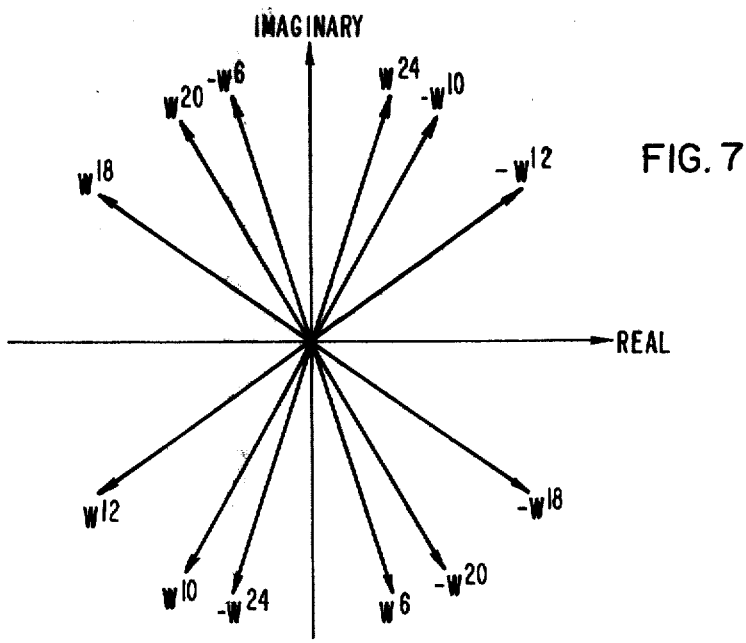
FIG. 7 is a graph illustrating the vectors used in computing the multiplication constants M1-M30 of the 30-point transform of FIGS. 5A and 5B.

Remembering that $W = \exp(-j(2\pi/N))$, then all of the terms $W^6$, $W^{12}$, $W^{18}$, $W^{24}$, $W^{10}$, and $W^{20}$ of the equations for $K_1$-$K_6$ may be exhibited as vectors of the form $\cos \theta - j \sin \theta$, where $\theta = 2\pi/N$, such as that displayed in FIG. 7. Consequently, the equations of Table 2 May be reduced to simple vector additions. For example, in the equation for $K_1$, it is readily apparent that the imaginary portions of vectors $W^6$ and $W^{24}$ cancel and the imaginary portions of vectors $W^{12}$ and $W^{18}$ cancel, rendering only the real portions of the vectors, whereby $K_1$ is a real value. Similarly, it can be shown through vector addition that $K_2$ is real, $K_3$ is imaginary, $K_4$ is imaginary, $K_5$ is real and finally, $K_6$ is imaginary.

Furthermore, the teachings of Winograd provide for techniques for computing the composite multiplication constants M1-M30 from the constants $K_1$ through $K_6$ which result in the equations exhibited in Table 3 found herebelow. From the equations of Tables 2 and 3, it can be readily determined if the multiplication constants of the set M1-M30 are either real or imaginary. The results of this determination are also shown in Table 3.

TABLE 3

| | | |
|---|---|---|
| M1 | $= K_1 - 1$ | Real |
| M2 | $= K_1 - 1$ | Real |
| M3 | $= (K_5 - 1)(K_1 - 1)$ | Real |
| M4 | $= (K_5 - 1)(K_1 - 1)$ | Real |
| M5 | $= K_6(K_1 - 1)$ | Imag. |
| M6 | $= K_6(K_1 - 1)$ | Imag. |
| M7 | $= K_2$ | Real |
| M8 | $= K_2$ | Real |
| M9 | $= (K_5 - 1)K_2$ | Real |
| M10 | $= (K_5 - 1)K_2$ | Real |
| M11 | $= K_6 K_2$ | Imag. |
| M12 | $= K_6 K_2$ | Imag. |
| M13 | $= K_3$ | Imag. |
| M14 | $= K_3$ | Imag. |
| M15 | $= (K_5 - 1)K_3$ | Imag. |
| M16 | $= (K_5 - 1)K_3$ | Imag. |
| M17 | $= K_6 K_3$ | Real |
| M18 | $= K_6 K_3$ | Real |
| M19 | $= K_4$ | Imag. |
| M20 | $= K_4$ | Imag. |
| M21 | $= (K_5 - 1)K_4$ | Imag. |

TABLE 3-continued

| | | |
|---|---|---|
| M22 | $= (K_5 - 1)K_4$ | Imag. |
| M23 | $= K_6 K_4$ | Real |
| M24 | $= K_6 K_4$ | Real |
| M25 | $= 1$ | Real |
| M26 | $= 1$ | Real |
| M27 | $= (K_5 - 1)$ | Real |
| M28 | $= K_5 - 1$ | Real |
| M29 | $= K_6$ | Imag. |
| M30 | $= K_6$ | Imag. |

It is worthwhile recalling that each output section of the nested 5-point transform (4C) within the 30-point transform (FIG. 5B) includes 2 more multiplication constants -$K_4/K_3$ and $K_3/K_4$. These additional multiplication points are appropriately denoted in the 30 point signal flow graph of FIG. 5B by the symbol ⊗. Since it is desired that all the multiplications be carried out in the middle or intermediate section of the 30 point transform, 12 additional composite multiplication constants M31 through M42 may be derived for this purpose. And since it is realized that signals at nodes 192-203 are equivalent to the signals at nodes 222-233, provisions may also be made for 2 signal nodes to virtually appear at 222 through 233, the second set of nodes being denoted as 222' through 233', respectively, corresponding to the first set of nodes 222 through 233. Consequently, the first set of nodes 222-233 may result from the multiplication of the signal nodes 162-173 by their respectively corresponding multipliers M13-M24. However, the signal nodes 222'-227' of the second set of nodes may result from the multiplication of the signal nodes 162-167 by their respective multiplication constants from the set M13-M18 and the additional multiplication factor -$K_4/K_3$, (see Table 4). Likewise, the signal nodes 228'-233' result from the multiplication of the signal nodes 168-173 by their respective multiplication constant from the set M19-M24 and the additional multiplication factor $K_3/K_4$ (see Table 4).

TABLE 4

| | | |
|---|---|---|
| M31 | $= M13 \cdot (-K_4/K_3)$ | Imag. |
| M32 | $= M14 \cdot (-K_4/K_3)$ | Imag. |
| M33 | $= M15 \cdot (-K_4/K_3)$ | Imag. |
| M34 | $= M16 \cdot (-K_4/K_3)$ | Imag. |
| M35 | $= M17 \cdot (-K_4/K_3)$ | Real |
| M36 | $= M18 \cdot (-K_4/K_3)$ | Real |
| M37 | $= M19 \cdot (K_3/K_4)$ | Imag. |
| M38 | $= M20 \cdot (K_3/K_4)$ | Imag. |
| M39 | $= M21 \cdot (K_3/K_4)$ | Imag. |
| M40 | $= M22 \cdot (K_3/K_4)$ | Imag. |
| M41 | $= M23 \cdot (K_3/K_4)$ | Real |
| M42 | $= M24 \cdot (K_3/K_4)$ | Real |

Each auxiliary signal node of the set 222'-227' may be added to its respective corresponding auxiliary signal node of the set 228'-233' to yield the signal nodes 252-257, respectively. Similarly, each signal node of the set 222-227 may be added to its respectively corresponding signal node of the set 228-233 to yield the signal nodes 258-263, respectively. The results of determining whether the computed constant from the set of constants M31 through M42 is real or imaginary is also shown in Table 4 hereabove.

Once having determined the identity (real or imaginary) of each of the multiplication constants M1-M42, the scrambling of the elements of the intermediate arrays 150R-179R and 150I-179I may be effected. The elements of the first and second composite arrays, which are operated on by the middle multiplication section of the 30-point transform of FIG. 5B to yield real and imaginary arrays, respectively, at signal nodes 180–209 including auxiliary signal nodes 192' through 203' (not shown) which are equivalent to signal nodes 222'–233', are displayed in Table 5 found herebelow. Note that the elements having an asterisk associated therewith are multiplied correspondingly by both sets of constants M13–M24 and M31–M42 to yield the signal nodes 192–203 (222–233) and 192'–203' (222'–233'), respectively.

TABLE 5

| 1st Composite Array | 2nd Composite Array |
|---|---|
| 150R | 150I |
| 151R | 151I |
| 152R | 152I |
| 153R | 153I |
| 154I | 154R |
| 155I | 155R |
| 156R | 156I |
| 157R | 157I |
| 158R | 158I |
| 159R | 159I |
| 160I | 160R |
| 161I | 161R |
| *162I | *162R |
| *163I | *163R |
| *164I | *164R |
| *165I | *165R |
| *166R | *166I |
| *167R | *167I |
| *168I | *168R |
| *169I | *169R |
| *170I | *170R |
| *171I | *171R |
| *172R | *172I |
| *173R | *173I |
| 174R | 174I |
| 175R | 175I |
| 176R | 176I |
| 177R | 177I |
| 178I | 178R |
| 179I | 179R |

Figure 6B:
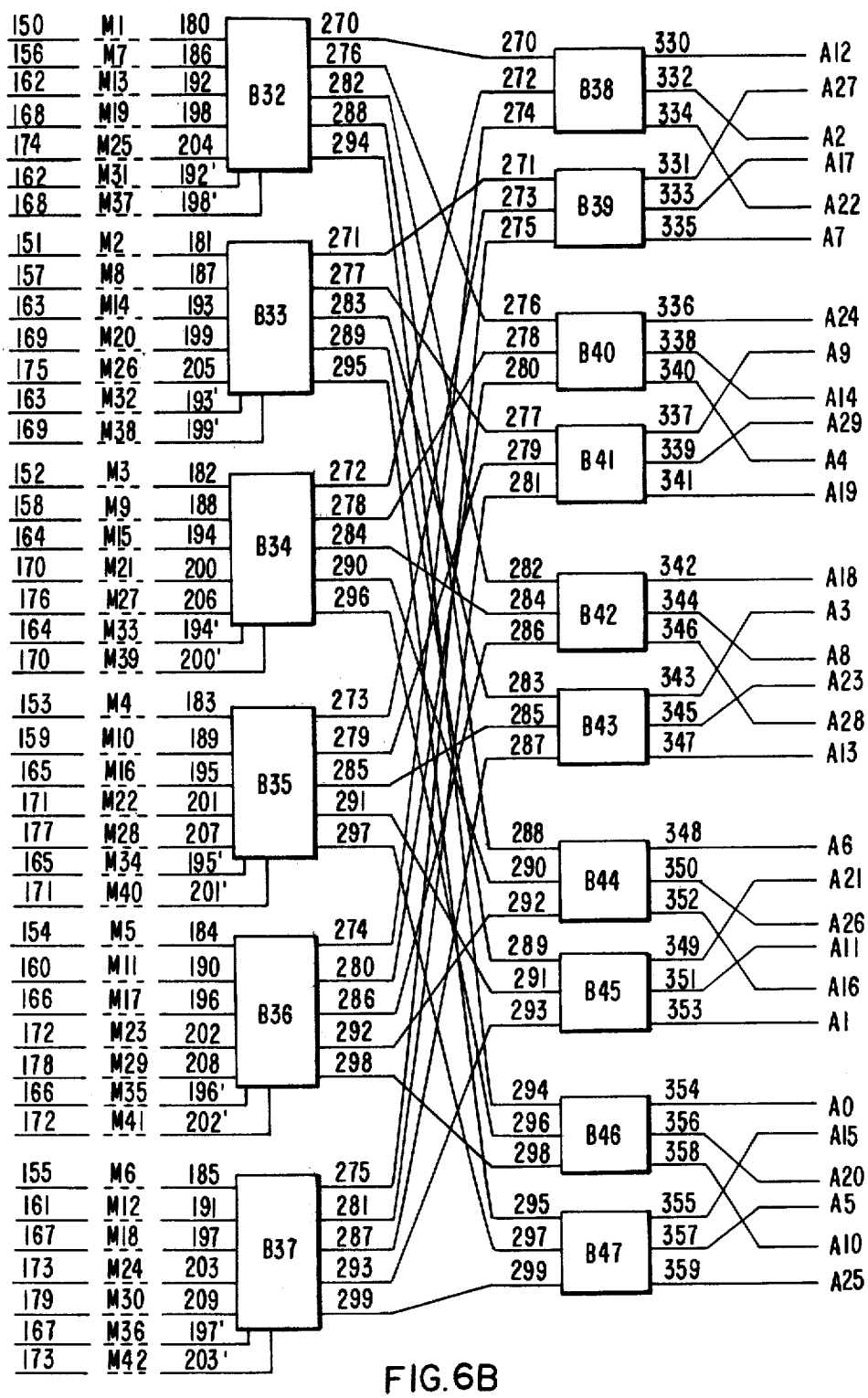

In the first 3 computational stages of the output section of the 30 point transform (5B), moving from left-to-right, are nested 6 output sections of the 5-point transform (4C) denoted by the blocks B32 through B37 shown in FIG. 6B. The nodes 180, 186, 192, 198, 204 including auxiliary nodes 192' and 198' resulting from the multiplication section are input to the output section of the 5 point transform of block B32. Similarly, the nodes 181, 187, 193, 199, 205 including auxiliary nodes 193' and 199' are coupled to the inputs of the block B33. The remaining nodes resulting from the computations of the multiplication section of the 30 point transform are grouped accordingly and coupled in a similar fashion to the remaining nested output sections of the 5-point transform depicted by blocks B34, B35, B36 and B37.

In the last 2 computational stages of the 30 point signal flow graph of FIG. 5B are nested 10 output sections of the 3 point transform (4B) denoted by blocks B38 through B47 in FIG. 6B. The nested alignment of the output sections of the 3 point transform with the 5 point transforms are such that the resultant nodes 270, 272, and 274 from blocks B32, B34 and B36 are coupled to the inputs of block B38, the resultant nodes 271, 273, and 275 from blocks B33, B35, B37 are coupled to the inputs of the block B39, and the remaining resultant nodes are similarly grouped by threes from the alternate blocks of 5-point transforms and coupled to the inputs of the remaining blocks of 3 point transform output sections B40–B47 such as that shown in FIGS. 5B and 6B. The resultant nodes 330–359 of the 3 point transforms B38–B47 correspond to the elements Ax of the frequency harmonic matrix according to the tabulations of Table 1.

Figure 8A:
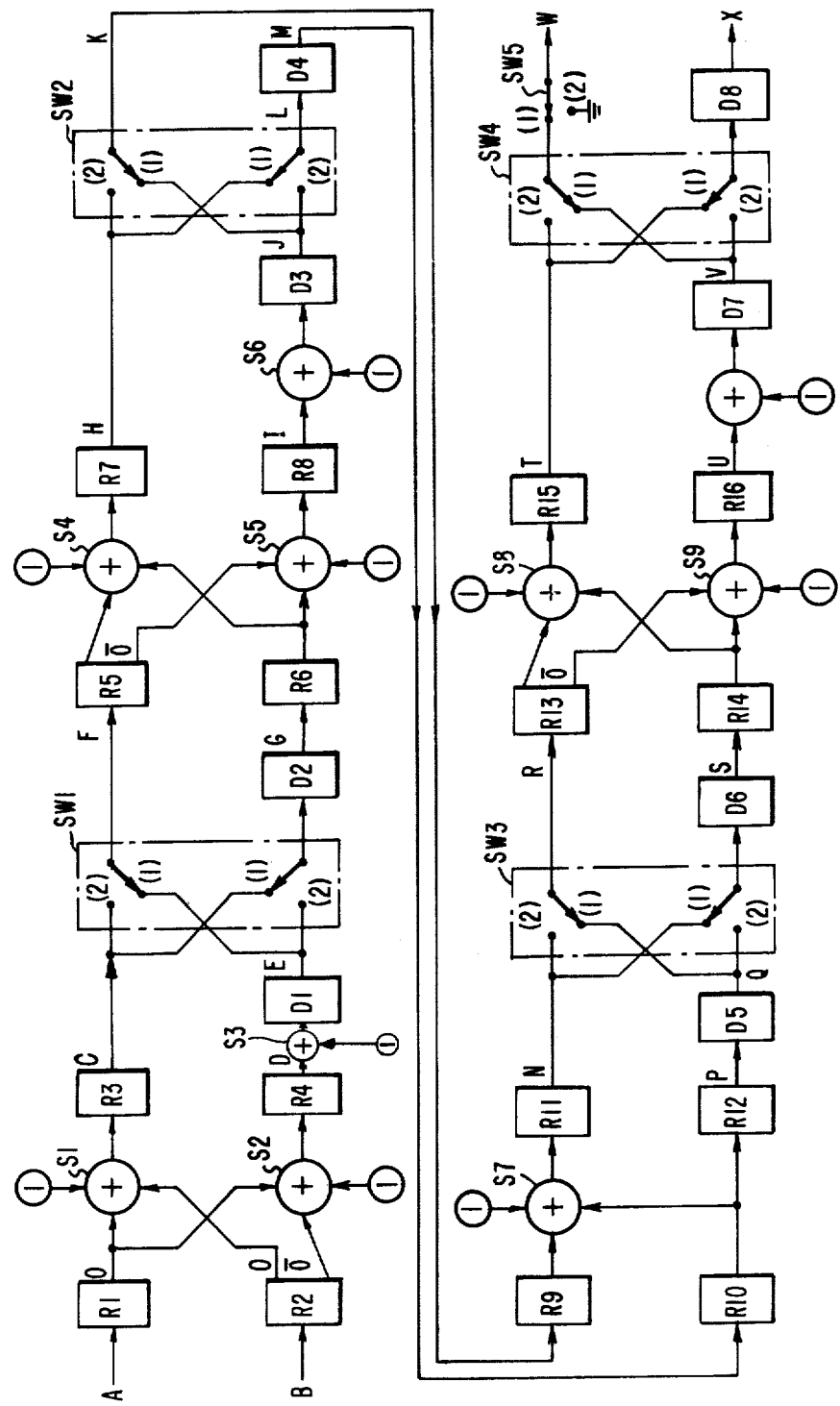
FIGS. 8A, 8B and 8C is a schematic block diagram embodiment of a multipoint pipeline processor based on the 30-point transform of FIGS. 5A and 5B.
Figure 8B:
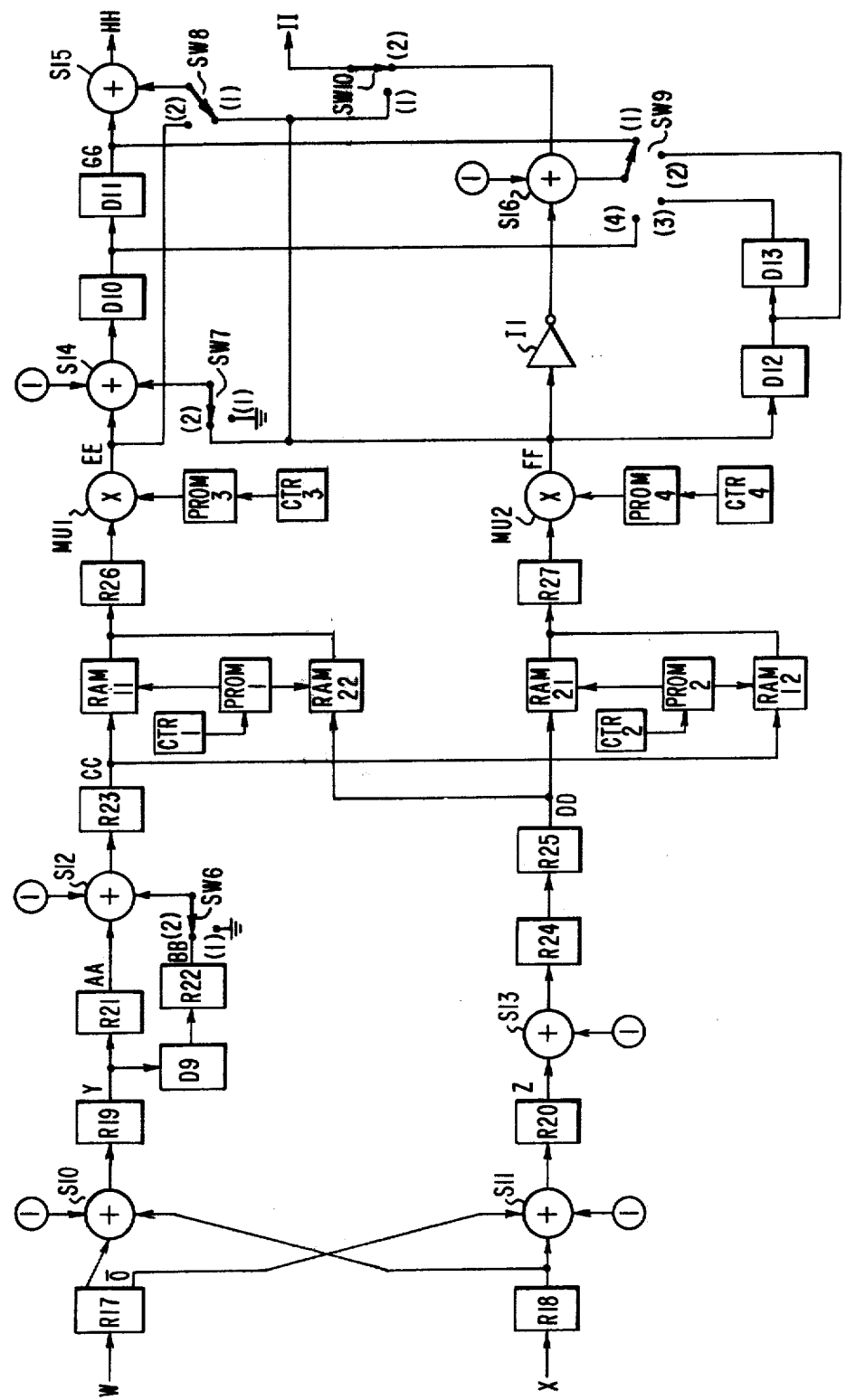
Figure 8C:
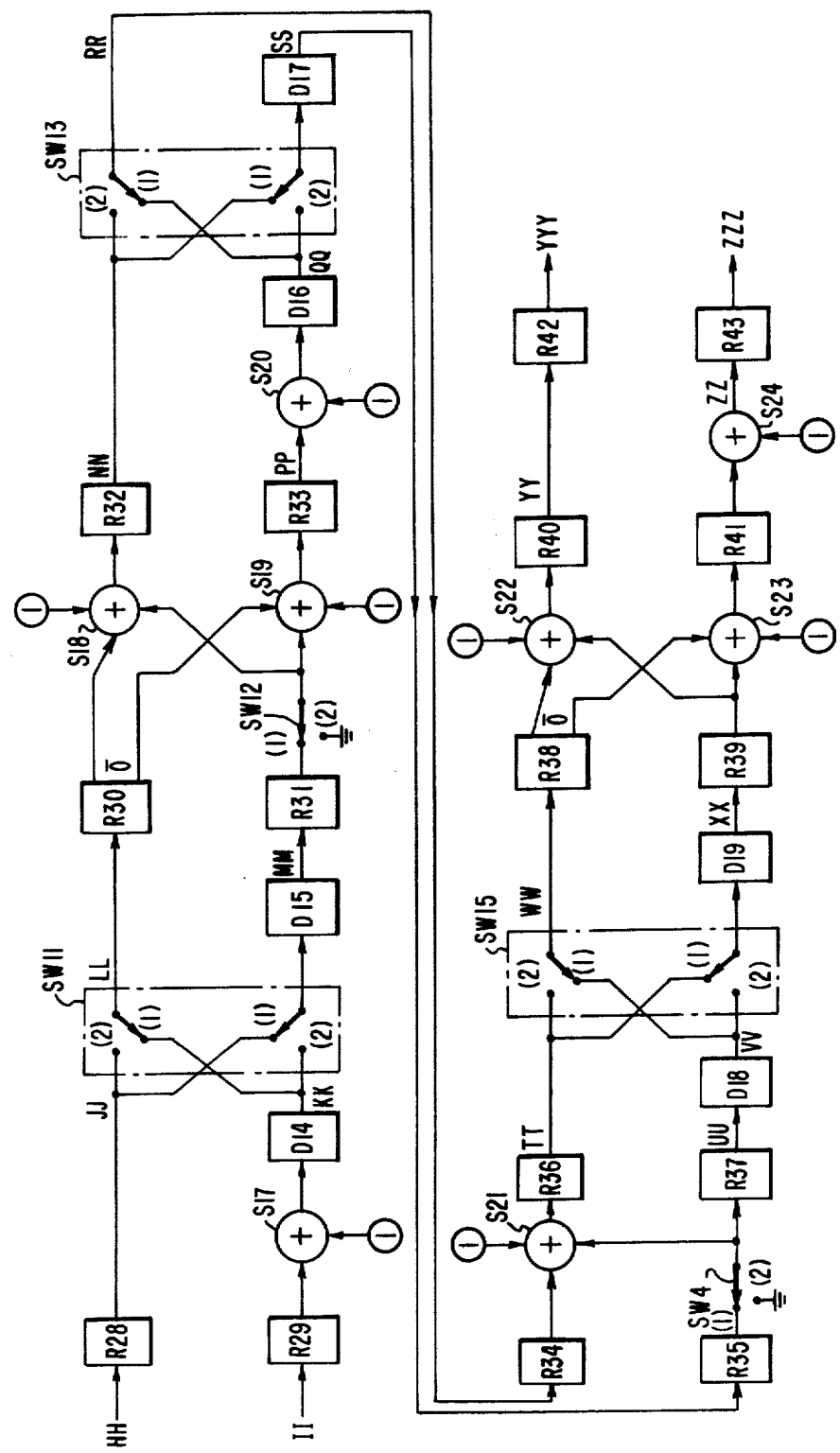

The foregoing description of the 30 point transform signal flow graph depicted in FIGS. 5A, 6A, 5B and 6B have been provided as an introductive basis of a 30 point transform pipeline processor, an embodiment of which is shown in the schematic block diagram of FIGS. 8A, 8B and 8C. The embodiment involves a 2 rail (radix-2) pipeline architecture comprising the elemental components of registers Rx, adders Sx, delay lines Dx and multiplier units MUx, x being the index for distinguishing one similar component from another. The pipeline embodiment further includes random-access-memory (RAM) for temporary storage of computed arrays intermediate to the transformation, programmed-read-only memories (PROM) for storage of address sequences associated with the scrambling of arrays from the RAM prior to submission to the muliplication stages, and other PROM's for the storage of the multiplication constants associated with the operation of the intermediate multiplication section of the transform. Clocking circuits and digital counter equivalents may be used to provide for synchronous pipeline operation in a parallel processing fashion. The inter-connections and operations of these elemental components will become more fully understood from the detailed description of the 30 point pipeline embodiment found herebelow.

Referring to FIG. 8A, data point information is input to the pipeline processor at points A and B, preferably in ordered pairs of a predetermined permutation. Pipeline flowpoints A and B are the inputs of registers R1 and R2, respectively. The output of R1 is coupled to one input of each of two adders S1 and S2 and the output of R2 is coupled to another input of the adder S1. In addition, the complement $\bar{0}$ of the output of R2 is coupled to another input of the adder S2. The outputs of S1 and S2 are provided to the inputs of registers R3 and R4, respectively.

In a digital embodiment of the pipeline processor, a 2's complement digital subtractor, such as that which is performed in adder S2, for example, involves adding one digital word W1 to the 2's complement of another digital word W2 generally utilizing a digital adder. The process of taking the 2's complement of the digital word W2 comprises the steps of inverting the digital word W2 and adding a "one" to the least significant bit (LSB) thereof. This operation is denoted in the block diagram schematic of FIGS. 8A, 8B and 8C by providing the inverted output $\bar{O}$ of a digital register R to a digital adder S and also providing a "one", denoted as ①to the least significant bit of the addition operation of S, the result of the adder S being the 2's complement subtractor of words W1 and W2. The symbol ① being added to the adders involved with a 2's complement subtraction is used throughout the schematic of 8A, 8B and 8C. Also, where an adder S is shown with ① being added as an input and is not being used as to perform a 2's complement subtraction operation, the operation which is being performed is a digital roundoff wherein a "one" is added to the most significant bit of the portion of the digital word which is being truncated prior to the roundoff operation. In these cases, the symbol 1 being an input to the adder S, like that shown for S1, for example, is representative of the "one" being added for roundoff purposes.

The schematic including registers R1, R2, R3 and R4, adders S1 and S2, and their interconnections constitute a "butterfly" operation excluding the multiplication step generally found in the computational element (CE's) of the known FFT pipelines (see FIGS. 2 and 3, for comparison).

Continuing with the description of FIG. 8A, the outputs of registers R3 and R4 are denoted as flow points C and D, respectively. Output C may be provided to a switch set SW1 comprising 2 single-pole-double-throw (SPDT) switches. Output D may be rounded off by the adder S3 (truncation implicit) and coupled through a one clock delay line D1, the output of which, denoted as flow point E, is also provided to the switch set SW1. More specifically, the flow point C is connected to position 2 of the first SPDT switch of SW1 and position 1 of the second SPDT switch of SW1. In addition, point E is connected to position 1 of the first SPDT switch of SW1 and position 2 of the second SPDT switch of SW1. Switch set SW1 may be operative to transfer switch state between position 1 and position 2 synchronous with the clocking operations of the holding and delay registers of the pipeline. The pole positioning of the first SPDT switch of SW1, denoted as point F, is coupled to the input of a holding register R5 and the pole position of the second SPDT switch of SW1 is propagated through a one clock pulse delay D2, the output of which is denoted as G, and input to another holding register R6.

For the purposes of expediting the description the remaining portion of the 30 point pipeline processor, the information flow rail associated with the points A, C and F will hereinafter be referred to as the "top" rail and likewise, the information flow rail associated with the points B, D, E, and G will hereinafter be referred to as the "bottom" rail. With this in mind, the top and bottom rails of the processor at F and G are coupled to a second butterfly arrangement including registers R5-R8 and adders S4 and S5 where R5, S4 and R7 correspond to information flow as the top rail and R6, S5 and R8 correspond to information flow of the bottom rail. In this second butterfly arrangement S5 performs the 2's complement subtraction operation. The outputs of registers R7 and R8 are denoted as H and I, respectively, output I being rounded off by the unit S6. Thereafter, the top rail is connected to switch set SW2, in a similar manner as that described for SW1, and the bottom rail is first connected to a 2 clock pulse delay line D3, the output being denoted as J, prior to being coupled to the switch set SW2 in a similar arrangement as that for SW1. The bottom rail output L from the switch SW2 is coupled through another 2 clock pulse delay line D4, the output being denoted as M. The above-described circuit arrangement of delay lines D3 and D4 and switch set SW2 will hereinafter being referred to as the "delay line/switch set" arrangement.

The top rail output K of the switch set SW2 and the bottom rail at M are connected to a third pseudo-butterfly arrangement comprising registers R9-R12 and only one adder S7. Register R9, adder S7 and register R11 being associated with information flow of the top rail wherein the outputs of R9 and R10 are added in S7. The outputs N and P of registers R11 and R12, respectively, are coupled to a delay line D5, switch set SW3, and delay line D6 circuit arrangement similar to that of D3, SW2, and D4 except that the delay lines D5 and D6 are 4 clock pulse delay lines. The top R and bottom S rail outputs of the delay line/switch set circuit arrangement (D5-SW3-D6) are coupled to a fourth butterfly circuit arrangement comprising registers R13-R16 and adders S8 and S9 wherein R13, S8, and R15 are associated with information flow on the top rail and R14, S9 and R16 are associated with information flow on the bottom rail, with the adder S9 performing the 2's complement subtraction. The outputs T and U (rounded off) from the registers R15 and R16, respectively, are coupled to another delay line/switch set circuit arrangement comprising the circuit elements D7, SW4 and D8 wherein delay lines D7 and D8 are 8 clock pulse delay lines. In addition, the top rail output of SW4 is connected to position 1 of a SPDT switch SW5 having its position 2 connected to ground potential. The pole connection of switch SW5 and the output of D8 are denoted as W and X which are points residing on the top and bottom rails, respectively, of the 30 point pipeline processor.

Referring to FIG. 8B, the top and bottom rails of the pipeline processor at W and X are coupled to a fifth butterfly circuit arrangement comprising registers R17-R20 and adders S10 and S11 wherein R17, S10 and R19 are associated with information flow of the top rail and R18, S11 and R20 are associated with information flow of the bottom rail, the adder S11 performing the 2's complement subtraction. The output Y of register R19 is coupled to the inputs of a register 21 and a 16 clock pulse delay line D9, the output of which is provided to another register R22. The output BB of register R22 is connected to position 2 of a SPDT switch SW6 having its position 1 connected to ground potential. An adder S12 has as its inputs the output AA of register R21 and the pole connection of SW6. The output CC of a register 23, which has as its input the output of adder S12, is coupled to the data inputs of two random access memory blocks RAM11 and RAM 12. Returning to register R20, the output Z thereof is rounded off by the adder unit S13 and coupled to the input of a register R24, the output of which is coupled to another register R25 in line therewith. The output DD of register R25 is connected to the data inputs of two random access memories RAM21 and RAM22.

The random access memories RAM11, RAM12, RAM21 and RAM22 may be used in the present embodiment to temporarily store the data points of the intermediate real and imaginary arrays computed from the input section of the 30 point transform. From the discussion on the scrambling of the elements of the real and imaginary intermediate data point array presented hereinabove in connection with Table 5, it is apparent that a number of the data points computed in the top rail of the pipeline processor at CC may have to be transferred to the bottom rail for pipeline computational reasons and likewise, a number of the data points computed in the bottom rail at DD may have to be transferred to the top rail. This is accomplished in the present embodiment (8B) by paralleling the data outputs of RAM11 and RAM22 at the input of a register 26 and similarly, paralleling the data outputs of RAM21 and RAM12 at the input of register 27. A programmed read only memory PROM1 provides the addressing commands for RAM11 and RAM22 in accordance with the scrambling pattern of data in and data out thereof. A counter unit CTR1 addresses the sequence to the PROM1 synchronously with the register and delay line operations of the pipeline. It is preferable that the clock rate of the counter be on the order of twice that of the registers and delay lines, for example, so that the RAM's 11 and 22 may be addressed to write in data from CC and read out data to the input of R26 within one clocking period of the pipeline processor. In a similar circuit arrangement, a PROM2 is coupled to the address inputs of RAM's 21 and 12, the PROMs having a counter unit CTR2 coupled thereto for the addressed sequencing thereof preferably at a double clocking rate as that of the pipeline processor. The shuffling operation performed by the PROM/RAM circuit arrangements will be more fully understood from the description of operation provided hereinbelow.

In the present 2-rail pipeline processor embodiment, only 2 multiplier units MU1 and M2U are provided to perform the operation of the middle or intermediate section of the 30 point transform. Multiplier MU1 which may be associated with signal flow processing of the top rail may have as one input, the output of register R26, and as another input, the data output of a programmed read only memory PROM3 may have programmed therein, the multiplication constant corresponding to the sequence of the scrambled intermediate data points read from the RAM's 11 and 22 through R26. Sequencing of PROM3 may be accomplished by the counter unit CTR3 which is advanced, preferably, synchronous to the clocking of the pipeline processor. Similarly, MU2 may be associated with the signal flow processing of the bottom rail and may be as its inputs, the output of register R27 and the data output of another programmed read only memory PROM4 which may have programmed therein the multiplication constants corresponding to the sequence of the scrambled intermediate data points read from RAM's 12 and 21 through R27. Counter unit CTR4 sequences PROM4, preferably, synchronously with PROM3. The outputs EE and FF from the multiplier units MU1 and MU2, respectively, correspond to the signal flow of the data array which is the input to the output section of the 30 point transform as shown in FIGS. 5B and 6B.

The remaining schematic diagram of FIGS. 8B and 8C of the pipeline processor is directed to the computational stages of the output section of the 30 point transform. Starting with the top rail at EE, the output of MU1 through R26 is coupled to one input of an adder unit S14 and to position 2 of a SPDT switch SW8. The other input to the adder unit S14 is provided from the pole of another SPDT switch SW7, the position 1 of which is at ground potential. An output of S14 is provided to a first of two cascadedly coupled 4 clock pulse delay lines D10 and D11, the output of the combination being denoted as GG. Continuing on at the bottom rail at FF, the output of MU2 through R27 is connected to position 2 of SW7, position 1 of SW8, the input of an inverter unit I1, the input to a 2 clock pulse delay line D12, and position 1 of a SPDT switch SW10. In addition, the delay line D12 is cascadedly coupled to a 4 clock pulse delay line D13 with the interconnection therebetween being coupled to a position 2 of a single pole four position throw switch SW9. The other positions 1, 3 and 4 of SW9 are respectively connected to the point GG of the top rail, the output of D13, and the interconnection between D10 and D11. In the top rail, an adder unit S15 has connected to its inputs, the point GG and the pole of SW8, and provides the signal line HH at its output. In the bottom rail, an adder unit S16 has as its inputs, the output of I1 and the pole position of SW9, and provides a signal line which is coupled to position 2 of SW10, the pole position thereof being denoted as II.

Referring to FIG. 8C, the signal lines HH and II are provided to the input of registers R28 and R29, respectively, the output of R25 being rounded off by the adder unit S17. The output JJ of register R28 and the rounded off output of R29 are coupled to a delay line/switch set arrangement similar to the ones described in connection with the input section of the pipeline processor (FIG. 8A), including two 8 clock pulse delay lines D14 and D15 and switch set SW11. The top rail LL and bottom rail MM outputs of the aforementioned circuit arrangement are coupled to a sixth butterfly circuit arrangement comprising registers R30 and R32 and adder S18 associated with the signal flow of the top rail, and registers R31 and R33 and adder S19 associated with the signal flow of the bottom rail. In this sixth butterfly circuit arrangement, a SPDT switch SW12 is disposed between R31 and S18 and S19 with position 1 thereof coupled to the output of R31, position 2 thereof connected to ground potential and the pole position thereof coupled to the inputs of the adder units S18 and S19. Adder S19 is the 2's complement subtractor. Another adder unit S20 is disposed at the output PP of R33 for digital round off purposes. The top rail at NN and bottom rail at PP are then coupled to another delay line/switch set circuit arrangement comprising two 4 clock pulse delay lines D16 and D17 and switch set 13. The top and bottom rail outputs RR and SS, respectively, of the aformentioned circuit arrangement are coupled to a pseudo-butterfly circuit arrangement including registers R34 and R36 and adder S21 in line with the signal flow of the top rail and R35 and R37 in line with the signal flow of the bottom rail. There is no adder unit between R35 and R37 in the bottom rail, but another SPDT switch SW14 is disposed therebetween in the bottom rail with position 1 coupled to the data output of R35, position 2 connected to ground potential and the pole position coupled to the inputs of S21 and R37. The top rail TT and bottom rail UU outputs are submitted to still another delay line/switch set circuit arrangement including two 2 clock pulse delay lines D18 and D19 and switch set SW15, the top and bottom rail outputs of which being denoted as WW and XX, respectively. Immediately downstream of WW and XX in the pipeline is the final butterfly circuit arrangement comprising R38, S22 and R40 in line with the signal flow of the top rail and R39, S23 and R41 in line with the signal flow of the bottom rail, the output of R41 being rounded off by an adder unit S24. The top YY and bottom ZZ rail outputs of the final butterfly arrangement are coupled to two registers R42 and R43 to yield at their outputs pipeline rail points YYY and ZZZ, respectively.

While the preceding description of the embodiment of FIGS. 8A, 8B, and 8C has been directed to digital circuit elements, it is understood by those skilled in the pertinent art that certain appropriately applied analog or linear circuit elements may be used in place of their digital counterparts without deviating from the functional relationships therebetween. In addition, all of the holding registers and delay lines of the embodiment, may be updated and signals transferred synchronously with the clocking times of the pipeline processor. Likewise, the switch sets SW1-SW5 may be operated to transfer between switch states at times corresponding to the same clocking times of the pipeline. This will become more apparent from the description of operation found herebelow.

TABLE 6A

| TIME | A | B | C | D | E | F | G | H | I | J | K | L | M | N | P | Q | R | S | T | U | V | W | X | Y | Z | AA | BB | CC | DD | SW6 | SW5 | SW4 | SW3 | SW2 | SW1 |
|---|---|---|---|---|---|---|---|---|---|---|---|---|---|---|---|---|---|---|---|---|---|---|---|---|---|---|---|---|---|---|---|---|---|---|---|
| 0 | a26 | a11 | | | | | | | | | | | | | | | | | | | | | | | | | | | | | | | | | |
| 1 | a16 | a1 | | | | | | | | | | | | | | | | | | | | | | | | | | | | | | | | | |
| 2 | a6 | a21 | 2 | | | | 2 | | | | | | | | | | | | | | | | | | | | | | | | | | | | |
| 3 | X | X | 4 | 3 | | | 3 | | | | | | | | | | | | | | | | | | | | | | | | | | | | |
| 4 | a8 | a23 | 0 | 5 | 4 | | 0 | | | | | | | | | | | | | | | | | | | | | | | | | | | | |
| 5 | a28 | a13 | X | 1 | 5 | 5 | −1 | | | | | | | | | | | | | | | | | | | | | | | | | | | | |
| 6 | a18 | a3 | 8 | X | X | X | 8 | 32 | 34 | | 32 | | | | | | | | | | | | | | | | | | | | | | | | |
| 7 | X | X | 10 | 9 | X | X | 9 | 33 | 35 | 30 | 33 | | | | | | | | | | | | | | | | | | | | | | | | |
| 8 | a2 | a17 | 6 | 11 | 10 | X | 6 | 30 | 30 | 31 | 34 | 32 | | | | | | | | | | | | | | | | | | | | | | | |
| 9 | a22 | a7 | X | X | 11 | X | 7 | 31 | 31 | 30 | 35 | 33 | 60 | | | | | | | | | | | | | | | | | | | | | | |
| 10 | a12 | a27 | X | 7 | X | X | 14 | 38 | 40 | 36 | 38 | 34 | 61 | | | | | | | | | | | | | | | | | | | | | | |
| 11 | X | X | 14 | 15 | X | X | 15 | 39 | 41 | 37 | 39 | 35 | * | 66 | 62 | | | | | | | | | | | | | | | | | | | | |
| 12 | a4 | a29 | 16 | 17 | 16 | X | 12 | 36 | 36 | 36 | 36 | 38 | 66 | 67 | 63 | | 60 | | | | | | | | | | | | | | | | | | |
| 13 | a24 | a19 | 12 | 13 | 17 | X | 13 | 37 | 37 | 37 | 37 | 39 | 67 | * | 64 | | 61 | | | | | | | | | | | | | | | | | | |
| 14 | X | X | 20 | X | 13 | X | 20 | 44 | 46 | 42 | 42 | 41 | * | 72 | 68 | 66 | * | | | | | | | | | | | | | | | | | | |
| 15 | a14 | a9 | 22 | 21 | X | X | 21 | 45 | 47 | 43 | 43 | 44 | 72 | 73 | 69 | 67 | 62 | | | | | | | | | | | | | | | | | | |
| 16 | a20 | a25 | 18 | 19 | 23 | X | 18 | 42 | 42 | 42 | 42 | 45 | 73 | * | 70 | * | 63 | | | | | | | | | | | | | | | | | | |
| 17 | a10 | a25 | X | X | 19 | X | 19 | 43 | 43 | 43 | 43 | 46 | * | 78 | 74 | 68 | 64 | | | | | | | | | | | | | | | | | | |
| 18 | a0 | a15 | 26 | 27 | X | X | 24 | 50 | 52 | 48 | 48 | 47 | 78 | 79 | 75 | 69 | 65 | 90 | | | | | | | | | | | | | | | | | |
| 19 | X | X | 28 | 29 | 25 | X | 25 | 51 | 53 | 49 | 49 | 50 | 79 | * | 76 | 70 | 72 | 91 | | | | | | | | | | | | | | | | | |
| 20 | X | X | 24 | 29 | 25 | X | 26 | 48 | 49 | 48 | 48 | 51 | * | 82 | 77 | 71 | * | 92 | 96 | | | | | | | | | | | | | | | | |
| 21 | X | X | X | 25 | X | X | 27 | 49 | 49 | 49 | 49 | 52 | 80 | 83 | 78 | 74 | * | 93 | 97 | | | | | | | | | | | | | | | | |
| 22 | X | X | X | X | X | X | 24 | 56 | 58 | 54 | 54 | 53 | 81 | * | 79 | 75 | 73 | 94 | * | 98 | | | | | | | | | | | | | | | |
| 23 | X | X | X | X | X | X | 25 | 57 | 59 | 55 | 55 | 56 | 84 | 86 | 80 | 76 | * | 95 | 99 | * | | | | | | | | | | | | | | | |
| 24 | X | X | X | X | X | X | X | 54 | 55 | 54 | 54 | 57 | X | X | X | 77 | 80 | 102 | 100 | 96 | 90 | | | | | | | | | | | | | | |
| 25 | X | X | X | X | X | X | X | X | X | X | X | 58 | X | X | X | X | X | 103 | 108 | 101 | 91 | | | | | | | | | | | | | | |

TABLE 6B

| TIME | A | B | C | D | E | F | G | H | I | J | K | L | M | N | P | Q | R | S | T | U | V | W | X | Y | Z' | AA | BB | CC | DD | SW6 | SW5 | SW4 | SW3 | SW2 | SW1 |
|---|---|---|---|---|---|---|---|---|---|---|---|---|---|---|---|---|---|---|---|---|---|---|---|---|---|---|---|---|---|---|---|---|---|---|---|
| 26 |   |   |   |   | x | x | x | x | x | 55 | 55 | x | x | 59 | 85 | 81 | 81 | 75 |   |   |   |   |   |   |   |   |   |   |   |   |   |   |   |   | 1 |
| 27 |   |   |   |   |   | x | x | x | x | x | x | x | x | * | 87 | 82 | 82 | 76 |   |   |   |   |   |   |   |   |   |   |   |   |   |   |   | 1 |   |
| 28 |   |   |   |   |   |   | x | x | x | x | x | x | x | 89 | 88 | 83 | 83 | 77 |   |   |   |   |   |   |   |   |   |   |   |   |   |   | 1 | 2 |   |
| 29 |   |   |   |   |   |   |   | x |   | x | x | x | * | x | x | 86 | x | 84 | 104 | 110 | 98 | 104 | 92 | 121 | 133 | 120 |   | 150 | 162 | 1 |   |   | 1 | 2 |   |
| 30 |   |   |   |   |   |   |   |   |   | x | x | * | x | x | x | 87 | x | 85 | 105 | 111 | 99 | 105 | 93 | * | * | 121 |   | 151 | 163 | 1 | 1 | 2 | 2 | 1 |   |
| 31 |   |   |   |   |   |   |   |   |   |   | x | x | * | x | x | 88 | x | * | 106 | 112 | 100 | 106 | 94 | 122 | 134 | * |   | * | * | 1 | 1 | 2 | 2 |   |   |
| 32 |   |   |   |   |   |   |   |   |   |   | x | x | x |   | x | 89 | x | * | 107 | 113 | 101 | 107 | 95 | 123 | 135 | 122 |   | 152 | 164 | 1 | 1 | 2 | 2 |   |   |
| 33 |   |   |   |   |   |   |   |   |   |   |   |   | x | x | x | x | x | 86 | 114 | 114 | 108 | 108 | 96 | 124 | 136 | 123 |   | 153 | 165 | 1 | 1 | 1 | 2 |   |   |
| 34 |   |   |   |   |   |   |   |   |   |   |   |   |   |   | x | x | x | 87 | 115 | 115 | 109 | 109 | 97 | 125 | 137 | 124 |   | 154 | 166 | 1 | 1 | 1 | 2 |   |   |
| 35 |   |   |   |   |   |   |   |   |   |   |   |   |   |   |   | x | x | * | * | * | * | * | * | 138 | 126 | 125 |   | 155 | 167 | 1 | 1 | 1 | 1 |   |   |
| 36 |   |   |   |   |   |   |   |   |   |   |   |   |   |   |   |   | x | 88 | * | * | * | * | * | 139 | 127 | * |   | 168 | 156 | 1 | 1 | 1 | 1 |   |   |
| 37 |   |   |   |   |   |   |   |   |   |   |   |   |   |   |   |   | x | 89 |   |   |   |   |   |   |   |   |   | 169 | 157 | 1 | 1 | 1 |   |   |   |
| 38 |   |   |   |   |   |   |   |   |   |   |   |   |   |   |   |   |   |   | 116 | 116 | 110 | 110 | 98 | 140 | 128 | 140 |   | * | * | 1 | 1 | 1 |   |   |   |
| 39 |   |   |   |   |   |   |   |   |   |   |   |   |   |   |   |   |   |   | 117 | 117 | 111 | 111 | 99 | 141 | 129 | 141 |   | 170 | 158 | 1 | 1 | 1 |   |   |   |
| 40 |   |   |   |   |   |   |   |   |   |   |   |   |   |   |   |   |   |   | 118 | 118 | 112 | 112 | 100 | 142 | 130 | 142 |   | 171 | 159 | 1 | 1 | 1 |   |   |   |
| 41 |   |   |   |   |   |   |   |   |   |   |   |   |   |   |   |   |   |   | 119 | 119 | 113 | 113 | 101 | 143 | 131 | 143 |   | 172 | 160 | 1 | 1 | 2 |   |   |   |
| 42 |   |   |   |   |   |   |   |   |   |   |   |   |   |   |   |   |   |   |   |   | 114 | x | 114 | 144 | 144 | 144 |   | 173 | 161 | 1 | 2 | 2 |   |   |   |
| 43 |   |   |   |   |   |   |   |   |   |   |   |   |   |   |   |   |   |   |   |   | 115 | x | 115 | 145 | 145 | 145 | 120 | 174 | 144 | 2 | 2 | 2 |   |   |   |
| 44 |   |   |   |   |   |   |   |   |   |   |   |   |   |   |   |   |   |   |   |   | * | x |   |   |   |   | 121 | 175 | 145 | 2 | 2 | 2 |   |   |   |
| 45 |   |   |   |   |   |   |   |   |   |   |   |   |   |   |   |   |   |   |   |   | 116 | x | 116 | 146 | 146 | 146 | * | * | * | 2 | 2 | 2 |   |   |   |
| 46 |   |   |   |   |   |   |   |   |   |   |   |   |   |   |   |   |   |   |   |   | 117 | x | 117 | 147 | 147 | 147 | 122 | 176 | 146 | 2 | 2 | 2 |   |   |   |
| 47 |   |   |   |   |   |   |   |   |   |   |   |   |   |   |   |   |   |   |   |   | 118 | x | 118 | 148 | 148 | 148 | 123 | 177 | 147 | 2 | 2 | 2 |   |   |   |
| 48 |   |   |   |   |   |   |   |   |   |   |   |   |   |   |   |   |   |   |   |   | 119 | x | 119 | 149 | 149 | 149 | 124 | 178 | 148 | 2 | 2 | 2 |   |   |   |
| 49 |   |   |   |   |   |   |   |   |   |   |   |   |   |   |   |   |   |   |   |   |   |   |   |   |   |   | 125 | 179 | 149 | 2 | 2 | 2 |   |   |   |
| 50 |   |   |   |   |   |   |   |   |   |   |   |   |   |   |   |   |   |   |   |   |   |   |   |   |   |   |   |   |   | 1 |   |   |   |   |   |

The signal flow time table shown in Tables 6A and 6B hereabove will be used in conjunction with the embodiment shown in FIGS. 8A and 8B to describe the operation of the input section of the 30-point transform pipe line processor, the signal flow graph of which is shown in FIGS. 5A and 6A. The following description will be for either a real or an imaginary input data point array, since they are operated on independently and similarly by the pipe line processor. The input data points are sequentially presented to the embodiment in predetermined ordered pairs. Referring to Table 6A at time T0, the first order pair includes a26 and a11 presented at nodes A and B, respectively. At the next clock pulse at time T1, a26 and a11 are strobed into the registers R1 and R2 and are operated on by the first butterfly section wherein a11 is subtracted from a26 in S2, the result being presented to R4, and a11 is added to a26 in S1, the result being presented to R3. Concurrently at T1, input data points a16 and a1 are presented at nodes A and B, respectively.

At the next pipeline clocking pulse T2, the results denoted as 2 and 3 of the first butterfly section are strobed into registers R3 and R4 appearing at nodes C and D, respectively. Simultaneously, data points a16 and a1 are strobed into registers R1 and R2 and in accordance with the preordered input pattern data points a6 and a21 are presented to registers R1 and R2. During the clocking pulse period T2, the switch SW1 is in position 1 permitting the data point 2 which is at node C in the processor to be presented to the delay line D2. Note also that data point 3 which is at node D in the processor is rounded off and presented to the delay line D1. At the next clock pulse T3, the data point 2 appears at node G in the processor, data point 3 appears at node E in the processor and since switch SW1 is operated to position 2 at time T3, the data point 3 is also presented to the delay line D2, and the results denoted as data points 4 and 5 from the output of the first butterfly section operating on data points a16 and a1 appear at processor nodes C and D, respectively. Also note that since switch SW1 is in position 2, the data point 4 is also presented to register R5 at node F. Concurrently with time T3, two zeros are presented to the input nodes A and B, denoted by X's in the Tables 6A and 6B.

At the next clock pulse T4, the switch SW1 is in position 1, data point 5 which was previously located at D in the processor is passed through the delay line D1 and appears at both E and F in the processor. Similarly, data point 3 which was at node E in the processor is passed through delay line D2 and appears at node G in the processor. The results 0 and 1 from the first butterfly section operating on data points a6 and a21 appear at nodes C and D, respectively. Concurrently, data points a8 and a23 are presented to the input nodes A and B. With the next clock pulse T5, switch SW1 is operated to position 2 and switch SW2 is operated to position 1. At T5, the results enumerated 32 and 34 of the second butterfly section, which operates on data points 2 and 4, appear at H and I in the processor. Likewise, data point 0 which has passed through delay line D2 appears at flow point G in the processor. Accordingly data point 1 which was at flow point D has passed through the delay line D1 and now appears at node E in the processor. The results of the first butterfly section, which are two zeros, appear at nodes C and D. Note that because of the positions of the switches SW1 and SW2, the zero information at flow point C is also at flow point F and the data point 32 which is at flow point H also appears at flow point L in the processor. Also at clock pulse T5, another ordered pair a28 and a13 of the input data point array is presented to the input nodes A and B, respectively.

Subsequently, clock pulse T6 provides the resultant data points 33 and 35 of the operation of the second butterfly section on data points 5 and 3 to flow points H and I of the processor. Since switch SW2 remains in position 1, data point 33 is also at flow point L in the processor. Due to the prior position of switch SW1, the data point 1 which was at flow point E has passed through the delay line D2 and now appears at flow point G. Likewise, the zero reading previously at node D passes through delay line D1 and now appears at point E and because of the present position of switch SW1, the zero information additionally appears at flow point F in the processor. Also at T6, the results data point 8 and 9 of the operation of the first butterfly section on input data points a8 and a23 appear at flow points C and D, respectively and as before, input data points a18 and a3 are the next ordered pair presented at A and B. With clock pulse T7, the data point 32 which has passed through delay line D4 now appears at flow point M and data point 34 which has passed through delay line D3 now appears at flow point J and since switch SW2 has been operated to position 2, data point 34 also appears at flow point L in the processor. The results of the second butterfly section which is data point 30 appears at the flow points H and I. Also the results of the first butterfly section which are data points 10 and 11 appear at C and D. Due to the positions of switches SW1 and SW2, the data point 10 also appears at flow point F and data point 30 also appears at flow point K. In a similar manner as before, the data point 9 passes through delay line D1 and now appears at flow point E and data point 8 passes through delay line D2 and now appears at flow point G in the processor. Also at time T7, zero information is again presented to input nodes A and B.

It is evident from the preceding description that the intermediate data point information is being processed either in the butterfly sections or in the delay lines between the clock pulses and likewise at the time of the clock pulses, the information is strobed into the intercoupling stage registers noted as Rx to be operated on again during the succeeding clock pulse.

Continuing with the operation then, at clock pulse T8 the data point 33 which was at flow point L and has been passed through delay line D4 now appears at flow point M, and likewise data point 35 which was at flow point I has been passed through delay line D3 and now appears at flow point J. Due to the positioning of switch SW2, the data point 35 also appears at flow point L. The results data point 31 of the second butterfly section now appear at points H and I, and similarly, due to the positioning of switch SW2, the data point 31 at H also appears at the flow point K. As before, the data point 9 at flow point E is passed through delay line D2 and now appears at flow point G. Also, the data point 11 which was at D has been passed through line D1 and now appears at E and because of the positioning of switch SW1, also appears at flow point F. Furthermore, at clock pulse T8 the results, data points 6 and 7, from the operation of the first butterfly section on the input data points a18 and a3 appear at flow points C and D and the next ordered pair of input data points a2 and a17 are presented to the input nodes A and B.

At the next clock pulse T9, the results, data points 60 and 62, of the operation of the third pseudo-butterfly section operating on data points 30 and 32 appear at flow points N and P, respectively. Data point 34 is passed through delay line D4 and now appears at flow point M; and likewise, data point 30 flows through delay line D3 and now appears at point J and due to the positioning of switch SW2, also appears at flow point K. In addition, the results, data points 38 and 40, of the second butterfly section operating on data points 10 and 8 appear at flow points H and I of the processor. Data point 38 at flow point H also appears at flow point L because of the positioning of switch SW2. Data point 7 is transferred to flow point E through delay line D1 and data point 6 is transferred to flow point G through delay line D2 taking advantage of the appropriate positioning of switch SW1. Zero information appears at the flow points C, D, and F. The input data points which are presented to A and B at time T9 are a22 and a7.

The next clock pulse T10 provides the results, 61 and 63, from the operation of the third pseudo-butterfly section to points N and P, respectively. Concurrently, data point 35 is provided at flow point M through delay line D4 and likewise data point 31 appears at J and K from the delay line D3 and due to the positioning of switch SW2. The results, data points 39 and 41, from the operation of the second butterfly section on data points 11 and 9 appear at flow points H and I, respectively. Data point 39 also appears at L through switch SW2. Zero information appears at E and F provided by the delay line D1 and according to the positioning of switch SW1. Data point 7 appears at flow point G through delay line D2. The results, 14 and 15, of the operation of the first butterfly section on input data points a2 and a17 are present at flow points C and D and the next ordered pair of input data points are a12 and a27. At the next clock pulse T11, the results of the third pseudo-butterfly section appear at flow points N and P, the asterisk being representative of a computed value which is not significant to the 30-point transform processing. The data point 38 which has passed through delay line D4 now appears at flow point M and likewise the data point 40 which has passed through delay line D3 now appears at flow point J and L. According to the positioning of switch SW2, the result 36 of the second butterfly section appears at both flow points H and I and also at flow point K due to the position of switch SW2. Data points 15 and 14 appeaq at flow points E and G through their respective delay lines and the results, 16 and 17, of the first butterfly section operating on the data inputs a22 and a7 appear at C and D. Note that flow point C and flow point F are tied together because of the positioning of switch SW1 at T11. During the clock pulse T11 zero information is presented to the input points A and B.

Continuing at clock pulse, T12, the results, * and 65, of the third pseudo-butterfly section appears at the flow points N and P, the asterisk again denoting an insignificant computed value. The data point 39 having passed through delay line D4 now appears at point M and similarly the data point 41 having passed through delay line D3 now appears at points J and L in accordance with the position of switch SW2. The result 37 of the second butterfly section operating on data point 7 appears at H and I and also is provided to flow point K through switch SW2. Data points 17 and 15 are provided to flow points E and G through their respective delay lines, data point 17 also appearing at flow point F through the positioning of switch SW1. The results, data points 12 and 13, from the first butterfly section operating on input data points a12 and a27 appear at C and D. And at the same time, input data points a14 and a29 are presented to input flow points A and B, respectively.

In the preceding operational description above, predetermined order pairs of input data points were presented to flow points A and B during consecutive pipeline processor clock pulses. This will continue to occur until the clock pulse T18. Thereafter, from T19 until T23 zero information will be presented to the input flow points A and B. Similarly, the preceding operational description illustrated how the butterfly sections process their input information between clock pulses and how this process information was transferred to their respective flow points on the top and bottom rails at the time of the next clock pulse. Also described was how the processed information was delayed through the delay lines and transferred between the top and bottom rails according to the position of the switch sets. For example, the results of the processing of the first butterfly stage was provided to the flow points C and D and the transferring of this information between the top and bottom rails occurred at switch set SW1 and delay lines D1 and D2 provided for the required delays on the bottom rails. Similarly, the results of the second butterfly section were provided to flow points H and I, the switch set SW2 afforded the transfer between the rails, and the delay lines D3 and D4 provided the required information delays. Likewise, the outputs of the pseudo-butterfly section occur at flow points N and P, the transfer of information between rails is effected by switch set SW3, and the appropriate delays are implemented with the delay lines D5 and D6 accordingly.

Insomuch as the parallel processing of the butterfly sections will continue consistently with that which has already been described causing the signal flow information to propagate through the pipeline processor as shown by the signal flow Tables 6A and 6B, it will not be necessary to describe the operation thereof in as great a detail as that which has been presented hereabove. It may, however, be worthwhile to describe the operation of the embodiment downstream of the fifth butterfly section starting with say loading registers R19 and R20. The architecture of that portion of the top rail from flow point Y to flow point CC appears a bit unusual and not consistent with the foregoing description of operation.

Referring now to FIG. 8B and the signal flow Tables 6A and 6B, the first intermediate data points appearing at flow points Y and Z are 120 and 132 which occur at clock pulse T25. On the bottom rail, it is apparent that the data points at Z will subsequently flow to DD in two clock pulse periods through registers R24 and R25. This is clearly illustrated in the signal flow table wherein data point 132 is at Z at the clock pulse T25 and its equivalent data point 162 appears at DD at clock pulse T27; and once again, data point 133 appears at Z at time T26 and two clock pulses later data point 163 which is equivalent thereto, appears at flow point DD at time T28. This procedural operation continues during the subsequent consecutive clock pulses for the signals 134, 135, 136, 137, 126, 127, 128, 129, 130, 131, 144, 145, 146, 147, 148 and 149 which appear at flow point Z during the clock pulses until time T48. Accordingly, after incurring a 2-clock pulse delay through registers R24 and R25 their equivalents 164, 165, 166, 167, 156, 157, 158, 159, 160, 161, 144, 145, 146, 147, 148, and 149 respectively appear at the flow point DD up until time T50.

Referring next to the top rail portion of the embodiment starting at flow point Y, the data points which appear at Y then appear at flow point AA delayed by 1 clock pulse through register R21. The switch SW6 is maintained in position one from clock pulse T25 until clock pulse T42 at which time it is transferred to position two. It is clear that between the clock pulses T25 and T42, the intermediate data point information appearing at Y will pass through the register R21 and R23 to appear at flow point CC delayed by two clock pulses. The adder unit S12 is rendered to just pass signal information therethrough during this time period T25 to T42 because the other summing input is effectively at zero potential effected by SW6. The signal flow table 6B clearly illustrates this phenomena. For example, the data point 120 occurring at Y at time T25 has its equivalent data point 150 occurring at CC two clock pulses later at time T27. Likewise, data point 121 occurring at flow point Y at time T26 subsequently occurs at flow point CC at T28. This process continues until clock pulse T40 where at data point 143 appears at flow point Y, and subsequently its equivalent flow point 173 appears at flow point CC at clock pulse T42. Thereafter, as shown in the signal flow graph of FIG. 5A there is no direct equivalent data point for the intermediate points 144 through 149. A summation is required to compute the output points 174 through 179 of the input section of the 30-point transform. To accomplish this, switch SW6 is transferred to position 2 at clock pulse T42 just at the time that the data point 144 is appearing at flow point AA. Occurring in the background, the data points appearing at the flow point Y starting at time T25 were being delayed through the 16 clock pulse delay line at D9 and the holding register R22. Thus, 17 clock pulses later at T42 the data point 120 appears at the flow point BB to be added in the adder unit S12 to the data point 144 which appears at AA concurrently therewith. The result 174 is transferred to the flow point CC at the next clock pulse T43. These summations continue to be performed by the adder unit S12 for the output data points 175 through 179 over the subsequent 7 clock pulse periods. The final output data points being presented to the flow points CC and DD occur at clock pulse T50. The asterisks being presented in the signal flow table of 6A and 6B are indicative of insignificant information which is being computed by the pipeline processor of the 30-point transform.

The output data points 150 through 179 computed through the input section of the 30-point transform resulting from one of the two input data point arrays, real or imaginary, appear at the flow points CC and DD from clock pulse times T27 through T50. It is understood that the second of the data input arrays will be presented at flow points A and B in similar predetermined ordered pairs during the clock pulses starting at T24 and ending at T47, for example. The processing of this data input array information will occur in a similar manner as that described above in connection with the first input data point array. The output data points 150 through 179 resulting from the second of the data input arrays computed through the input section of the 30-point transform will start appearing at the flow points CC and DD at about the clock pulse T51 and continue appearing in a similar order as that of the first output array as shown in the signal flow table of 6B ending at approximately the clock pulse T74.

The random access memories RAM's 11, 22, 21, 12 may have for the present embodiment approximately 120 addressable memory locations starting from 0, for example, and consecutively enumerated to 119 as may be the case. Data point information is sequentially entered into the locations of RAM's 11 and 12 from flow point CC and into RAM's 21 and 22 from flow point DD corresponding to the clock pulses of the pipeline processor. It is understood that at least one complete set of real and imaginary data point arrays 150R-179R and 150I-179I be entered into the RAM's before any data points may be read out from the RAM's to the registers R26 and R27 at the top and bottom rails of the pipeline processor, respectively. A counter/programmable-read-only-memory combination is used in the present embodiment to write information into the RAM's and to read information therefrom permitting information transfer between rails at this point. For RAM's 11 and 22 the counter CTR 1 and PROM 1 are used for addressing purposes and similarly, the counter CTR 2 and PROM 2 are used for addressing the RAM's 21 and 12.

In a typical operation, the real output data array from the input section of the 30-point transform, that is 150R-179R may be written into a first block of 24 locations, for example locations addresses as 0-23, of the RAM's during the clock pulses T28 through T51 and likewise, the second output data array 150I-179I may be written into another block of 24 RAM locations at say locations addressed as 32-55, for example, during the processor clock pulses T52 through T75. The writing of data into the RAM's may be accomplished by the programmed pattern of the PROM's 1 and 2 and associated counters which may be operative with a 2-phase clock corresponding to each clock pulse of the pipeline processor. More particularly, during the first phase of the clock pulse period, data may be written into the RAM's in the registers designated by the programmed address of the PROM's and during the second phase of the same clock pulse period for example, data may be accessed from the registers designated by the programmed address of the PROM's. So during the writing in of a second set of real data point information 150R'-179R' into RAM locations, say 64-87, for example, the first composite array of data points as shown in Table 5 may be accessed from the RAM locations 0-55 in a predetermined order in accordance with their appropriate presentation to the multiplication units MU1 and MU2 through the registers R26 and R27, respectively. This may be performed during the clock pulse times T76 through T99, for example. Subsequently, as the second set of imaginary data points 150I'-179I' are written into the RAM's, preferably in locations enumerated 96-119, utilizing the first phase of the clock pulse periods 100-123, for example, the elements of the second composite array as shown in Table 5 may be read from the RAM locations 0-55 in a predetermined order in accordance with how the data is to be presented to the multiplier units MU1 and MU2. After the second set of data points 150R'-179R' and 150I'-179I' are entered into the RAM locations 64 through 119, then a third set of data points may be entered into the RAM locations 0 through 55 and the first and second composite array data information from the second set of output data points 150R'-179R' and 150I'-179I' may be read from the RAM locations 64 through 119 in the same fashion as that described for the first set hereabove. This process of writing into the RAM's each new real and imaginary input data point array set and during the same clock pulse, shuffling out the elements of the first and second composite arrays as shown in Table 5 will be better understood from the more detailed description provided in the subsequent paragraphs.

A representative pattern for shuffling out the first composite array from the RAM's 11, 12, 21, and 22 during the clock pulses T76 through T99, for example concurrent with the next set of real output data points 150R'-179R' being written into the memory locations 64-87 in accordance with the order in which they appear at flow points CC and DD (refer to Table 6B for more details) is shown in Table 7A herebelow. For example, at the clock pulse T76, during the first phase thereof, data point 150R' is written into memory location 64 of the RAM's 11 and 12 from the flow point CC and concurrently, data point 162R' is written into memory location 64 of RAM's 21 and 22 from the pipeline flow point DD. Then, during the second phase of the clock pulse T76, a previously stored data point 150R is read from RAM 11 at memory location 0 and presented to the input of the register R26. At the same time, data point 174R is read from the memory location 16 of the RAM 12 and presented to the input of the register R27. In the first phase of the succeeding clock pulse T77, the data points 151R' and 163R' are simultaneously written into location 65 of the combination of RAM's 11 and 12 and the combination of RAM's 21 and 22, respectively.

During the time of the second phase of clock pulse T77, the data point 151R is accessed from location one of RAM 11 and presented to the register R26 and the data point 150R is transferred to the output of the register R26. At the same time, the data point 175R is read from the location 17 of the RAM 12 and presented to register R27. The previously accessed data point 174R is transferred to the output of the register R27. Data points 150R and 174R are now ready for multiplication by the units MU1 and MU2, respectively. This procedure for reading in the sets of data from the flow points CC and DD into the RAM's and shuffling out the first composite array as shown in Table 5 will continue as shown in Table 7A until the clock pulse T99.

Similarly, an example illustrating the order in which the second composite array is shuffled from the RAM's 11, 12, 11, and 22 during the clock pulse time from T100 to T123 when the data point set 150I'-179I' is being loaded into the memory locations 96-119 of their respective RAM's from the flow points CC and DD is shown in Table 7B. For example, during the first phase of the clock pulse at T100, the data points 150I' and 162I' are written into location 96 of the combination of RAM's 11 and 12 and the combination of RAM's 21 and 22, respectively. In the second phase of the clock pulse at T100 the previously loaded data point 150I is accessed from location 24 of the RAM 11 and presented to register R26 and simultaneously data point 174I is read

TABLE 7A

| | DATA IN | | RAM 11 | | RAM 12 | | RAM 21 | | RAM 22 | |
|---|---|---|---|---|---|---|---|---|---|---|
| TIME | RAM'S 11&12 | RAM'S 21&22 | LOC | DATA OUT | LOC | DATA OUT | LOC | DATA OUT | LOC | DATA OUT |
| 76 | 64 | 150R' | 162R' | 0 | 150R | 16 | 174R | | | | |
| 77 | 65 | 151R' | 163R' | 1 | 151R | 17 | 175R | | | | |
| 78 | 66 | * | * | 2 | * | 18 | * | | | | |
| 79 | 67 | * | * | 3 | * | 19 | * | | | | |
| 80 | 68 | 152R' | 164R' | 4 | 152R | 20 | 176R | | | | |
| 81 | 69 | 153R' | 165R' | 5 | 153R | 21 | 177R | | | | |
| 82 | 70 | 154R' | 166R' | 30 | 154I | 46 | 178I | | | | |
| 83 | 71 | 155R' | 167R' | 31 | 155I | 47 | 179I | | | | |
| 84 | 72 | 168R' | 156R' | | | | | 8 | 156R | 24 | 162I |
| 85 | 73 | 169R' | 157R' | | | | | 9 | 157R | 25 | 163I |
| 86 | 74 | * | * | | | | | 24 | 162I | 26 | * |
| 87 | 75 | * | * | | | | | 25 | 163I | 27 | * |
| 88 | 76 | 170R' | 158R' | | | | | 12 | 158R | 28 | 164I |
| 89 | 77 | 171R' | 159R' | | | | | 13 | 159R | 29 | 165I |
| 90 | 78 | 172R' | 160R' | | | | | 38 | 160I | 6 | 166R |
| 91 | 79 | 173R' | 161R' | | | | | 39 | 161I | 7 | 167R |
| 92 | 80 | 174R' | * | 32 | 168I | 32 | 168I | | | | |
| 93 | 81 | 175R' | * | 33 | 169I | 33 | 169I | | | | |
| 94 | 82 | * | * | | | | | 28 | 164I | 6 | 166R |
| 95 | 83 | * | * | | | | | 29 | 165I | 7 | 167R |
| 96 | 84 | 176R' | * | 36 | 170I | 36 | 170I | | | | |
| 97 | 85 | 177R' | * | 37 | 171I | 37 | 171I | | | | |
| 98 | 86 | 178R' | * | 14 | 172R | 14 | 172R | | | | |
| 99 | 87 | 179R' | * | 15 | 173R | 15 | 173R | | | | | from location 40 of the RAM 12 and presented to the input of the register R27.

TABLE 7B

| | DATA IN | | RAM 11 | | RAM 12 | | RAM 21 | | RAM 22 | |
|---|---|---|---|---|---|---|---|---|---|---|
| TIME | LOC | RAM'S 11&12 | RAM'S 21&22 | LOC | DATA OUT | LOC | DATA OUT | LOC | DATA OUT | LOC | DATA OUT |
| 100 | 96 | 150I' | 162I' | 24 | 150I | 40 | 174I | | | | |
| 101 | 97 | 151I' | 163I' | 25 | 151I | 41 | 175I | | | | |
| 102 | 98 | * | * | 26 | * | 42 | * | | | | |
| 103 | 99 | * | * | 27 | * | 43 | * | | | | |
| 104 | 100 | 152I' | 164I' | 28 | 152I | 44 | 176I | | | | |
| 105 | 101 | 153I' | 165I' | 29 | 153I | 45 | 177I | | | | |
| 106 | 102 | 154I' | 166I' | 6 | 154R | 22 | 178R | | | | |
| 107 | 103 | 155I' | 167I' | 7 | 155R | 23 | 179R | | | | |
| 108 | 104 | 168I' | 156I' | | | | | 32 | 156I | 0 | $\overline{162R}$ |

TABLE 7B-continued

| | DATA IN | | RAM 11 | | RAM 12 | | RAM 21 | | RAM 22 | |
|---|---|---|---|---|---|---|---|---|---|---|
| | RAM'S | RAM'S | | DATA | | DATA | | DATA | | DATA |
| TIME | LOC | 11&12 | 21&22 | LOC | OUT | LOC | OUT | LOC | OUT | LOC | OUT |
| 109 | 105 | 169I' | 157I' | | | | | 33 | 157I' | 1 | $\overline{163R}$ |
| 110 | 106 | * | * | | | | | 0 | 162R | 2 | * |
| 111 | 107 | * | * | | | | | 1 | 163R | 3 | * |
| 112 | 108 | 170I' | 158I' | | | | | 36 | 158I' | 4 | $\overline{164R}$ |
| 113 | 109 | 171I' | 159I' | | | | | 37 | 159I | 5 | $\overline{165R}$ |
| 114 | 110 | 172I' | 160I' | | | | | 14 | 160R | 30 | $\overline{166I}$ |
| 115 | 111 | 173I' | 161I' | | | | | 15 | 161R | 31 | $\overline{167I}$ |
| 116 | 112 | 174I' | * | 8 | $\overline{168R}$ | 8 | 168R | | | | |
| 117 | 113 | 175I' | * | 9 | $\overline{169R}$ | 9 | 169R | | | | |
| 118 | 114 | * | * | | | | | 4 | 164R | 30 | 166I |
| 119 | 115 | * | * | | | | | 5 | 165R | 31 | 167I |
| 120 | 116 | 176I' | * | 12 | $\overline{170R}$ | 12 | 170R | | | | |
| 121 | 117 | 177I' | * | 13 | $\overline{171R}$ | 13 | 171R | | | | |
| 122 | 118 | 178I' | * | 38 | $\overline{172I}$ | 38 | 172I | | | | |
| 123 | 119 | 179I' | * | 39 | $\overline{173I}$ | 39 | 173I | | | | |

NOTE:
The DATA OUT which is denoted with a bar indicates the data points which are multiplied by the additional multiplication factor, either $-K4/K3$ or $+K3/K4$.

In the first phase of the successive clock pulse at T101, the data point 151I' and 163I' is stored in memory location 97 of their appropriate RAM's as shown in Table 7B. Likewise, in the second phase of the clock pulse at T101, the previously entered data point 151I is read from memory location 25 of the RAM 11 and presented to the input of the register R26. The data point 150I is transferred to the output of the register R26 in preparation for multiplication by the unit MU1. Concurrently, the previously entered data point 175I is read from memory location 41 of the RAM 12 and presented to the input of the register R27. The data point 174I is transferred to the output of the register R27 to begin its multiplication process at MU2. This procedure for storing computed data from flow points CC and DD and shuffling out previously stored data from the RAM's will continue as shown in Table 7B until time T123. The process may be repetitive with all of the succeeding computed data point sets from the input section of the pipeline processor as described in connection with FIGS. 8A and 8B. The data points denoted by asterisks in Tables 7A and 7B are insignificant to the processing operations of the present embodiment.

Figure 9:
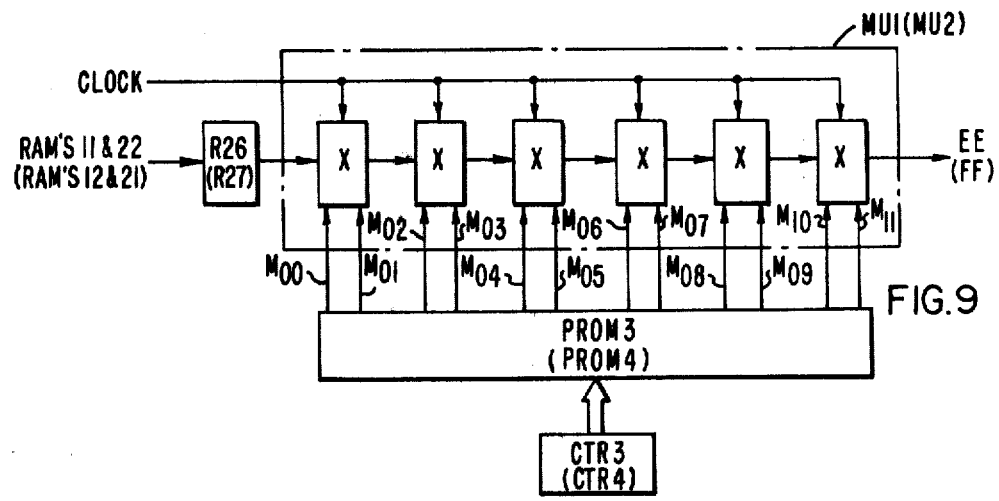
FIG. 9 is a simplified schematic block diagram of a digital multiplier suitable for use in the embodiment of FIGS. 8A, 8B and 8C.

The operations of the multiplication units MU1 and MU2 will be described in conjunction with FIG. 9 and Tables 8A and 8B. In FIG. 9, is shown a functional schematic of a conventional digital multiplier suitable for use in the embodiment of the pipeline processor as shown in FIG. 8B. The example shown in FIG. 9 comprises six digital multiplication stages for multiplying two 12-bit digital words utilizing a 2 bit by 4 bits 2's complement multiplication in each stage. The operational details of which are well known to anyone skilled in the pertinent art. Multiplication stages of the units MU1 and MU2 may include holding registers for synchronously governing the operations corresponding to the clock pulse periods of the pipeline processor. If this is the case, a clock signal such as that shown in FIG. 9, synchronous with the clock pulses of the pipeline processor, may be coupled to each of the multiplication stages. As has been described, supra, a programmable read only memory such as that shown at PROM 3 (4) may be used to sequence the multiplication constants M1 through M42 to the input of the multiplier unit MU1 (MU2) in accordance with the order in which the data points are being shuffled out of the RAM's.

TABLE 8A

| | PROM 3 OUTPUTS | | | | | | | | | | | |
|---|---|---|---|---|---|---|---|---|---|---|---|---|
| TIME | M00 | M01 | M02 | M03 | M04 | M05 | M06 | M07 | M08 | M09 | M10 | M11 |
| 77 | $M1_{00}$ | $M1_{01}$ | X | X | X | X | X | X | X | X | X | X |
| 78 | $M2_{00}$ | $M2_{01}$ | $M1_{02}$ | $M1_{03}$ | X | X | X | X | X | X | X | X |
| 79 | * | * | $M2_{02}$ | $M2_{03}$ | $M1_{04}$ | $M1_{05}$ | X | X | X | X | X | X |
| 80 | * | * | * | * | $M2_{04}$ | $M2_{05}$ | $M1_{06}$ | $M1_{07}$ | X | X | X | X |
| 81 | $M3_{00}$ | $M3_{01}$ | * | * | * | * | $M2_{06}$ | $M2_{07}$ | $M1_{08}$ | $M1_{09}$ | X | X |
| 82 | $M4_{00}$ | $M4_{01}$ | $M3_{02}$ | $M3_{03}$ | * | * | * | * | $M2_{08}$ | $M2_{09}$ | $M1_{10}$ | $M1_{11}$ |
| 83 | $M5_{00}$ | $M5_{01}$ | $M4_{02}$ | $M4_{03}$ | $M3_{04}$ | $M3_{05}$ | * | * | * | * | $M2_{10}$ | $M2_{11}$ |
| 84 | $M6_{00}$ | $M6_{01}$ | $M5_{02}$ | $M5_{03}$ | $M4_{04}$ | $M4_{05}$ | $M3_{06}$ | $M3_{07}$ | * | * | * | * |

TABLE 8B

| | PROM 4 OUTPUTS | | | | | | | | | | | |
|---|---|---|---|---|---|---|---|---|---|---|---|---|
| TIME | M00 | M01 | M02 | M03 | M04 | M05 | M06 | M07 | M08 | M09 | M10 | M11 |
| 77 | $M25_{00}$ | $M25_{01}$ | X | X | X | X | X | X | X | X | X | X |
| 78 | $M26_{00}$ | $M26_{01}$ | $M25_{02}$ | $M25_{03}$ | X | X | X | X | X | X | X | X |
| 79 | * | * | $M26_{02}$ | $M26_{03}$ | $M25_{04}$ | $M25_{05}$ | X | X | X | X | X | X |
| 80 | * | * | * | * | $M26_{04}$ | $M26_{05}$ | $M25_{06}$ | $M25_{07}$ | X | X | X | X |
| 81 | $M27_{00}$ | $M27_{01}$ | * | * | * | * | $M26_{06}$ | $M26_{07}$ | $M25_{08}$ | $M25_{09}$ | X | X |
| 82 | $M28_{00}$ | $M28_{01}$ | $M27_{02}$ | $M27_{03}$ | * | * | * | * | $M26_{08}$ | $M26_{09}$ | $M25_{10}$ | $M25_{11}$ |
| 83 | $M29_{00}$ | $M29_{01}$ | $M28_{02}$ | $M28_{03}$ | $M27_{04}$ | $M27_{05}$ | * | * | * | * | $M26_{10}$ | $M26_{11}$ |
| 84 | $M30_{00}$ | $M30_{01}$ | $M29_{02}$ | $M29_{03}$ | $M28_{04}$ | $M28_{05}$ | $M27_{06}$ | $M27_{07}$ | * | * | * | * |

If we assume the shuffling order as shown in Tables 7A and 7B, the digital output words of PROM 3 and PROM 4 may appear starting from the clock pulse at T77 as that shown in Tables 8A and 8B, respectively. Since the first data point shuffled from the RAM 11 through register R26 to unit MU1 may be 150R, the first digital word presented to the multiplication unit MU1 will include bits 00 and 01 of the digital word representative of the multiplication constant M1 denoted as $M1_{00}$ and $M1_{01}$. Likewise, the first data point shuffled from the RAM 12 and through register R27 to the multiplication unit MU2 may be 174R at the clock pulse at T77; therefore, the digital output word of the PROM 4 for the clock pulse at T77 includes the 00 and 01 bit of the digital word representative of the multiplication constant M25 denoted as $M2S_{00}$ and $M25_{01}$. The next two data points shuffled through the registers R26 and R27 are 151R and 175R, respectively. Thus, the next digital word output from the PROM 3 may include the 00 and 01 bit of the digital word representative of the multiplication constant M2 denoted as $M2_{00}$ and $M2_{01}$ which are input to the first multiplication section of MU1 and further include the 02 and 03 bit of the digital word representative of the multiplication constant M1 denoted as $M1_{02}$ and $M1_{03}$ which are input to the second multiplication stage of MU1. Likewise, at the clock pulse at T78, the output digital word from PROM 4 may include the 00 and 01 bit of the digital word representative of the multiplication constant M26 denoted as $M26_{00}$ and $M26_{01}$ and further include the 02 and 03 bits of the digital word representative of the multiplication constant M25 denoted as $M25_{02}$ and $M25_{03}$. These pairs of bits are input to the first and second multiplication stages of the multiplier unit MU2.

The X and asterisk appearing in the Tables 8A and 8B represent information which is insignificant to the pipeline processing for all practical purposes or insignificant to the description at this point. The procedure for outputting digital words from the PROM's 3 and 4 may continue in the sequence as shown in Tables 8A and 8B, respectively. Note, at the clock pulse at T82, for example, the multiplication of the first data point 150R times its multiplication constant M1 is complete with its result 180R appearing at processor flow point EE. Concurrently, the multiplication of data point 174R with its corresponding multiplication constant M25 is also complete at T82 with the result thereof 204R appearing at the processor flow point FF. At the next clock pulse T83 the multiplications of 151R with M2 and 175R with M26 are complete with their results appearing at the flow points EE and FF, respectively. The remaining data points may be sequentially operated on by the multiplier units MU1 and MU2 in accordance with the order in which they are shuffled from the RAM's (see Tables 7A and 7B, for example) in a parallel processing fashion with their results sequentially appearing at the processor flow points EE and FF correspondingly.

The operation of the remaining portion of the pipeline processor will be described in conjunction with FIGS. 8B, 8C, 5B and 6B, and including Tables 9A and 9B shown herebelow.

TABLE 9A

| TIME | EE | FF | GG | HH | II | JJ | KK | LL | MM | NN | PP | QQ | RR | SS | TT | UU | VV | WW | XX |
|---|---|---|---|---|---|---|---|---|---|---|---|---|---|---|---|---|---|---|---|
| 82 | 180 | 204 | | | 264 | | | | | | | | | | | | | | |
| 83 | 181 | 205 | | | 265 | | | | | | | | | | | | | | |
| 84 | * | * | | | * | | | | | | | | | | | | | | |
| 85 | * | * | | | * | | | | | | | | | | | | | | |
| 86 | 182 | 206 | | | 266 | | | | | | | | | | | | | | |
| 87 | 183 | 207 | | | 267 | | | | | | | | | | | | | | |
| 88 | 184 | 208 | | | 268 | | | | | | | | | | | | | | |
| 89 | 185 | 209 | | | 269 | | | | | | | | | | | | | | |
| 90 | 192' | 186 | 210 | 240 | 246 | | | | | | | | | | | | | | |
| 91 | 193' | 187 | 211 | 241 | 247 | 240 | 264 | 264 | | | | | | | | | | | |
| 92 | * | 192 | * | * | * | 241 | 265 | 265 | | | | | | | | | | | |
| 93 | * | 193 | * | * | * | * | * | * | * | 294 | | | | | | | | | |
| 94 | 194' | 188 | 212 | 242 | 248 | * | * | * | * | 295 | | | | | | | | | |
| 95 | 195' | 189 | 213 | 243 | 249 | 242 | 266 | 266 | * | * | | | | | | | | | |
| 96 | 196' | 190 | 214 | 244 | 250 | 243 | 267 | 267 | * | * | | | | | | | | | |
| 97 | 197' | 191 | 215 | 245 | 251 | 244 | 268 | 268 | * | 296 | | | 296 | 294 | | | | | |
| 98 | 198' | 198 | 192' | 252 | 258 | 245 | 269 | 269 | * | 297 | | | 297 | 295 | | | | | |
| 99 | 199' | 199 | 193' | 253 | 259 | 252 | 246 | 252 | 240 | 298 | | | 298 | * | 326 | 324 | | | |
| 100 | 196 | 194 | * | * | * | 253 | 247 | 253 | 241 | 299 | * | * | 299 | * | 327 | 325 | | | |
| 101 | 197 | 195 | * | * | * | * | * | * | * | 270 | 282 | * | * | * | 328 | X | 324 | 328 | 326 |
| 102 | 200' | 200 | 194' | 254 | 260 | * | * | * | * | 271 | 283 | * | * | * | 329 | X | 325 | 329 | 327 |
| 103 | 201' | 201 | 195' | 255 | 261 | 254 | 248 | 254 | 242 | * | * | * | * | * | * | * | X | X | 324 |
| 104 | 202' | 202 | 196' | 256 | 262 | 255 | 249 | 255 | 243 | * | * | * | * | * | * | * | X | X | 325 |
| 105 | 203' | 203 | 197' | 257 | 263 | 256 | 250 | 256 | 244 | 272 | 284 | 282 | 272 | 270 | * | * | * | * | * |

TABLE 9A-continued

| | | | | | | | | | | | | | | |
|---|---|---|---|---|---|---|---|---|---|---|---|---|---|---|
| 106 | | | 257 | 251 | 257 | 245 | 273 | 285 | 283 | 273 | 271 | * | * | * | * | * |

| TIME | $\overline{YY}$ | $\overline{ZZ}$ | YY | ZZ | SW15 | SW14 | SW13 | SW12 | SW11 | SW10 | SW9 | SW8 | SW7 |
|---|---|---|---|---|---|---|---|---|---|---|---|---|---|
| 82 | | | | | | | | | | 1 | | | 2 |
| 83 | | | | | | | | | | 1 | | | 2 |
| 84 | | | | | | | | | | 1 | | | 2 |
| 85 | | | | | | | | | | 1 | | | 2 |
| 86 | | | | | | | | | | 1 | | | 2 |
| 87 | | | | | | | | | | 1 | | | 2 |
| 88 | | | | | | | | | | 1 | | | 2 |
| 89 | | | | | | | | | | 1 | | | 2 |
| 90 | | | | | | | | | | 2 | 1 | 1 | 1 |
| 91 | | | | | | | | | 1 | 2 | 1 | 1 | 1 |
| 92 | | | | | | | | 2 | 1 | 2 | 1 | 1 | 1 |
| 93 | | | | | | | 1 | 2 | 1 | 2 | 1 | 1 | 1 |
| 94 | | | | | | | 1 | 2 | 1 | 2 | 1 | 1 | 1 |
| 95 | | | | | | | 1 | 2 | 1 | 2 | 1 | 1 | 1 |
| 96 | | | | | | | 1 | 2 | 1 | 2 | 1 | 1 | 1 |
| 97 | | | | | | | 2 | 2 | 1 | 2 | 1 | 1 | 1 |
| 98 | | | | | | 1 | 2 | 2 | 1 | 2 | 3 | 2 | 1 |
| 99 | | | | | 1 | 1 | 2 | 2 | 2 | 2 | 3 | 2 | 1 |
| 100 | | | | | 1 | 2 | 2 | 1 | 2 | 2 | 3 | 2 | 1 |
| 101 | 356 | 358 | | | 2 | 2 | 1 | 1 | 2 | 2 | 3 | 2 | 1 |
| 102 | 357 | 359 | | | 2 | 1 | 1 | 1 | 2 | 2 | 2 | 2 | 1 |
| 103 | 354 | 354 | A20 | A10 | 1 | 1 | 1 | 1 | 2 | 2 | 2 | 2 | 1 |
| 104 | 355 | 355 | A5 | A25 | 1 | 2 | 1 | 1 | 2 | 2 | 4 | 2 | 1 |
| 105 | * | * | A0 | A0 | 2 | 2 | 2 | 1 | 2 | 2 | 4 | 2 | 1 |
| 106 | * | * | A15 | A15 | 2 | 1 | 2 | 1 | 2 | 1 | 1 | 2 | 2 |

TABLE 9B

| TIME | EE | FF | GG | HH | II | JJ | KK | LL | MM | NN | PP | QQ | RR | SS | TT | UU | VV | WW | XX | $\overline{YY}$ |
|---|---|---|---|---|---|---|---|---|---|---|---|---|---|---|---|---|---|---|---|---|
| 107 | | | | | | | 258 | 258 | 246 | 274 | 286 | * | 274 | * | 302 | 300 | * | * | * | * |
| 108 | | | | | | | 259 | 259 | 247 | 275 | 287 | * | 275 | * | 303 | 301 | * | * | * | * |
| 109 | | | | | | | * | * | * | 276 | 288 | 284 | 284 | 282 | 304 | X | 300 | 304 | 302 | 332 |
| 110 | | | | | | | * | * | * | 277 | 289 | 285 | 285 | 283 | 305 | X | 301 | 305 | 303 | 333 |
| 111 | | | | | | | 260 | 260 | 248 | * | * | 286 | 286 | * | 314 | 312 | X | X | 300 | 330 |
| 112 | | | | | | | 261 | 261 | 249 | * | * | 287 | 287 | * | 315 | 313 | X | X | 301 | 331 |
| 113 | | | | | | | 262 | 262 | 250 | 278 | 290 | 288 | 278 | 276 | 316 | X | 312 | 316 | 314 | 344 |
| 114 | | | | | | | 263 | 263 | 251 | 279 | 291 | 289 | 279 | 277 | 317 | X | 313 | 317 | 315 | 345 |
| 115 | | | | | | | | | | 280 | 292 | * | 280 | * | 308 | 306 | X | X | 312 | 342 |
| 116 | | | | | | | | | | 281 | 293 | * | 281 | * | 309 | 307 | X | X | 313 | 343 |
| 117 | | | | | | | | | | | | 290 | 290 | 288 | 310 | X | 306 | 310 | 308 | 338 |
| 118 | | | | | | | | | | | | 291 | 291 | 289 | 311 | X | 307 | 311 | 309 | 339 |
| 119 | | | | | | | | | | | | 292 | 292 | * | 320 | 318 | X | X | 306 | 336 |
| 120 | | | | | | | | | | | | 293 | 293 | * | 321 | 319 | X | X | 307 | 337 |
| 121 | | | | | | | | | | | | | | | 322 | X | 318 | 322 | 320 | 350 |
| 122 | | | | | | | | | | | | | | | 323 | X | 319 | 323 | 321 | 351 |
| 123 | | | | | | | | | | | | | | | | | X | X | 318 | 348 |
| 124 | | | | | | | | | | | | | | | | | X | X | 319 | 349 |
| 125 | | | | | | | | | | | | | | | | | | | | |
| 126 | | | | | | | | | | | | | | | | | | | | |
| 127 | | | | | | | | | | | | | | | | | | | | |
| 128 | | | | | | | | | | | | | | | | | | | | |
| 129 | | | | | | | | | | | | | | | | | | | | |
| 130 | | | | | | | | | | | | | | | | | | | | |
| 131 | | | | | | | | | | | | | | | | | | | | |

| $\overline{ZZ}$ | YY | ZZ | SW15 | SW14 | SW13 | SW12 | SW11 | SW10 | SW9 | SW8 | SW7 |
|---|---|---|---|---|---|---|---|---|---|---|---|
| * | * | * | 1 | 1 | 2 | 1 | 1 | 1 | 1 | 2 | 2 |
| * | * | * | 1 | 2 | 2 | 1 | 1 | 1 | 1 | 2 | 2 |
| 334 | * | * | 2 | 2 | 1 | 1 | 1 | 1 | 1 | 2 | 2 |
| 335 | * | * | 2 | 1 | 1 | 1 | 1 | 1 | 1 | 2 | 2 |
| 330 | A2 | A22 | 1 | 1 | 1 | 1 | 1 | 1 | 1 | 2 | 2 |
| 331 | A17 | A7 | 1 | 2 | 1 | 1 | 1 | 1 | 1 | 2 | 2 |
| 346 | A12 | A12 | 2 | 2 | 2 | 1 | 1 | 1 | 1 | 2 | 1 |
| 347 | A27 | A27 | 2 | 1 | 2 | 1 | | 2 | 1 | 1 | 1 |
| 342 | A8 | A28 | 1 | 1 | 2 | 1 | | 2 | 1 | 1 | 1 |
| 343 | A23 | A13 | 1 | 2 | 2 | | | 2 | 1 | 1 | 1 |
| 340 | A18 | A18 | 2 | 2 | 1 | | | 2 | 1 | 1 | 1 |
| 341 | A3 | A3 | 2 | 1 | 1 | | | 2 | 1 | 1 | 1 |
| 336 | A14 | A4 | 1 | 1 | 1 | | | 2 | 1 | 1 | 1 |
| 337 | A29 | A19 | 1 | 2 | 1 | | | 2 | 1 | 1 | 1 |
| 352 | A24 | A24 | 2 | 2 | | | | 2 | 1 | 1 | 1 |
| 353 | A9 | A9 | 2 | | | | | 2 | 3 | 2 | 1 |
| 348 | A26 | A16 | 1 | | | | | 2 | 3 | 2 | 1 |
| 349 | A11 | A1 | 1 | | | | | 2 | 3 | 2 | 1 |

TABLE 9B-continued

| | | | | | |
|---|---|---|---|---|---|
| A6 | A6 | 2 | 3 | 2 | 1 |
| A21 | A21 | 2 | 2 | 2 | 1 |
| | | 2 | 2 | 2 | 1 |
| | | 2 | 4 | 2 | 1 |
| | | 2 | 4 | 2 | 1 |

Referring to Table 9A, the order in which the data points 180 through 209 may be sequentially processed through the multiplier units MU1 and MU2 subsequently appearing at flow points EE and FF, respectively, is shown in the left hand column corresponding to the clock pulse times at T82 through T105. These data points, of course, are representative of one of either the real or imaginary data point arrays. For the purposes of describing the operation of the remaining portion of the instant pipeline processor embodiment, it is assumed that these data points 180-209 may be representative of either the real portions 180R-209R or the imaginary portions 180I-209I of the data point array entering the output section of the 30-point transform. It is understood that each set may be processed individually by the output sections of the present embodiment of the pipeline processor in the succeeding clock pulse periods much in the same manner as that described in connection with the Tables 6A and 6B hereabove.

Starting with clock pulse at T82, data points 180 and 204 appear at flow points EE and FF, respectively. Switch SW7 is in position to permit data point 180 to be added to data point 204 in the adder unit S14, the result being provided to the delay line D10. Switch SW10 is in position one permitting the equivalent data point 204 of which is 264 to also appear at the flow point II from node FF. If the positions of the remaining switches are not appearing in the FIGS. 9A and 9B, it is safe to assume that they are either not significant to the signal flow in the pipeline processor operation or not significant to the description at this time, or the pattern is merely being understandably repeated. At the next clock pulse at T83, data points 181 and 205 appear at the nodes EE and FF. The switches SW7 and SW10 remain in positions two and one, respectively. Thus, data point 181 and 205 are also added by the adder unit S14 and provided to the delay line D10. It is understood that the data point 210 resulting from the addition of 180 and 204 has been shifted to the second position of the delay line D10 during the clock pulse at T83. The equivalent of 205, which is 265, also appears at the flow point II from node FF. In the next two clock pulses at T84 and T85, insignificant information appears at the flow points EE and FF, being denoted by asterisks in the Table 9A. In the next four succeeding clock pulses at T86, T87, T88, and T89, the data points 182, 183, 184, and 185 appear at the node EE and 206, 207, 208, and 209 appear at the node FF, respectively. The pairs of data points similarly added together in their corresponding clock pulse periods utilizing adder unit S14 with the results being clocked into the delay line D10 and continuing through the delay line D11. The equivalents of the data points 206 through 209 are also provided to the flow points at II during the aforementioned clock pulse periods. At T90, the switches SW7, SW8, SW9, SW10, and SW11 are positioned at 1, 1, 1, 2, and 1, respectively. Simultaneously, the results of the previous additions from the adder unit S14 being exiting from the delay line D11 and are presented to the adder unit S15 to be added to the data appearing at FF through the switch SW8. Therefore, the data point 186 at FF is added to the resultant data point 210 which has passed through the delay lines D10 and D11 over the prior 8-clock pulse periods and the resultant data point 240 appears at the flow point HH. At this same time, the structure of the processor is reconfigured by the positioning of switch SW9 such that the flow point GG is input to the summer unit S16. Since the data point information at FF is inverted by the inverter 11 and coupled to the other input of the adder unit S16, a subtraction of the data point at FF from the data point at GG is permitted to occur at S16 and pass through to II through the position two of switch SW10. In this manner the data point 186 at FF may be subtracted from the data point 210 at GG with the resultant data point 246 appearing at the flow point II. The switch positions remain fixed over the next 7 clock pulses to T97, inclusively. The computed data points 193' through 197' sequentially appear at node EE at their corresponding clock pulse times except for T92 and T93. In addition, data points 187, 192, 193, 188, 189, 190, and 191 appear at flow point FF corresponding to the aforementioned clock pulse period. During this same time period, summations and subtractions continue to occur at S15 and S16, respectively, with the corresponding results being provided to the nodes HH and II accordingly. The addition results at HH are also transferred to node JJ with a 1-clock pulse delay caused by the register R28. Also during this time period, the data points 264 through 268 which previously appeared at node II have passed through the register R29 and delay line D14 and correspondingly appear at flow point KK and LL via position one of switch SW11. The equivalents 294 and 295 of the data points 264 and 265 are transferred to node NN at clock pulses T93 and T94 through the registers R30 and R32. Since switch SW12 is in position two during this time period, there is no addition occuring at adder unit S18. In a similar manner, at clock pulse T97 the equivalent 296 of data point 266 appears at node NN and node RR via position two of switch SW13. Also at T97, the data point 294 appears at node SS through delay line D17 because of the prior positioning of switch SW13.

At the clock pulse at T98, the data points 296 and 294 are entered into the register R34 and R35 to be added in the adder unit S21 according to the positioning of switch SW14. Concurrently, data point 294 is supplied to the input of register R37 through switch SW14. Also at T98 data points 297 and 295 are supplied to nodes RR and SS respectively, data point 269 appears at node KK and LL from the delay line D14 and according to the positioning of switch SW11, and data point 245 appears at node JJ from the node HH through register R28. Simultaneously, the data points 198' and 192' appearing at nodes EE and GG are added together in the adder unit S15 as a result of the positioning of SW8, the addition result, data point 252 being provided to node HH. In the same clock pulse period T98, the data point 198 is added to the output, data point 192, of the delay line D13 in the adder unit S16, the coupling occurring as a result of the positioning of switch SW9. The resultant addition data point 258 is provided to the flow point II through switch SW10. It is understood that for these additions at adder unit S16 to occur in their proper manner according to the signal flow graph of FIG. 5B the sign of the multiplication constants must be appropriately chosen.

In the succeeding seven clock pulses to T105, inclusively, the additions of the data points appearing at nodes EE and GG continue to occur in the summer S15 with the results sequentially appearing at the node HH. In the same time period, the additions between the data points occurring at node FF and the data points exiting from the delay line D13 through position three of switch SW9 continue to occur at the adder unit S16 with their corresponding results sequentially appearing at the node II. During the clock pulse periods from T99 through T106 the data points appearing at node HH are transferred to node JJ and LL with a one clock pulse delay caused by the register R28. During the same clock pulses, the data points exiting the delay line D14 appear at node KK and are input to the delay line D15. At the same times, the butterfly arrangement comprising the adder units S18 and S19 operate on the data transferred through the registers R30 and R31 from the nodes LL and MM, respectively, the results being provided to the nodes NN and PP delayed by one clock pulse as a result of the transfer through the registers R32 and R33. The exception occurring in clock pulses at T99 and T100 during which the adder unit S18 is inhibited because of the positioning of switch SW12 rendering the data points to be transferred from node LL to nodes NN and RR according to the positioning of switch SW13. From clock pulses at T99 to T102, the data points at node RR are transferred to nodes TT and WW through the register R36 and according to the switch positions SW14 and SW15. Note that the data points occurring at nodes TT and WW during this time frame are the equivalents of the data points transferred from the node RR in accordance with the signal flow graph of FIG. 5B. In addition, during the times T101 and T102, the data points 326 and 327 appear at the flow point XX being exited sequentially from the delay line D19. At T101 the expected results of the butterfly section comprising adder units S22 and S23 operating on the data points 328 and 326 are denoted under the column $\overline{YY}$ and $\overline{ZZ}$ being 356 and 358, respectively. Likewise at time T102, the same butterfly operation on data point 329 and 327 results in data points 357 and 359 also appearing under the column $\overline{YY}$ and $\overline{ZZ}$. Also at times T103 and T104 the results of the butterfly operation on the data points appearing at WW and XX likewise appear at $\overline{YY}$ and $\overline{ZZ}$.

The first frequency harmonic pair of array points are output at nodes YY and ZZ at time T103. This frequency harmonic pair A20 and A10 is equivalent to the computed data points 356 and 358 resulting from the computation of the final butterfly stage comprising adders S22 and S23. Likewise, in the next clock pulse period at T104, the second pair of frequency harmonics A5 and A25 appear at YY and ZZ in the pipeline processor. Again, these points are the equivalents of the data points 357 and 359 computed through the final butterfly section of the processor. At clock pulse T105, the results of the butterfly section comprising adder units S18 and S19 operating on the data points 254 and 242 appear at the nodes NN and PP, these results being 272 and 284, respectively. The results of the butterfly section including S18 and S19 continue to appear at the nodes NN and PP for the next eleven clock pulse periods ending at the time denoted as T116 (refer to Table 9B). From clock pulse 99 through 106, the data point flow information is provided to the node MM from the flow point JJ through the delay line D15.

From the clock pulse periods T107 to T114, inclusively, as shown in Table 9B hereabove, the data point flow information is provided to the node MM from the node JJ again through the delay line D15. From the clock pulse at T107 until T114, the data point information exiting the delay line D14 is provided to both the nodes KK and LL because of the positioning of the switch SW11. During the clock pulses at T105 through T108, the data point information is directly coupled between NN and RR through position two of switch SW13. Corresponding to the same times, data point information is provided to SS through D17. Subsequently, during the clock pulses at T109 through T112, the positioning of SW13 is such that the data point information may be supplied to the node RR from the node QQ which is the exit point of the delay line D16. Corresponding to these same times, data point information is supplied to node SS through the delay line D17; note, this information originally appeared at the node QQ during the times designated as T105 through T108. Following in sequence, during the clock times T113 through T116, data point information is again supplied to the node RR from the node NN because of the positioning of switch SW13 and the data point information provided to node SS through the delay line D17 previously appeared at node NN during the clock times designated as T109 through T112. In the succeeding four clock pulses T117-T120, data is supplied to RR from the node QQ because of the positioning of switch SW13 and the data point information appearing at SS is the four clock pulse delayed information which appeared at point QQ during the times designated at T113 through T116. Because of the periodic operation of switch SW14, it is readily apparent that the pseudo-butterfly operation of the adder unit S21 is operative at the times switch SW14 is in position one and inoperative when the switch SW14 is in position two; therefore, additions may occur between the data points at RR and SS during the times 110 and 111, 114 and 115, 118 and 119, and 122 and 123 for the example as shown in the signal flow Tables 9A and 9B, hereinabove. The results of these additions appear at node TT delayed by one clock pulse because of the operation of register R36. Corresponding to the times that the additions are taking place in adder unit S21, the data point information exiting register R35 is passed directly to the register R37 and is transferred therethrough delayed by one clock pulse period. Therefore, appearing at UU is the data point equivalence of that which appeared at SS delayed by two clock pulses during the times switch SW14 is in position one. Accordingly, during the times when switch SW14 is in position two, zero information may appear at the node UU delayed by one clock pulse of time. Also corresponding to the times when switch SW14 is in position two, the data point information appearing at TT is the equivalent, according to the signal flow graph of FIG. 5B, of that appearing at the node RR simply delayed by two clock pulse periods.

The operation of the remaining portions of the embodiment of the pipeline processor as shown in FIG. 8C is conducted according to the operation of switch SW15 which, incidentally for the purposes of this embodiment, is operated periodically. During the times that switch SW15 is in position two, the nodes TT and WW are coupled together and the information entering the delay line D19 is provided from the node VV. Accordingly, when the switch SW15 is in position one, the nodes VV and WW are coupled together and the information provided to delay line D19 comes from the node TT. In viewing the signal flow Table 9B, at times T109 and T110, for example, the data point information appearing at node WW is the same information appearing at node TT and likewise, the data point information appearing at nodes XX results from the node TT delayed by two clock pulses rendered by the delay line D19. See clock pulses at T115 and T116 for an example of the operation of when switch SW15 is in position one. The information at VV is transferred to WW directly. The data point information at XX is the information which previously appeared at VV delayed by two clock pulses as a result of the delay line D19. The results of the butterfly section operating on these particular data point values, as are shown for T115 and T116 at the flow points VV and WW, eventually appear at YY and ZZ delayed by two clock pulse periods at T117 and T118, respectively.

The data point information at WW and XX are operated on by the final butterfly section comprising S22 and S23 rendering the data point represented on the signal flow table 9B at YY and ZZ the results of the actual operation of the butterfly section appear at YY and ZZ delayed by two clock pulses one being required to transfer information through the registers R38 and R39 and the other being required to transfer the information through the registers R40 and R41. Note that the information appearing in the signal flow table at column YY and ZZ is representative of the frequency harmonic array points Ax which in accordance with the signal flow graph of FIG. 5B are the equivalents of the data points 330-359. The operation continues as described until one of either the real or imaginary elements of the output frequency harmonic data point array Ax are computed which occurs at the time designated as T126. Thereafter, similar to the operation of the input section of the 30-point transform other of the real or imaginary frequency harmonic output data array will begin to be sequentially appearing in the same predetermined ordered pairs as that described above for the previous data at points YY and ZZ.

It is understood by anyone skilled in the pertinent art that the pipeline processor, described supra, may be mechanized in digital hardware using conventional medium-scale-integrated (MSI) digital circuits. For example, the adder units may be constructed utilizing conventional 4-bit binary full adders similar to the type having the model No. 54283. The multipliers MU1 and MU2 similar to that shown in FIG. 9 may be constructed utilizing 2×4-bit 2's complement binary multipliers similar to the type having the model No. 25L05. Digital inverters of the type 5404 may be used for the inverting unit I1; the holding registers and delay lines may be implemented by a variety of conventional digital circuits such as 54LS174, 54LS175, and 93L28, and AM29700. Generally, for delay lines less than 4 clock pulses the 54LS174 units may be used; for delay lines of 8 clock pulses the 93L28 units may be used, and for delay lines of up to 16 clock pulses the devices AM29700 may be used. Also, it is preferable to use the circuits 54LS175 for implementation of the holding registers which have both the conventional output and its complement provided thereby. As for the dual SPDT digital switching functions like that as shown at SW1 and SW2, for example, quad 2-input digital multiplexer chips such as those having the model No. 54153, for example, may be used. For the single pole four throw switch function such as that shown at SW9 in FIG. 8B, digital devices referred to as dual 4-input multiplexer of the type having the model No. 54157, for example, may be used.

For the present embodiment as shown in FIG. 8B, the RAM's 11, 22, 21, and 12 may each be implemented in digital hardware by the digital circuits comprising 6-AM27LS02 and 2-82S09, for example, wherein this combination of circuits provides 128, 12-bit memory locations for each of the RAM's. Furthermore, the counter/PROM combinations as shown in FIG. 8B, may be digitally implemented utilizing PROM devices of the type having the model No. 5623, for example, and utilizing a set of digital registers such as the 54LS174's arranged in a shift register structure operating in combination with the PROM. The overall hierarchy control of the pipeline processor, not shown, that is the synchronous clock pulse which enabled the holding registers and cause the delay lines to transfer information and the appropriate switches to switch synchronously to their predesigned states in accordance with the signal flow tables of 6A, 6B, 9A and 9B, may be mechanized utilizing PROM's of the type having a model No. 27LS08 operating in conjunction with a number of digital registers like those of the 54LS174 which may be arranged to function as a shift register circuit. It is understood, however, that other devices in other circuit arrangements may be used for hardware mechanization of the embodiment as shown in FIGS. 8A, 8B, and 8C without deviating from the broad scope of applicant's invention.

Figure 4B:
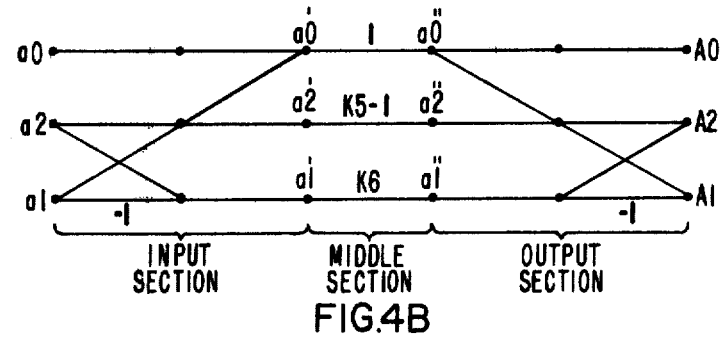
Figure 4C:
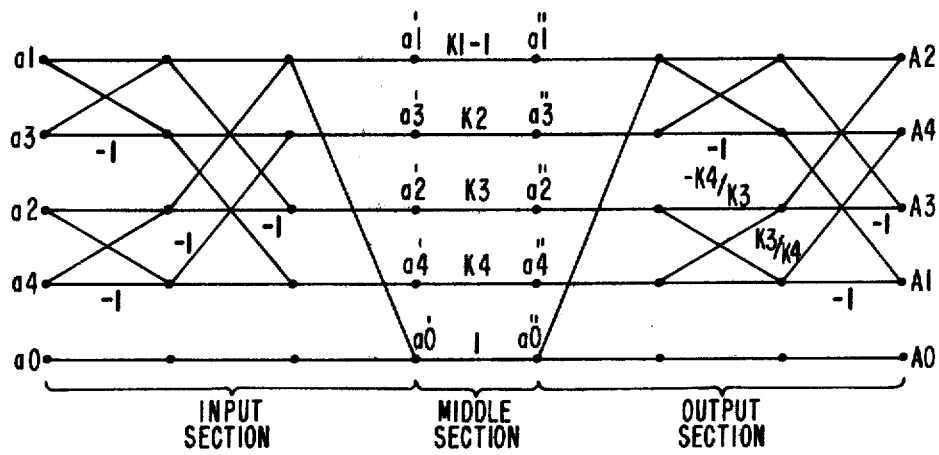
Figure 10:
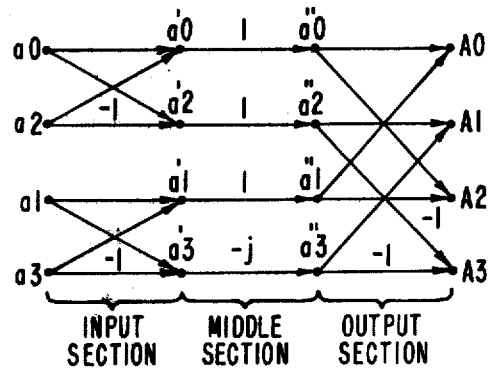
FIG. 10 exhibits a selected 4-point signal flow graph.

An alternate embodiment of a multipoint pipeline processor which is described herebelow is that of a 60-point pipeline processor which is based on a 3-, 4-, and 5-point transforms. The elemental signal flow graphs of the 3- and 5-point flow graphs are shown in FIGS. 4B and 4C, respectively. The signal flow graph of the 4-point transform which was found suitable for nesting within the 60-point transform is shown in FIG. 10. For more details of this 4-point transform reference is hereby made to the Patterson thesis which was cited in the background section of the instant application. It is noted that the 4-point transform of FIG. 10 has the same general construction as that of the 3- and 5-point transforms in that it has an input section, a middle or multiplication section and an output section.

In the subsequent description of the 60-point transform, the details of nesting the input sections of the 4-, 3-, and 5-point transforms to form the overall input section of the 60-point transform and the nesting of the output sections of the 4-, 3-, and 5-point transforms to form the output section of the 60-point transform will be provided. Similar to the description of the 30-point transform, the input data points of the 60-point transform are denoted as ax where x is an integer corresponding to the input index of the data point matrix of the DFT and likewise, the output frequency harmonics of the DFT are denoted as a Ay where y is the output index of the frequency matrix. In addition, the multiplication constants Mz where z is an integer are derived from the nesting of the smaller transforms within the larger 60-point transform according to known Winograd techniques.

Figure 11A:
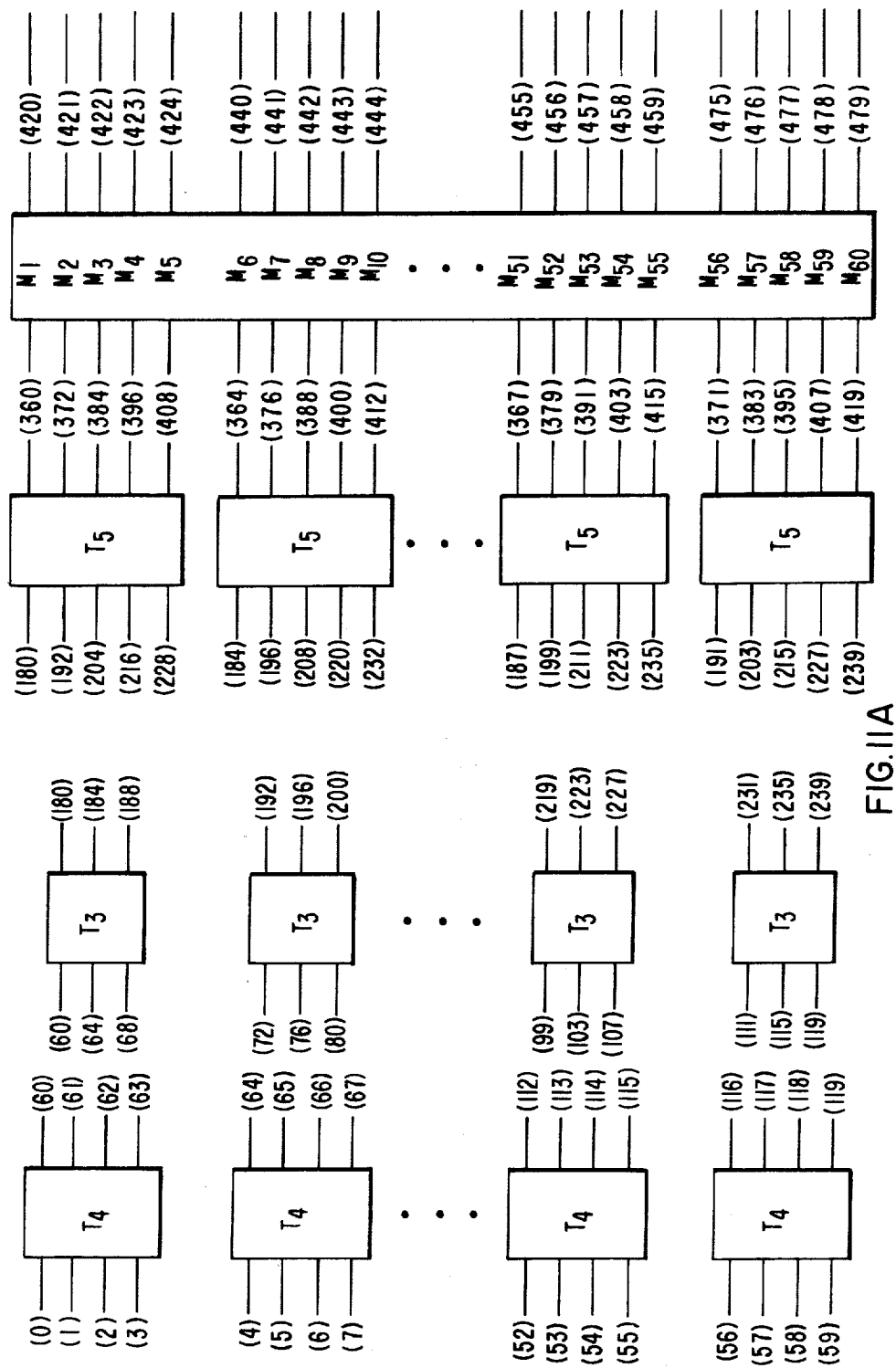
FIGS. 11A and 11B is a partial schematic block diagram representative of the interconnections of a predetermined nesting configuration of the selected 4-, 3- and 5-point signal flow graphs to form a 60-point signal flow graph.

A schematic block diagram which depicts the nesting of the smaller 4-, 3-, and 5-point transforms as shown in FIGS. 10, 4B and 4C, respectively, to form the 60-point signal flow graph which is used as the basis for the architecture of the 60-point pipeline processor for the discrete Fourier transformations which will be described in greater detail herebelow. For the purposes of describing the signal flow graph of the 60-point transforms, the inputs and outputs of each of the nested input and output sections of the smaller transforms will be enumerated with consecutive integers. For example, in the interconnecting input structure of the nested transforms of the input section of the 60-point transform as shown in FIG. 11A, the input nodes to the input blocks which are labeled T4 for denoting 4-point transforms, are enumerated from 0 to 59 indicative of the 60-point input data array. Note that the input points are grouped in quantities of four and aligned with each of the fifteen 4-point transform blocks T4. The outputs of the 4-point transform blocks are also consecutively numbered from 60 to 119 and are likewise grouped consecutively in quantities of four.

Also in FIG. 11A is shown the interconnection between the 4-point transform blocks T4 and the next row stage of 20 3-point transform blocks denoted at T3. For example, the first outputs 60, 64, and 68 of the first three 4-point transform blocks going from the top to the bottom of the columns in FIG. 11A are connected to the topmost 3-point transform block as inputs. In sequence then, the first outputs 72, 76, and 80 of the next 4-point transform blocks, again going from top to bottom, are interconnected to the inputs of the second topmost 3-point transform block. This pattern continues until the final 3-point transform block has as inputs the fourth of the outputs 111, 115 and 119 of the bottommost three 4-point transform blocks in FIG. 11A. While it is denoted that the blocks T4 and T3 hereabove are the 3- and 4-point transform, in reality these blocks depict only the input section of the 4- and 3-point transform signal graphs, respectively.

The next interconnecting structure to be described is that between the input sections of the 3-point transform blocks T3 and the input sections of the 5-point transform blocks T5. It is noted that the outputs of the blocks T3 are no longer consecutively numbered but are consistent with the labeling of the corresponding inputs. For example, 60/180, 64/184, and 68/188 are the input/output labeling for the topmost 3-point transform block T3. This labeling continues consistently for the remaining nineteen T3 transform blocks as shown in FIG. 11A. In connecting the outputs 180 through 239 of the T3 blocks to the inputs of the T5 blocks, the first of the outputs 180, 192, 204, 216 and 228 of the five topmost T3 blocks are input to the topmost T5 block of the column of T5 blocks in FIG. 11A. The next topmost T5 block has connected to its inputs the second outputs, 184, 196, 208, 220, and 232 of the topmost five T3 blocks in FIG. 11A. This interconnection pattern generally persists for all of the T5 blocks culminating as shown in FIG. 11A with the inputs to the bottom T5 block as being the third outputs 191, 203, 215, 227, and 239 of the five bottommost T3 blocks in the column of T3 blocks. Note that the output data points 360 to 419 of the T5 blocks are enumerated consistently with that of their corresponding inputs. For example, 180/360, 192/372, 204/384, 216/396, and 228/408 correspond to the input/output data points of the topmost T5 block. The multiplication constants M1 through M60 for the 60-point transform are shown in FIG. 11A multiplying their predetermined output data points from the input section of the 60-point transform. The outputs of the multiplication section are numbered consecutively from 420 to 479 respectively corresponding to the multiplication constants M1 through M60.

Figure 11B:
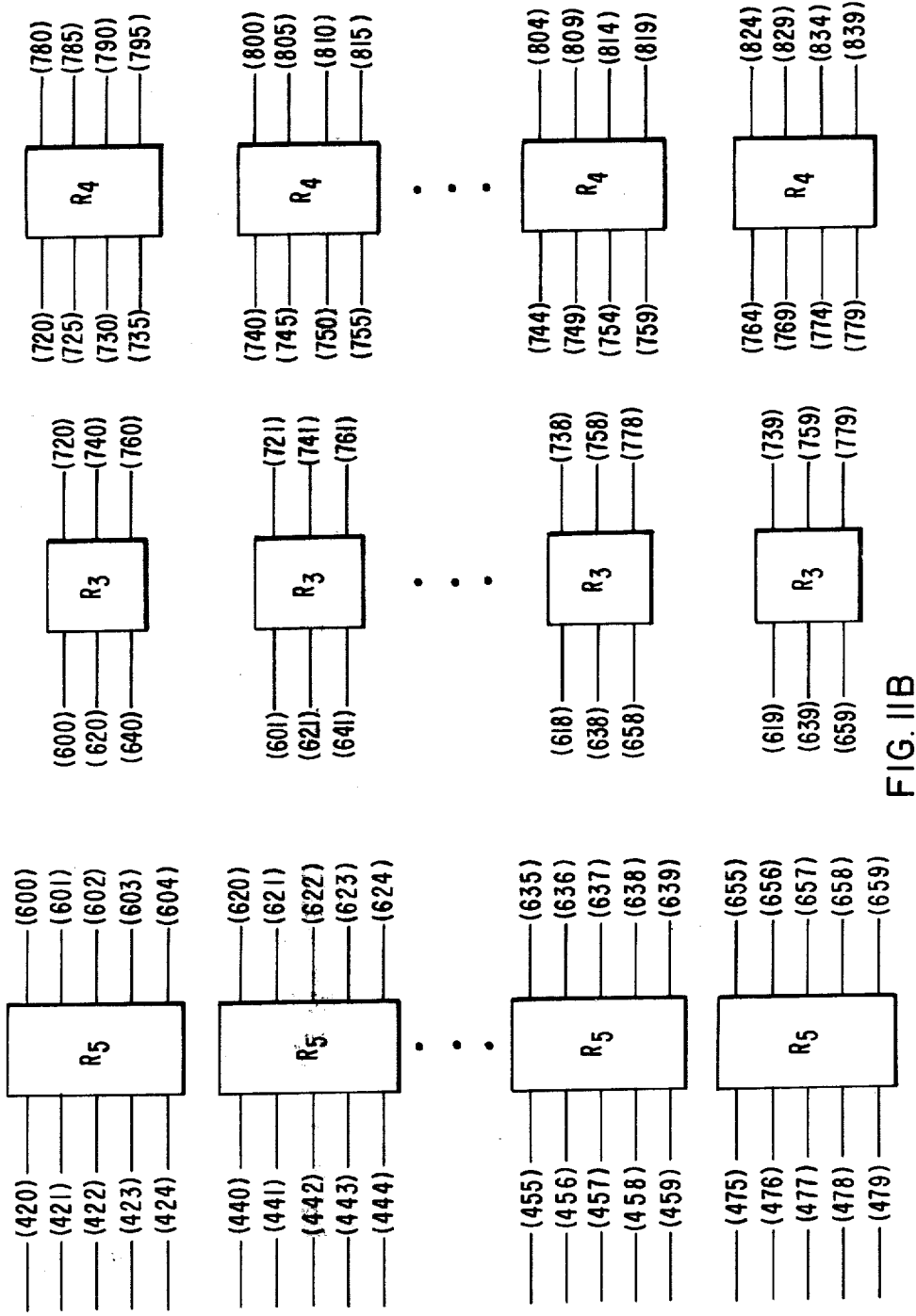

The interconnection structure for the nesting of the output sections of the 5-, 3-, and 4-point transforms is shown in FIG. 11B. The inputs to the twelve 5-point transform output sections denoted as R5 are grouped in consecutive quantities of five from the outputs of the multiplication section. According, the outputs of the blocks R5 are enumerated from 600 to 659 being grouped in consecutive order in quantities of five for each of the output sections of the 5-point transform R5. In the next columns are the output sections of the 3-point nested transforms denoted as R3, the inputs to the topmost block R3 are provided from the first outputs 600, 620, and 640 from the topmost three blocks of the R5 designated column for blocks as shown in FIG. 11B. The inputs to the next topmost R3 block are provided from the second outputs of the same topmost three R5 blocks in the column of R5 blocks. This same general pattern of interconnection between the R5 and R3 output section transform blocks is repeated culminating in the inputs to the bottom R3 block in the column of R3 blocks being provided from the fifth outputs 619, 639 and 659 of the bottommost three R5 blocks in the column of R5 blocks.

With regard to the interconnection of the R3 blocks with the output R4 blocks, the inputs to the topmost R4 block of the column of R4 blocks is provided from the first output of every fifth R3 block from top to bottom starting with the topmost R3 block, that is the outputs denoted as 720, 725, 730 and 735. With the same sequencing pattern, the second R4 block from top to bottom has as inputs the second output of every fifth R3 block from top to bottom starting with the topmost R3 block, that is the outputs denoted as 740, 745, 750 and 755. This same general pattern of interconnection continues culminating in the bottom R4 block of the column of R4 blocks having as inputs the third output from every other fifth R3 block including in the group the bottom R3 block containing the output 779. The outputs 780 through 839 of the fifteen R4 transform blocks are grouped in quantities of four and are enumerated consistently with the numbering of the inputs of the corresponding blocks. For example, the input/output relationships for the topmost R4 transform block are 720/780, 725/785, 730/790, and 735/795. This same pattern of numbering the outputs is consistent throughout the R4 transform blocks culminating in the bottommost R4 transform block having the input/output relationships as follows: 764/824, 769/829, 774/834, and 779/839.

It is realized that the block diagram schematics of FIGS. 11A and 11B exhibit only a representative portion of the block diagram interconnecting architecture for the 60-point signal flow graph which is used as the basis for the preferred embodiment of the 60-point pipeline processor which will be described in greater detail herebelow. For a more comprehensive interconnection tabulation of the input and output nodes of the block diagram schematic representative of the nesting of the 4-, 3-, and 5-point transforms of FIGS. 11A and 11B, reference is made to the Tables 10, 11A 1-3 and 11B 1-3 shown herebelow.

TABLE 10

| Data Point | Input Array Element | Data Point | Output Array Element |
|---|---|---|---|
| 0 | a36 | 780 | A24 |
| 1 | a6 | 781 | A48 |
| 2 | a21 | 782 | A36 |
| 3 | a51 | 783 | A12 |
| 4 | a56 | 784 | A0 |
| 5 | a26 | 785 | A39 |
| 6 | a41 | 786 | A3 |
| 7 | a11 | 787 | A51 |
| 8 | a16 | 788 | A27 |
| 9 | a46 | 789 | A15 |
| 10 | a1 | 790 | A54 |
| 11 | a31 | 791 | A18 |
| 12 | a48 | 792 | A6 |
| 13 | a18 | 793 | A42 |
| 14 | a33 | 794 | A30 |
| 15 | a3 | 795 | A9 |
| 16 | a8 | 796 | A33 |
| 17 | a38 | 797 | A21 |
| 18 | a53 | 798 | A57 |
| 19 | a23 | 799 | A45 |
| 20 | a28 | 800 | A4 |
| 21 | a58 | 801 | A28 |
| 22 | a13 | 802 | A16 |
| 23 | a43 | 803 | A52 |
| 24 | a12 | 804 | A40 |
| 25 | a42 | 805 | A19 |
| 26 | a57 | 806 | A43 |
| 27 | a27 | 807 | A31 |
| 28 | a32 | 808 | A7 |
| 29 | a2 | 809 | A55 |
| 30 | a17 | 810 | A34 |
| 31 | a47 | 811 | A58 |
| 32 | a52 | 812 | A46 |
| 33 | a22 | 813 | A22 |
| 34 | a37 | 814 | A10 |
| 35 | a7 | 815 | A49 |
| 36 | a24 | 816 | A13 |
| 37 | a54 | 817 | A1 |
| 38 | a9 | 818 | A37 |
| 39 | a39 | 819 | A25 |
| 40 | a44 | 820 | A44 |
| 41 | a14 | 821 | A8 |
| 42 | a29 | 822 | A56 |
| 43 | a59 | 823 | A32 |
| 44 | a4 | 824 | A20 |
| 45 | a34 | 825 | A59 |
| 46 | a49 | 826 | A23 |
| 47 | a19 | 827 | A11 |
| 48 | a0 | 828 | A47 |
| 49 | a30 | 829 | A35 |
| 50 | a45 | 830 | A14 |
| 51 | a15 | 831 | A38 |
| 52 | a20 | 832 | A26 |
| 53 | a50 | 833 | A2 |
| 54 | a5 | 834 | A50 |
| 55 | a35 | 835 | A29 |
| 56 | a40 | 836 | A53 |
| 57 | a10 | 837 | A41 |
| 58 | a25 | 838 | A17 |
| 59 | a55 | 839 | A5 |

TABLE 11-A1

T4

| No. | Inputs | | | | Outputs | | | |
|---|---|---|---|---|---|---|---|---|
| | 1 | 2 | 3 | 4 | 1 | 2 | 3 | 4 |
| 1 | 0 | 1 | 2 | 3 | 60 | 61 | 62 | 63 |
| 2 | 4 | 5 | 6 | 7 | 64 | 65 | 66 | 67 |
| 3 | 8 | 9 | 10 | 11 | 68 | 69 | 70 | 71 |
| 4 | 12 | 13 | 14 | 15 | 72 | 73 | 74 | 75 |
| 5 | 16 | 17 | 18 | 19 | 76 | 77 | 78 | 79 |
| 6 | 20 | 21 | 22 | 23 | 80 | 81 | 82 | 83 |
| 7 | 24 | 25 | 26 | 27 | 84 | 85 | 86 | 87 |
| 8 | 28 | 29 | 30 | 31 | 88 | 89 | 90 | 91 |
| 9 | 32 | 33 | 34 | 35 | 92 | 93 | 94 | 95 |
| 10 | 36 | 37 | 38 | 39 | 96 | 97 | 98 | 99 |
| 11 | 40 | 41 | 42 | 43 | 100 | 101 | 102 | 103 |
| 12 | 44 | 45 | 46 | 47 | 104 | 105 | 106 | 107 |
| 13 | 48 | 49 | 50 | 51 | 108 | 109 | 110 | 111 |
| 14 | 52 | 53 | 54 | 55 | 112 | 113 | 114 | 115 |
| 15 | 56 | 57 | 58 | 59 | 116 | 117 | 118 | 119 |

TABLE 11-A2

T3

| No. | Inputs | | | Outputs | | |
|---|---|---|---|---|---|---|
| | 1 | 2 | 3 | 1 | 2 | 3 |
| 1 | 60 | 64 | 68 | 180 | 184 | 188 |
| 2 | 72 | 76 | 80 | 192 | 196 | 200 |
| 3 | 84 | 88 | 92 | 204 | 208 | 212 |
| 4 | 96 | 100 | 104 | 216 | 220 | 224 |
| 5 | 108 | 112 | 116 | 228 | 232 | 236 |
| 6 | 61 | 65 | 69 | 181 | 185 | 189 |
| 7 | 73 | 77 | 81 | 193 | 197 | 201 |
| 8 | 85 | 89 | 93 | 205 | 209 | 213 |
| 9 | 97 | 101 | 105 | 217 | 221 | 225 |
| 10 | 109 | 113 | 117 | 229 | 233 | 237 |
| 11 | 62 | 66 | 70 | 182 | 186 | 190 |
| 12 | 74 | 78 | 82 | 194 | 198 | 202 |
| 13 | 86 | 90 | 94 | 206 | 210 | 214 |
| 14 | 98 | 102 | 106 | 218 | 222 | 226 |
| 15 | 110 | 114 | 118 | 230 | 234 | 238 |
| 16 | 63 | 67 | 71 | 183 | 187 | 191 |
| 17 | 75 | 79 | 83 | 195 | 199 | 203 |
| 18 | 87 | 91 | 95 | 207 | 211 | 215 |
| 19 | 99 | 103 | 107 | 219 | 223 | 227 |
| 20 | 111 | 115 | 119 | 231 | 235 | 239 |

TABLE 11-A3

T5

| No. | Inputs | | | | | Outputs | | | | |
|---|---|---|---|---|---|---|---|---|---|---|
| | 1 | 2 | 3 | 4 | 5 | 1 | 2 | 3 | 4 | 5 |
| 1 | 180 | 192 | 204 | 216 | 228 | 360 | 372 | 384 | 396 | 408 |
| 2 | 184 | 196 | 208 | 220 | 232 | 364 | 376 | 388 | 400 | 412 |
| 3 | 188 | 200 | 212 | 224 | 236 | 368 | 380 | 392 | 404 | 416 |
| 4 | 181 | 193 | 205 | 217 | 229 | 361 | 373 | 385 | 397 | 409 |
| 5 | 185 | 197 | 209 | 221 | 233 | 365 | 377 | 389 | 401 | 413 |
| 6 | 189 | 201 | 213 | 225 | 237 | 369 | 381 | 393 | 405 | 417 |
| 7 | 182 | 194 | 206 | 218 | 230 | 362 | 374 | 386 | 398 | 410 |
| 8 | 186 | 198 | 210 | 222 | 234 | 366 | 378 | 390 | 402 | 414 |
| 9 | 190 | 202 | 214 | 226 | 238 | 370 | 382 | 394 | 406 | 418 |
| 10 | 183 | 195 | 207 | 219 | 231 | 363 | 375 | 387 | 399 | 411 |
| 11 | 187 | 199 | 211 | 223 | 235 | 367 | 379 | 391 | 403 | 415 |
| 12 | 191 | 203 | 215 | 227 | 239 | 371 | 383 | 395 | 407 | 419 |

TABLE 11-B1

| | R5 | | | | | | | | | |
|---|---|---|---|---|---|---|---|---|---|---|
| | Inputs | | | | | Outputs | | | | |
| No. | 1 | 2 | 3 | 4 | 5 | 1 | 2 | 3 | 4 | 5 |
| 1 | 420 | 421 | 422 | 423 | 424 | 600 | 601 | 602 | 603 | 604 |
| 2 | 425 | 426 | 427 | 428 | 429 | 605 | 606 | 607 | 608 | 609 |
| 3 | 430 | 431 | 432 | 433 | 434 | 610 | 611 | 612 | 613 | 614 |
| 4 | 435 | 436 | 437 | 438 | 439 | 615 | 616 | 617 | 618 | 619 |
| 5 | 440 | 441 | 442 | 443 | 444 | 620 | 621 | 622 | 623 | 624 |
| 6 | 445 | 446 | 447 | 448 | 449 | 625 | 626 | 627 | 628 | 629 |
| 7 | 450 | 451 | 452 | 453 | 454 | 630 | 631 | 632 | 633 | 634 |
| 8 | 455 | 456 | 457 | 458 | 459 | 635 | 636 | 637 | 638 | 639 |
| 9 | 460 | 461 | 462 | 463 | 464 | 640 | 641 | 642 | 643 | 644 |
| 10 | 465 | 466 | 467 | 468 | 469 | 645 | 646 | 647 | 648 | 649 |
| 11 | 470 | 471 | 472 | 473 | 474 | 650 | 651 | 652 | 653 | 654 |
| 12 | 475 | 476 | 477 | 478 | 479 | 655 | 656 | 657 | 658 | 659 |

TABLE 11-B2

| | R3 | | | | | |
|---|---|---|---|---|---|---|
| | Inputs | | | Outputs | | |
| No. | 1 | 2 | 3 | 1 | 2 | 3 |
| 1 | 600 | 620 | 640 | 720 | 740 | 760 |
| 2 | 601 | 621 | 641 | 721 | 741 | 761 |
| 3 | 602 | 622 | 642 | 722 | 742 | 762 |
| 4 | 603 | 623 | 643 | 723 | 743 | 763 |
| 5 | 604 | 624 | 644 | 724 | 744 | 764 |
| 6 | 605 | 625 | 645 | 725 | 745 | 765 |
| 7 | 606 | 626 | 646 | 726 | 746 | 766 |
| 8 | 607 | 627 | 647 | 727 | 747 | 767 |
| 9 | 608 | 628 | 648 | 728 | 748 | 768 |
| 10 | 609 | 629 | 649 | 729 | 749 | 769 |
| 11 | 610 | 630 | 650 | 730 | 750 | 770 |
| 12 | 611 | 631 | 651 | 731 | 751 | 771 |
| 13 | 612 | 632 | 652 | 732 | 752 | 772 |
| 14 | 613 | 633 | 653 | 733 | 753 | 773 |
| 15 | 614 | 634 | 654 | 734 | 754 | 774 |
| 16 | 615 | 635 | 655 | 735 | 755 | 775 |
| 17 | 616 | 636 | 656 | 736 | 756 | 776 |
| 18 | 617 | 637 | 657 | 737 | 757 | 777 |
| 19 | 618 | 638 | 658 | 738 | 758 | 778 |
| 20 | 619 | 639 | 659 | 739 | 759 | 779 |

TABLE 11-B3

| | R4 | | | | | | | |
|---|---|---|---|---|---|---|---|---|
| | Inputs | | | | Outputs | | | |
| No. | 1 | 2 | 3 | 4 | 1 | 2 | 3 | 4 |
| 1 | 720 | 725 | 730 | 735 | 780 | 785 | 790 | 795 |
| 2 | 721 | 726 | 731 | 736 | 781 | 786 | 791 | 796 |
| 3 | 722 | 727 | 732 | 737 | 782 | 787 | 792 | 797 |
| 4 | 723 | 728 | 733 | 738 | 783 | 788 | 793 | 798 |
| 5 | 724 | 729 | 734 | 739 | 784 | 789 | 794 | 799 |
| 6 | 740 | 745 | 750 | 755 | 800 | 805 | 810 | 815 |
| 7 | 741 | 746 | 751 | 756 | 801 | 806 | 811 | 816 |
| 8 | 742 | 747 | 752 | 757 | 802 | 807 | 812 | 817 |
| 9 | 743 | 748 | 753 | 758 | 803 | 808 | 813 | 818 |
| 10 | 744 | 749 | 754 | 759 | 804 | 809 | 814 | 819 |
| 11 | 760 | 765 | 770 | 775 | 820 | 825 | 830 | 835 |
| 12 | 761 | 766 | 771 | 776 | 821 | 826 | 831 | 836 |
| 13 | 762 | 767 | 772 | 777 | 822 | 827 | 832 | 837 |
| 14 | 763 | 768 | 773 | 778 | 823 | 828 | 833 | 838 |
| 15 | 764 | 769 | 774 | 779 | 824 | 829 | 834 | 839 |

For example, the input data array points a0 through a59 are coupled to the inputs of the 4-point input section blocks T4 in accordance with the relationship as shown in Tables 10 and 11-A1. The outputs from the blocks T4 are indicated as being coupled to the inputs of the blocks T3 which have the same data point numerals (see Tables 11-A1 and 11-A2). For example, the output of the first T4 block having the data point reference number 60 is coupled to the first input of the first T3 block. For another example, the fourth output of the fifteenth T4 block which is referenced as 119 is coupled to the third input of the twentieth T3 block as indicated in Table 11-A1 and 11-A2. Similarly, the outputs of the T3 3-point input section blocks are correspondingly coupled to the inputs of the T5 5-point input section blocks using the relationship of equivalent data points. An example of this is the first output of the first T3 block is coupled to the first input of the first T5 block both having the equivalent data point numeral 180. Another example is the second output of the tenth T3 block is coupled to the fifth input of the fifth T5 block both exhibiting the data point numeral 233.

The outputs of the T5 blocks are multiplied by their corresponding multiplication constants M1 through M60 as shown in FIG. 11A and the outputs of the multiplication section being denoted as 420 through 479 are the inputs to the R5 5-point output section blocks in accordance with that tabulated in Table 11-B1. Equivalent data point numerals are again used as a basis for indicating coupling. In this manner, the architectural interconnection structure between the R5, R3 and R4 transform blocks may be ascertained from Tables 11-B1, B2, and B3. The outputs of the final column of R4 transform blocks being enumerated 780 through 839 correspond to the output frequency array elements A0 through A59 in the nodal relationship as shown in Table 10 hereabove.

As has been described hereabove in connection with the input section of the 30-point transform of FIGS. 5A and 6A, input data point arrays comprising all real portions of the input data points and all imaginary portions of the input data points are individually operated on by the input section of the 60-point transform. Similarly, the operation results in two sets of intermediate data points, one being all real values and the other being all imaginary values, both sets being represented by the nodes 360 through 419 apparent from the Table 11A. For the purposes of distinguishing one from the other, the real intermediate data points may be denoted as 360R–419R and the imaginary ones as 360I–419I. Just as in the 30-point transform case both sets 360R–419R and 360I–419I may be computed by the input section of the 60-point transform prior to continuing signal flow operations by the intermediate multiplication section denoted by M1 through M60.

In deriving the intermediate constants Kx wherein x goes from 1 through 6, for the present embodiment of the 60-point transform, the equations as provided in Table 12 shown herebelow are used.

TABLE 12

$K1 = (W^{20} + W^{40})/12$
$K2 = (W^{20} - W^{40})/12$

TABLE 12-continued $$K3 = (W^{12} + W^{24} + W^{36} + W^{48})/4$$
$$K4 = (-W^{12} + W^{24} + W^{36} - W^{48})/4$$
$$K5 = (-W^{12} + W^{24} - W^{36} + W^{48})/4$$
$$K6 = (-W^{12} - W^{24} + W^{36} + W^{48})/4$$
$$K3 + K4 + K5 + K6 = W^{48}$$
$$K3 + K4 - K5 + K6 = W^{36}$$
$$K3 - K4 - K5 - K6 = W^{12}$$
$$K3 + K4 + K5 - K6 = W^{24}$$
$$K1 + K2 = W^{20}$$
$$K1 - K2 = W^{40}$$

Keep in mind that the W terms are merely representative of vectors having the form cos $\theta$-j sin $\theta$ and the constants K1 through K6 are equated by the vector addition and subtractions of these terms. The details of these type calculations have been provided hereabove in connection with the description of FIG. 7 and Tables 2 and 3. Thereafter, the constants M1 through M60 may be derived utilizing the previously derived constants K1 through K6 with known Winograd techniques. The equations for deriving the constants M1 through M60 are shown in Table 13 found herebelow. In addition to the multiplication constants M1 through M60, the auxiliary multiplication constants associated with the output sections of the 5-point transforms as described hereabove, are also shown in Table 13. These auxiliary multiplication constants are denoted by the primed data point reference numerals on which the multipliers operate. For example, the multiplication factor -K6/K5 additionally operates on the 422 data point to yield the primed 422' data point. Note that the primed data points as provided in Table 13 are not consecutively numbered, but are numbered in consecutive pairs separated by three missing data point numerals. For example, 422' and 423', 427' and 428', 432' and 433', and so on. This result is primarily due to the nesting of the shorter transforms to form the 60-point transform in the architecture as shown in FIGS. 11A and 11B.

intermediate arrays 360R–419R and 360I–419I may be scrambled prior to being operated on by the multiplication constants to yield therefrom two sets of data points for the nodes 420 through 479 of the 60-point transform (see Table 11-B1, B2 and B3)—one being all real values and the other being all imaginary values being denoted by 420R–479R and 420I–479I, respectively. Obviously, the reason for this is that the output section of the 60-point transform, like that of the 30-point transform, may either operate on all real data array points or all imaginary data array points, but not on both concurrently. The details of this have been described above in connection with the pipeline processor embodiment for the 30-point transform.

Once having determined the identity (real or imaginary) of each of the multiplication constants M1–M60 and the auxiliary multiplication constants, the scrambling of the elements of the intermediate arrays 420R–479R, and 420I–479I may be effected to similarly provide elements of a first and second composite array like that displayed in Table 5, for example, which are operated on by the multiplication section of the 60-point transform of FIGS. 11A and 11B to yield real and imaginary arrays at the signal nodes 420–479 including the auxiliary signal nodes. Note that the group of nodes which are primed in Table 13 are multiplied correspondingly by both sets of constants associated therewith.

Figure 12:
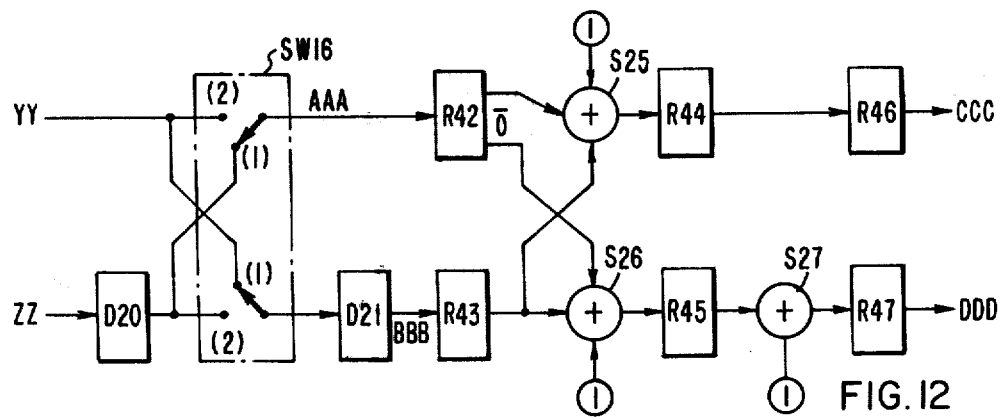
FIG. 12 is a schematic block diagram extension to the embodiment of FIGS. 8A, 8B and 8C which in combination form an embodiment of a multipoint pipeline processor based on the 60-point signal flow graph of FIGS. 11A and 11B.

The foregoing description of 60-point transform signal flow graph depicted in FIGS. 11A and 11B and more comprehensively detailed in the Tables 11-A1, A2 and A3 and 11-B1, B2 and B3 has been provided as an introductory basis for a 60-point transform pipeline processor, an embodiment of which is shown in the schematic block diagram of FIGS. 8A, 8B and 8C and including the additional circuitry illustrated by schematic block diagram of FIG. 12. The structural description of the schematic as shown in FIGS. 8A, 8B and 8C has

TABLE 13

| M1 = K3 − 1 | M21 = (K1 − 1)(K3 − 1) | M41 = K2 (K3 − 1) | 422' = −K6/K5 |
|---|---|---|---|
| M2 = K4 | M22 = (K1 − 1)K4 | M42 = K2 K4 | 423' = K5/K6 |
| M3 = K5 | M23 = (K1 − 1)K5 | M43 = K2 K5 | 427' = −K6/K5 |
| M4 = K6 | M24 = (K1 − 1)K6 | M44 = K2 K6 | 428' = K5/K6 |
| M5 = 1 | M25 = (K1 − 1) | M45 = K2 | 432' = −K6/K5 |
| M6 = (K1 − 1)(K3 − 1) | M26 = K2(K3 − 1) | M46 = −j (K3 − 1) | 433' = K5/K6 |
| M7 = (K1 − 1)K4 | M27 = K2 K4 | M47 = −j K4 | 437' = −K6/K5 |
| M8 = (K1 − 1)K5 | M28 = K2 K5 | M48 = −j K5 | 438' = K5/K6 |
| M9 = (K1 − 1)K6 | M29 = K2 K6 | M49 = −j K6 | 442' = −K6/K5 |
| M10 = (K1 − 1)1 | M30 = K2 | M50 = −j | 443' = K5/K6 |
| M11 = K2(K3 − 1) | M31 = K3 − 1 | M51 = −j (K1 − 1) (K3 − 1) | 447' = −K6/K5 |
| M12 = K2 K4 | M32 = K4 | M52 = −j (K1 − 1)K4 | 448' = K5/K6 |
| M13 = K2 K5 | M33 = K5 | M53 = −j (K1 − 1)K5 | 452' = −K6/K5 |
| M14 = K2 K6 | M34 = K6 | M54 = −j (K1 − 1)K6 | 453' = K5/K6 |
| M15 = K2 | M35 = 1 | M55 = −j (K1 − 1) | 457' = −K6/K5 |
| M16 = K3 − 1 | M36 = (K1 − 1) (K3 − 1) | M56 = −j K2(K3 − 1) | 458' = K5/K6 |
| M17 = K4 | M37 = (K1 − 1)K4 | M57 = −j K2(K4 − 1) | 462' = −K6/K5 |
| M18 = K5 | M38 = (K1 − 1)K5 | M58 = −j K2 K5 | 463' = K5/K6 |
| M19 = K6 | M39 = (K1 − 1)K6 | M59 = −j K2 K6 | 467' = −K6/K5 |
| M20 = 1 | M40 = (K1 − 1) 1 | M60 = −j K2 | 468' = K5/K6 |
| | | | 472' = −K6/K5 |
| | | | 473' = K5/K6 |
| | | | 477' = −K6/K5 |
| | | | 478' = K5/K6 |

Just as in the 30-point transform case, in deriving the composite multiplication constants M1 through M60 of the nested 4-, 3- and 5-point transforms for the 60-point transform and the auxiliary multiplication constants associated with the twelve output sections of the 5-transforms, the resultant values may either be real or imaginary, but not complex. Here again, it can be appreciated that the previously computed elements of the been described in detail hereabove. To make this embodiment suitable to perform a 60-point transform, all of the delay lines D1 through D19 may be doubled in size. For example, D1 and D2 for the 60-point pipeline processor may be increased to two clock pulse delay lines and likewise D3 and D4 may be increased to four clock pulse delay lines and so on throughout the pipeline processor until D18 and D19 which may be extended to four clock pulse delay lines. The additional circuitry as shown by the schematic in FIG. 12 is added at the pipeline flow points YY and ZZ.

Referring to FIG. 12, coupled to the rail nodes YY and ZZ is a delay line/switch set circuit arrangement similar to the ones described in connection with the embodiment of FIGS. 8A, 8B and 8C. The delay lines are disposed at the bottom rail upstream and downstream of a switch set SW16. The upstream delay line D20 is a two clock pulse delay line and the downstream delay line D21 is also a two clock pulse delay line. The switch set SW16 comprises two SPDT functional switches arranged similarly to that described hereabove. There following, is a butterfly section wherein resistors R42 and R44 and an adder S25 are associated with the information flow of the top rail of the pipeline processor and registers R43 and R45 and an adder S26 are associated with the information flow of the bottom rail thereof. The adder S26 performs the subtraction operation thereof. Coupled to the output of the register R45 on the bottom rail is another adder unit S27 utilized primarily for the purposes of digital roundoff. Thereafter, the top and bottom rails are again buffered with two more registers R46 and R47, respectively, providing the outputs denoted as CCC and DDD from the 60-point pipeline processor embodiment.

Since the 2-rail 60-point pipeline processor embodiment is similar in circuit structure to that of the 30-point pipeline processor except for the extended portion as shown in FIG. 12, the operation of its elemental blocks is similar to that of the 30-point pipeline processor as described hereabove. A comprehensive exhibition of a typical operation of the input section of the 60-point pipeline processor embodiment is shown in the Tables 14A, 14B and 14C shown below.

TABLE 14A

| TIME | A | B | C | D | E | F | G | I | H | J | K | L | M | N | P | Q | R | S | T | U |
|---|---|---|---|---|---|---|---|---|---|---|---|---|---|---|---|---|---|---|---|---|
| 0 | 4 | 5 | | | | | | | | | | | | | | | | | | |
| 1 | 6 | 7 | | | | | | | | | | | | | | | | | | |
| 2 | 8 | 9 | 64 | 65 | | | | | | | | | | | | | | | | |
| 3 | 10 | 11 | 66 | 67 | | | | | | | | | | | | | | | | |
| 4 | 0 | 1 | 68 | 69 | 65 | 68 | 64 | | | | | | | | | | | | | |
| 5 | 2 | 3 | 70 | 71 | 67 | 70 | 66 | | | | | | | | | | | | | |
| 6 | X | X | 60 | 61 | 69 | 69 | 65 | 128 | 124 | | | 124 | | | | | | | | |
| 7 | X | X | 62 | 63 | 71 | 71 | 67 | 130 | 126 | | | 126 | | | | | | | | |
| 8 | 16 | 17 | X | X | 61 | X | 60 | 129 | 125 | | | 125 | | | | | | | | |
| 9 | 18 | 19 | X | X | 63 | X | 62 | 131 | 127 | | | 127 | | | | | | | | |
| 10 | 20 | 21 | 76 | 77 | X | X | 61 | 120 | 120 | 128 | 120 | 128 | 124 | | | | | | | |
| 11 | 22 | 23 | 78 | 79 | X | X | 63 | 122 | 122 | 130 | 122 | 130 | 126 | | | | | | | |
| 12 | 12 | 13 | 80 | 81 | 77 | 80 | 76 | 121 | 121 | 129 | 121 | 129 | 125 | 180 | 184 | | | | | |
| 13 | 14 | 15 | 82 | 83 | 79 | 82 | 78 | 123 | 123 | 131 | 123 | 131 | 127 | 182 | 186 | | | | | |
| 14 | X | X | 72 | 73 | 81 | 81 | 77 | 140 | 136 | 120 | 120 | 136 | 128 | 181 | 185 | | | | | |
| 15 | X | X | 74 | 75 | 83 | 83 | 79 | 142 | 138 | 122 | 122 | 138 | 130 | 183 | 187 | | | | | |
| 16 | 28 | 29 | X | X | 73 | X | 72 | 141 | 137 | 121 | 121 | 137 | 129 | | 188 | | | | | |
| 17 | 30 | 31 | X | X | 75 | X | 74 | 143 | 139 | 123 | 123 | 139 | 131 | | 190 | | | | | |
| 18 | 32 | 33 | 88 | 89 | X | X | 73 | 132 | 132 | 140 | 132 | 140 | 136 | | 189 | | | | | |
| 19 | 34 | 35 | 90 | 91 | X | X | 75 | 134 | 134 | 142 | 134 | 142 | 138 | | 191 | | | | | |
| 20 | 24 | 25 | 92 | 93 | 89 | 92 | 88 | 133 | 133 | 141 | 133 | 141 | 137 | 192 | 196 | 184 | 192 | 180 | | |
| 21 | 26 | 27 | 94 | 95 | 91 | 94 | 90 | 135 | 135 | 143 | 135 | 143 | 139 | 194 | 198 | 186 | 194 | 182 | | |
| 22 | X | X | 84 | 85 | 93 | 93 | 89 | 152 | 148 | 132 | 132 | 148 | 140 | 193 | 197 | 185 | 193 | 181 | 240 | 252 |
| 23 | X | X | 86 | 87 | 95 | 95 | 91 | 154 | 150 | 134 | 134 | 150 | 142 | 195 | 199 | 187 | 195 | 183 | 242 | 254 |
| 24 | 40 | 41 | X | X | 85 | X | 84 | 153 | 149 | 133 | 133 | 149 | 141 | | 200 | 188 | | | 241 | 253 |
| 25 | 42 | 43 | X | X | 87 | X | 86 | 155 | 151 | 135 | 135 | 151 | 143 | | 202 | 190 | | | 243 | 255 |
| 26 | 44 | 45 | 100 | 101 | X | X | 85 | 144 | 144 | 152 | 144 | 152 | 148 | | 201 | 189 | | | | |
| 27 | 46 | 47 | 102 | 103 | X | X | 87 | 146 | 146 | 154 | 146 | 154 | 150 | | 203 | 191 | | | | |
| 28 | 36 | 37 | 104 | 105 | 101 | 104 | 100 | 145 | 145 | 153 | 145 | 153 | 149 | 204 | 208 | 196 | 196 | 184 | | |
| 29 | 38 | 39 | 106 | 107 | 103 | 106 | 102 | 147 | 147 | 155 | 147 | 155 | 151 | 206 | 210 | 198 | 198 | 186 | | |

| TIME | V | W | X | Y | Z | AA | BB | CC | DD | SW6 | SW5 | SW4 | SW3 | SW2 | SW1 |
|---|---|---|---|---|---|---|---|---|---|---|---|---|---|---|---|
| 0 | | | | | | | | | | | | | | | |
| 1 | | | | | | | | | | | | | | | |
| 2 | | | | | | | | | | | | | | | 1 |
| 3 | | | | | | | | | | | | | | | 1 |
| 4 | | | | | | | | | | | | | | | 2 |
| 5 | | | | | | | | | | | | | | | 2 |
| 6 | | | | | | | | | | | | | | 1 | 1 |
| 7 | | | | | | | | | | | | | | 1 | 1 |
| 8 | | | | | | | | | | | | | | 1 | 2 |
| 9 | | | | | | | | | | | | | | 1 | 2 |
| 10 | | | | | | | | | | | | | | 2 | 1 |
| 11 | | | | | | | | | | | | | | 2 | 1 |
| 12 | | | | | | | | | | | | | 1 | 2 | 2 |
| 13 | | | | | | | | | | | | | 1 | 2 | 2 |
| 14 | | | | | | | | | | | | | 1 | 1 | 1 |
| 15 | | | | | | | | | | | | | 1 | 1 | 1 |
| 16 | | | | | | | | | | | | | 1 | 1 | 2 |
| 17 | | | | | | | | | | | | | 1 | 1 | 2 |
| 18 | | | | | | | | | | | | | 1 | 2 | 1 |
| 19 | | | | | | | | | | | | | 1 | 2 | 1 |
| 20 | | | | | | | | | | | | | 2 | 2 | 2 |
| 21 | | | | | | | | | | | | | 2 | 2 | 2 |
| 22 | | | | | | | | | | | | 1 | 2 | 1 | 1 |
| 23 | | | | | | | | | | | | 1 | 2 | 1 | 1 |
| 24 | | | | | | | | | | | | 1 | 2 | 1 | 2 |
| 25 | | | | | | | | | | | | 1 | 2 | 1 | 2 |

TABLE 14A-continued

| | | | | | | | | | | | | | | | | | | | |
|---|---|---|---|---|---|---|---|---|---|---|---|---|---|---|---|---|---|---|---|
| 26 | | | | | | | | | | | | | | | | 1 | 2 | 2 | 1 |
| 27 | | | | | | | | | | | | | | | | 1 | 2 | 2 | 1 |
| 28 | | | | | | | | | | | | | | | | 1 | 1 | 2 | 2 |
| 29 | | | | | | | | | | | | | | | | 1 | 1 | 2 | 2 |

TABLE 14B

| TIME | A | B | C | D | E | F | G | I | H | J | K | L | M | N | P | Q | R | S | T | U |
|---|---|---|---|---|---|---|---|---|---|---|---|---|---|---|---|---|---|---|---|---|
| 30 | X | X | 96 | 97 | 105 | 105 | 101 | 164 | 160 | 144 | 144 | 160 | 152 | 205 | 209 | 197 | 197 | 185 | 244 | 256 |
| 31 | X | X | 98 | 99 | 107 | 107 | 103 | 166 | 162 | 146 | 146 | 162 | 154 | 207 | 211 | 199 | 199 | 187 | 246 | 258 |
| 32 | 52 | 53 | X | X | 97 | X | 96 | 165 | | 145 | 145 | 161 | 153 | | 212 | 200 | 200 | 188 | 245 | 257 |
| 33 | 54 | 55 | X | X | 99 | X | 98 | 167 | 165 | 147 | 147 | 163 | 155 | | 214 | 202 | 202 | 190 | 247 | 259 |
| 34 | 56 | 57 | 112 | 113 | X | X | 97 | 156 | 156 | 164 | 156 | 164 | 160 | | 213 | 201 | 201 | 189 | 248 | 260 |
| 35 | 58 | 59 | 114 | 115 | X | X | 99 | 158 | 158 | 166 | 158 | 166 | 162 | | 215 | 203 | 203 | 191 | 250 | 262 |
| 36 | 48 | 49 | 116 | 117 | 113 | 116 | 112 | 157 | 157 | 165 | 157 | 165 | 161 | 216 | 220 | 208 | 216 | 204 | 249 | 261 |
| 37 | 50 | 51 | 118 | 119 | 115 | 118 | 114 | 159 | 159 | 167 | 159 | 167 | 163 | 218 | 222 | 210 | 218 | 206 | 251 | 263 |
| 38 | X | X | 108 | 109 | 117 | 117 | 113 | 176 | 172 | 156 | 156 | 172 | 164 | 217 | 221 | 209 | 217 | 205 | 264 | 276 |
| 39 | X | X | 110 | 111 | 119 | 119 | 115 | 178 | 174 | 158 | 158 | 174 | 166 | 219 | 223 | 211 | 219 | 207 | 266 | 278 |
| 40 | X | X | X | X | 109 | X | 108 | 177 | 173 | 157 | 157 | 173 | 165 | | 224 | 212 | | | 265 | 277 |
| 41 | X | X | X | X | 111 | X | 110 | 179 | 175 | 159 | 159 | 175 | 167 | | 226 | 214 | | | 267 | 279 |
| 42 | X | X | X | X | X | X | 109 | 168 | 168 | 176 | 168 | 176 | 172 | | 225 | 213 | | | | |
| 43 | X | X | X | X | X | X | 111 | 170 | 170 | 178 | 170 | 178 | 174 | | 227 | 215 | | | | |
| 44 | X | X | X | X | X | X | X | 169 | 169 | 177 | 169 | 177 | 173 | 228 | 232 | 220 | 220 | 208 | | |
| 45 | X | X | X | X | X | X | X | 171 | 171 | 179 | 171 | 179 | 175 | 230 | 234 | 222 | 222 | 210 | | |
| 46 | X | X | X | X | X | X | X | X | X | 168 | 168 | X | 176 | 229 | 233 | 221 | 221 | 209 | 268 | 280 |
| 47 | X | X | X | X | X | X | X | X | X | 170 | 170 | X | 178 | 231 | 235 | 223 | 223 | 211 | 270 | 282 |
| 48 | | | X | X | X | X | X | X | X | 169 | 169 | X | 177 | | 236 | 224 | 224 | 212 | 269 | 281 |
| 49 | | | X | X | X | X | X | X | X | 171 | 171 | X | 179 | | 238 | 226 | 226 | 214 | 271 | 283 |
| 50 | | | | | | | | | | | | | | | 237 | 225 | 225 | 213 | 272 | 284 |
| 51 | | | | | | | | | | | | | | | 239 | 227 | 227 | 215 | 274 | 286 |
| 52 | | | | | | | | | | | | | | X | X | 232 | X | 228 | 273 | 285 |
| 53 | | | | | | | | | | | | | | X | X | 234 | X | 230 | 275 | 287 |
| 54 | | | | | | | | | | | | | | X | X | 233 | X | 229 | 288 | 288 |
| 55 | | | | | | | | | | | | | | X | X | 235 | X | 231 | 290 | 290 |
| 56 | | | | | | | | | | | | | | X | X | 236 | X | | 289 | 289 |
| 57 | | | | | | | | | | | | | | X | X | 238 | X | | 291 | 291 |
| 58 | | | | | | | | | | | | | | X | X | 237 | X | | | |
| 59 | | | | | | | | | | | | | | X | X | 239 | X | | | |

| TIME | X | W | V | Y | Z | AA | BB | CC | DD | SW6 | SW5 | SW4 | SW3 | SW2 | SW1 |
|---|---|---|---|---|---|---|---|---|---|---|---|---|---|---|---|
| 30 | | | | | | | | | | | | 1 | 1 | 1 | 1 |
| 31 | | | | | | | | | | | | 1 | 1 | 1 | 1 |
| 32 | | | | | | | | | | | | 1 | 1 | 1 | 2 |
| 33 | | | | | | | | | | | | 1 | 1 | 1 | 2 |
| 34 | | | | | | | | | | | | 1 | 1 | 2 | 1 |
| 35 | | | | | | | | | | | | 1 | 1 | 2 | 1 |
| 36 | | | | | | | | | | | | 1 | 2 | 2 | 2 |
| 37 | | | | | | | | | | | | 1 | 2 | 2 | 2 |
| 38 | 240 | 264 | 252 | | | | | | | | 1 | 2 | 2 | 1 | 1 |
| 39 | 242 | 266 | 254 | | | | | | | | 1 | 2 | 2 | 1 | 1 |
| 40 | 241 | 265 | 253 | 300 | 324 | | | | | | 1 | 2 | 2 | 1 | 2 |
| 41 | 243 | 267 | 255 | 302 | 326 | 300 | | 360 | | 1 | 1 | 2 | 2 | 1 | 2 |
| 42 | | | | 301 | 325 | 302 | | 362 | 324 | 1 | 1 | 2 | 2 | 2 | 1 |
| 43 | | | | 303 | 327 | 301 | | 361 | 326 | 1 | 1 | 2 | 2 | 2 | 1 |
| 44 | | | | | | 303 | | 363 | 325 | 1 | 1 | 2 | 1 | 2 | 2 |
| 45 | | | | | | | | * | 327 | 1 | 1 | 2 | 1 | 2 | 2 |
| 46 | 244 | 268 | 256 | | | | | * | * | 1 | 1 | 2 | 1 | 1 | 1 |
| 47 | 246 | 270 | 258 | | | | | * | * | 1 | 1 | 2 | 1 | 1 | 1 |
| 48 | 245 | 269 | 257 | 304 | 328 | | | * | * | 1 | 1 | 2 | 1 | 1 | 2 |
| 49 | 247 | 271 | 259 | 301 | 330 | 304 | | 364 | * | 1 | 1 | 2 | 1 | 1 | 2 |
| 50 | 248 | 272 | 260 | 305 | 329 | 306 | | 366 | 328 | 1 | 1 | 2 | 1 | 2 | 1 |
| 51 | 250 | 274 | 262 | 307 | 331 | 305 | | 365 | 330 | 1 | 1 | 2 | 1 | 2 | 1 |
| 52 | 249 | 273 | 261 | 308 | 332 | 307 | | 367 | 329 | 1 | 1 | 2 | 2 | 2 | 2 |
| 53 | 251 | 275 | 263 | 310 | 334 | 308 | | 368 | 331 | 1 | 1 | 2 | 2 | 2 | 2 |
| 54 | 252 | 276 | 276 | 309 | 333 | 310 | | 370 | 332 | 1 | 1 | 1 | 2 | 1 | 1 |
| 55 | 254 | 278 | 278 | 311 | 335 | 309 | | 369 | 334 | 1 | 1 | 1 | 2 | 1 | 1 |
| 56 | 253 | 277 | 277 | 336 | 312 | 311 | | 371 | 333 | 1 | 1 | 1 | 2 | 1 | 2 |
| 57 | 255 | 279 | 279 | 338 | 314 | 336 | | 396 | 335 | 1 | 1 | 1 | 2 | 1 | 2 |
| 58 | | | | 337 | 313 | 338 | | 398 | 312 | 1 | 1 | 1 | 2 | 2 | 1 |
| 59 | | | | 339 | 315 | 337 | | 397 | 314 | 1 | 1 | 1 | 2 | 2 | 1 |

TABLE 14C

| TIME | A | B | C | D | E | F | G | H | I | J | K | L | M | N | P | Q | R | S | T | U | V | W | X | Y | Z | AA | BB | CC | DD | SW6 | SW5 | SW4 | SW3 | SW2 | SW1 |
|---|---|---|---|---|---|---|---|---|---|---|---|---|---|---|---|---|---|---|---|---|---|---|---|---|---|---|---|---|---|---|---|---|---|---|---|
| 60 | | | | | | | | | | | | | | | | | | | | | | | | | | | | | | | | | | | |
| 61 | | | | | | | | | | | | | | | | | | | | | | | | | | | | 399 | 313 | 1 | | | | | |
| 62 | | | | | | | | | | | | | | | | | | 232 | | | | | | | | | | * | 315 | 1 | 1 | | | | |
| 63 | | | | | | | | | | | | | | | | | X | 234 | | | | | | | | | | * | * | 1 | 1 | 1 | | | |
| 64 | | | | | | | | | | | | | | | | | X | 233 | 292 | 292 | 280 | 280 | 256 | | 316 | 339 | | * | * | 1 | 1 | 1 | | | |
| 65 | | | | | | | | | | | | | | | | | X | 235 | 294 | 294 | 282 | 282 | 258 | 340 | 318 | 340 | | 400 | 316 | 1 | 1 | 1 | | | |
| 66 | | | | | | | | | | | | | | | | | X | 236 | 293 | 293 | 281 | 281 | 257 | 341 | 317 | 342 | | 402 | 318 | 1 | 1 | 1 | | | |
| 67 | | | | | | | | | | | | | | | | | X | 238 | 295 | 295 | 283 | 283 | 259 | 343 | 319 | 341 | | 401 | 317 | 1 | 1 | 1 | | | |
| 68 | | | | | | | | | | | | | | | | | X | 238 | 296 | 296 | 284 | 284 | 260 | 344 | 320 | 343 | | 403 | 319 | 1 | 1 | 1 | | | |
| 69 | | | | | | | | | | | | | | | | | X | 237 | 298 | 298 | 286 | 286 | 262 | 346 | 322 | 344 | | 404 | 320 | 1 | 1 | 1 | | | |
| 70 | | | | | | | | | | | | | | | | | X | 239 | 297 | 297 | 285 | 285 | 261 | 345 | 321 | 346 | | 406 | 322 | 1 | 1 | 1 | | | |
| 71 | | | | | | | | | | | | | | | | | | | 299 | 299 | 287 | 287 | 263 | 347 | 323 | 345 | | 405 | 321 | 1 | 1 | 1 | | | |
| 72 | | | | | | | | | | | | | | | | | | | | | 288 | X | 288 | 348 | 348 | 347 | | 407 | 323 | 1 | 1 | 1 | | | |
| 73 | | | | | | | | | | | | | | | | | | | | | 290 | X | 290 | 350 | 350 | 348 | | 408 | 348 | 2 | 1 | 1 | | | |
| 74 | | | | | | | | | | | | | | | | | | | | | 289 | X | 289 | 349 | 349 | 350 | | 410 | 350 | 2 | 2 | 1 | | | |
| 75 | | | | | | | | | | | | | | | | | | | | | 291 | X | 291 | 351 | 351 | 349 | | 409 | 349 | 2 | 2 | 1 | | | |
| 76 | | | | | | | | | | | | | | | | | | | | | | X | | | | 351 | | 411 | 351 | 2 | 2 | 1 | | | |
| 77 | | | | | | | | | | | | | | | | | | | | | | X | | | | | | * | * | 2 | 2 | 1 | | | |
| 78 | | | | | | | | | | | | | | | | | | | | | 292 | X | 292 | | | | 300 | * | * | 2 | 2 | 1 | | | |
| 79 | | | | | | | | | | | | | | | | | | | | | 294 | X | 294 | | | | 302 | * | * | 2 | 2 | 1 | | | |
| 80 | | | | | | | | | | | | | | | | | | | | | 293 | X | 293 | | | | 301 | * | * | 2 | 2 | 1 | | | |
| 81 | | | | | | | | | | | | | | | | | | | | | 295 | X | 295 | | 352 | 352 | 303 | | | 2 | 2 | 1 | | | |
| 82 | | | | | | | | | | | | | | | | | | | | | 296 | X | 296 | 352 | 354 | 354 | 304 | 412 | 352 | 2 | 2 | 1 | | | |
| 83 | | | | | | | | | | | | | | | | | | | | | 298 | X | 298 | 354 | 353 | 353 | 306 | 414 | 354 | 2 | 2 | 1 | | | |
| 84 | | | | | | | | | | | | | | | | | | | | | 297 | X | 297 | 353 | 355 | 355 | 305 | 413 | 353 | 2 | 2 | 1 | | | |
| 85 | | | | | | | | | | | | | | | | | | | | | 299 | X | 299 | 355 | 356 | 356 | 307 | 415 | 355 | 2 | 2 | 1 | | | |
| 86 | | | | | | | | | | | | | | | | | | | | | | | | 356 | 358 | 358 | 308 | 416 | 356 | 2 | 2 | 2 | | | |
| 87 | | | | | | | | | | | | | | | | | | | | | | | | 358 | 357 | 357 | 310 | 418 | 358 | 2 | 2 | 2 | | | |
| 88 | | | | | | | | | | | | | | | | | | | | | | | | 357 | 359 | 359 | 309 | 417 | 357 | 2 | 1 | 2 | | | |
| 89 | | | | | | | | | | | | | | | | | | | | | | | | 359 | | | 311 | 419 | 359 | 1 | 1 | 2 | | | |
| | | | | | | | | | | | | | | | | | | | | | | | | | | | | 336 | | | | | | | |

The elements of the input data array a0–a59, denoted by the data points 0 through 59 in accordance with the relationship shown in Table 10, are presented to the 60-point pipeline processor at nodes A and B in predetermined ordered pairs throughout the clock pulse interval from T0 through T37. During the clock pulse interval from T38 to T47 zero input information is presented to the nodes A and B as denoted by the X's in the Tables 14A and 14B. It is noted that the data points provided to the 60-point pipeline processor at nodes A and B during the time T0 through T37 are either from the real input data array or the imaginary input data array. Subsequent to the time T47, the other of the real or imaginary data input array is then provided through the nodes A and B similar to that described in connection with the 30-point pipeline processor hereabove. The input data point information is propagated through the input section of the pipeline to the flow points CC and DD in accordance with the signal flow pattern as shown in Tables 14A, 14B and 14C. The pattern of sequencing the switches SW1 through SW6 is additionally shown in these same Tables.

While the processing is conducted through the pipeline sequentially according to the clock pulses, it is understood that during each clock pulse interval the information at the various flow points is operated on in a parallel fashion primarily by the butterfly sections therein. The intermediate data point outputs from the input section of the 60-point pipeline processor are provided to points CC and DD starting at the clock pulse at time T41 and continues serially thereafter until the time T89. The asterisk appearing in the aforementioned Tables denotes insignificant data point information.

As in the case of the 30-point pipeline processor, the intermediate data points provided at CC are stored in the random access memories RAM's 11 and 12 and likewise, the data point information provided to flow point DD is stored in the RAM 21 and 22. It is understood that the intermediate data points 360R–419R and 360I–419I may be both derived and provided to the RAM's before the scrambling procedure takes place in the present embodiment. The sequential pattern of scrambling of the intermediate data points 360–419 may be programmed in the PROM's 1 and 2 for accessing the data from the appropriate RAM's in a predetermined serial order. It is further understood from the description provided hereabove for the scrambling process of the 30-point pipeline processor that the intermediate data points from the set 360–419 are selected such that when multiplied by the multiplication constants the resultant arrays are either all real or all imaginary. The order in which the intermediate data points are read from the RAM's and passed through the registers R26 and R27 to be operated on by the multiplication units MU1 and MU2, respectively to eventually appear at the flow points EE and FF is shown in the signal flow Tables of 15A, 15B and 15C.

TABLE 15A

| Time | EE | FF | GG | HH | II | JJ | KK | LL | MM | NN | PP | QQ | RR | SS | TT | UU | VV | WW | XX | YY |
|---|---|---|---|---|---|---|---|---|---|---|---|---|---|---|---|---|---|---|---|---|
| 145 | 420 | 424 | | | 544 | | | | | | | | | | | | | | | |
| 146 | 425 | 429 | | | 549 | | | | | | | | | | | | | | | |
| 147 | 430 | 434 | | | 554 | | | | | | | | | | | | | | | |
| 148 | 435 | 439 | | | 559 | | | | | | | | | | | | | | | |
| 149 | * | * | | | | | | | | | | | | | | | | | | |
| 150 | * | * | | | | | | | | | | | | | | | | | | |
| 151 | * | * | | | | | | | | | | | | | | | | | | |
| 152 | * | * | | | | | | | | | | | | | | | | | | |
| 153 | 440 | 444 | | | 564 | | | | | | | | | | | | | | | |
| 154 | 445 | 449 | | | 569 | | | | | | | | | | | | | | | |
| 155 | 450 | 454 | | | 574 | | | | | | | | | | | | | | | |
| 156 | 455 | 459 | | | 579 | | | | | | | | | | | | | | | |
| 157 | 460 | 464 | | | 584 | | | | | | | | | | | | | | | |
| 158 | 465 | 469 | | | 589 | | | | | | | | | | | | | | | |
| 159 | 470 | 474 | | | 594 | | | | | | | | | | | | | | | |
| 160 | 475 | 479 | | | 599 | | | | | | | | | | | | | | | |
| 161 | 422' | 421 | 480 | 540 | 541 | | | | | | | | | | | | | | | |
| 162 | 427' | 426 | 485 | 545 | 546 | 540 | 544 | 544 | | | | | | | | | | | | |
| 163 | 432' | 431 | 490 | 550 | 551 | 545 | 549 | 549 | | | | | | | | | | | | |
| 164 | 437' | 436 | 495 | 555 | 556 | 550 | 554 | 554 | | 604 | | | | | | | | | | |
| 165 | * | 422 | | | | 555 | 559 | 559 | | 609 | | | | | | | | | | |
| 166 | * | 427 | | | | | | | | 614 | | | | | | | | | | |
| 167 | * | 432 | | | | | | | | 619 | | | | | | | | | | |
| 168 | * | 437 | | | | | | | | | | | | | | | | | | |
| 169 | 442' | 441 | 500 | 560 | 561 | | | | | | | | | | | | | | | |
| 170 | 447' | 446 | 505 | 565 | 566 | 560 | 564 | 564 | | | | | | | | | | | | |
| 171 | 452' | 451 | 510 | 570 | 571 | 565 | 569 | 569 | | | | | | | | | | | | |
| 172 | 457' | 456 | 515 | 575 | 576 | 570 | 574 | 574 | | 624 | | | 624 | 604 | | | | | | |
| 173 | 462' | 461 | 520 | 580 | 581 | 575 | 579 | 579 | | 629 | | | 629 | 609 | | | | | | |
| 174 | 467' | 466 | 525 | 585 | 586 | 580 | 584 | 584 | | 634 | | | 634 | 614 | 684 | 664 | | | | |

| Time | ZZ | ZZZ | AAA | BBB | CCC | DDD | SW16 | SW15 | SW14 | SW13 | SW12 | SW11 | SW10 | SW9 | SW8 | SW7 |
|---|---|---|---|---|---|---|---|---|---|---|---|---|---|---|---|---|
| 145 | | | | | | | | | | | | | 1 | | | 2 |
| 146 | | | | | | | | | | | | | 1 | | | 2 |
| 147 | | | | | | | | | | | | | 1 | | | 2 |
| 148 | | | | | | | | | | | | | 1 | | | 2 |
| 149 | | | | | | | | | | | | | 1 | | | 2 |
| 150 | | | | | | | | | | | | | 1 | | | 2 |
| 151 | | | | | | | | | | | | | 1 | | | 2 |
| 152 | | | | | | | | | | | | | 1 | | | 2 |
| 153 | | | | | | | | | | | | | 1 | | | 2 |
| 154 | | | | | | | | | | | | | 1 | | | 2 |
| 155 | | | | | | | | | | | | | 1 | | | 2 |
| 156 | | | | | | | | | | | | | 1 | | | 2 |
| 157 | | | | | | | | | | | | | 1 | | | 2 |

TABLE 15A-continued

| | | | | | | | | | | | | | | | |
|---|---|---|---|---|---|---|---|---|---|---|---|---|---|---|---|
| 158 | | | | | | | | | | | | | 1 | | 2 |
| 159 | | | | | | | | | | | | | 1 | | 2 |
| 160 | | | | | | | | | | | | | 1 | | 2 |
| 161 | | | | | | | | | | | | | 2 | 1 | 1 | 1 |
| 162 | | | | | | | | | | | | 1 | 2 | 1 | 1 | 1 |
| 163 | | | | | | | | | | | 2 | 1 | 2 | 1 | 1 | 1 |
| 164 | | | | | | | | | | 1 | 2 | 1 | 2 | 1 | 1 | 1 |
| 165 | | | | | | | | | | 1 | 2 | 1 | 2 | 1 | 1 | 1 |
| 166 | | | | | | | | | | 1 | 2 | 1 | 2 | 1 | 1 | 1 |
| 167 | | | | | | | | | | 1 | 2 | 1 | 2 | 1 | 1 | 1 |
| 168 | | | | | | | | | | 1 | 2 | 1 | 2 | 1 | 1 | 1 |
| 169 | | | | | | | | | | 1 | 2 | 1 | 2 | 1 | 1 | 1 |
| 170 | | | | | | | | | | 1 | 2 | 1 | 2 | 1 | 1 | 1 |
| 171 | | | | | | | | | | 1 | 2 | 1 | 2 | 1 | 1 | 1 |
| 172 | | | | | | | | | | 2 | 2 | 1 | 2 | 1 | 1 | 1 |
| 173 | | | | | | | | 1 | | 2 | 2 | 1 | 2 | 1 | 1 | 1 |
| 174 | | | | | | 1 | 1 | 2 | 2 | 1 | 2 | 1 | 1 | 1 |

TABLE 15B

| Time | EE | FF | GG | HH | II | JJ | KK | LL | MM | NN | PP | QQ | RR | SS | TT | UU | VV | WW | XX |
|---|---|---|---|---|---|---|---|---|---|---|---|---|---|---|---|---|---|---|---|
| 175 | 472' | 471 | 530 | 590 | 591 | 585 | 589 | 589 | | 639 | | | 639 | 619 | 689 | 669 | | | |
| 176 | 477' | 476 | 535 | 595 | 596 | 590 | 594 | 594 | | 644 | | | 644 | | 694 | 674 | | | |
| 177 | 423' | 423 | 422' | 542 | 543 | 595 | 599 | 599 | | 649 | | | 649 | | 699 | 679 | | | |
| 178 | 428' | 428 | 427' | 547 | 548 | 542 | 541 | 542 | 540 | 654 | | | 654 | | 704 | X | 664 | 704 | 684 |
| 179 | 433' | 433 | 432' | 552 | 553 | 547 | 546 | 547 | 545 | 659 | | | 659 | | 709 | X | 669 | 709 | 689 |
| 180 | 438' | 438 | 437' | 557 | 558 | 552 | 551 | 552 | 550 | 600 | 602 | | | | 714 | X | 674 | 714 | 694 |
| 181 | 462 | 442 | | | 557 | 557 | 556 | 557 | 555 | 605 | 607 | | | | 719 | X | 679 | 719 | 699 |
| 182 | 467 | 447 | | | | | | | | 610 | 612 | | | | | | X | X | 664 |
| 183 | 472 | 452 | | | | | | | | 615 | 617 | | | | | | X | X | 669 |
| 184 | 477 | 457 | | | | | | | | | | | | | | | X | X | 674 |
| 185 | 443' | 443 | 442' | 562 | 563 | | | | | | | | | | | | X | X | 679 |
| 186 | 448' | 448 | 447' | 567 | 568 | 562 | 561 | 562 | 560 | | | | | | | X | | | |
| 187 | 453' | 453 | 452' | 572 | 573 | 567 | 566 | 567 | 565 | | | | | | | X | | | |
| 188 | 458' | 458 | 457' | 577 | 578 | 572 | 571 | 572 | 570 | 620 | 622 | 602 | 620 | 600 | | X | | | |
| 189 | 463' | 463 | 462' | 582 | 583 | 577 | 576 | 577 | 575 | 625 | 627 | 607 | 625 | 605 | | X | | | |
| 190 | 468' | 468 | 467' | 587 | 588 | 582 | 581 | 582 | 580 | 620 | 632 | 612 | 630 | 610 | 680 | 660 | X | X | |
| 191 | 473' | 473 | 472' | 592 | 593 | 587 | 586 | 587 | 585 | 635 | 637 | 617 | 635 | 615 | 685 | 665 | X | X | |
| 192 | 478' | 478 | 477' | 597 | 598 | 592 | 591 | 592 | 590 | 640 | 642 | | 640 | | 690 | 670 | X | X | |
| 193 | | | | | | 597 | 596 | 597 | 595 | 645 | 647 | | 645 | | 695 | 675 | X | X | |
| 194 | | | | | | | 543 | 543 | 541 | 650 | 652 | | 650 | | 700 | X | 660 | 700 | 680 |
| 195 | | | | | | | 548 | 548 | 546 | 655 | 657 | | 655 | | 705 | X | 665 | 705 | 685 |
| 196 | | | | | | | 553 | 553 | 551 | 601 | 603 | 622 | 622 | 602 | 710 | X | 670 | 710 | 690 |
| 197 | | | | | | | 558 | 558 | 556 | 606 | 608 | 627 | 627 | 607 | 715 | X | 675 | 715 | 695 |
| 198 | | | | | | | | | | 611 | 613 | 632 | 632 | 612 | 682 | X | X | X | 660 |
| 199 | | | | | | | | | | 616 | 618 | 637 | 637 | 617 | 687 | 667 | X | X | 665 |
| 200 | | | | | | | | | | | | 642 | 642 | | 692 | 672 | X | X | 670 |
| 201 | | | | | | | | | | | | 647 | 647 | | 697 | 677 | X | X | 675 |
| 202 | | | | | | | 563 | 563 | 561 | | | | 652 | 652 | 702 | X | 662 | 702 | 682 |
| 203 | | | | | | | 568 | 568 | 566 | | | | 657 | 657 | 707 | X | 667 | 707 | 687 |
| 204 | | | | | | | 573 | 573 | 571 | 621 | 623 | 603 | 621 | 601 | 712 | X | 672 | 712 | 692 |

| Time | YY | ZZ | ZZZ | AAA | BBB | CCC | DDD | SW16 | SW15 | SW14 | SW13 | SW12 | SW11 | SW10 | SW9 | SW8 | SW7 |
|---|---|---|---|---|---|---|---|---|---|---|---|---|---|---|---|---|---|
| 175 | | | | | | | | | 1 | 1 | 2 | 2 | 1 | 2 | 1 | 1 | 1 |
| 176 | | | | | | | | | 1 | 1 | 2 | 2 | 1 | 2 | 1 | 1 | 1 |
| 177 | | | | | | | | | 1 | 2 | 2 | 2 | 1 | 2 | 3 | 2 | 1 |
| 178 | | | | | | | | | 2 | 2 | 2 | 2 | 1 | 2 | 3 | 2 | 1 |
| 179 | | | | | | | | | 2 | 2 | 2 | 1 | 1 | 2 | 3 | 2 | 1 |
| 180 | 744 | 764 | | | | | | 1 | 2 | 2 | 1 | 1 | 2 | 2 | 3 | 2 | 1 |
| 181 | 749 | 769 | | | | | | 1 | 2 | 1 | 1 | 1 | 2 | 2 | 3 | 2 | 1 |
| 182 | 754 | 774 | 764 | 754 | 744 | | | 2 | 1 | 1 | 1 | 1 | 2 | 2 | 3 | 2 | 1 |
| 183 | 759 | 779 | 769 | 759 | 749 | | | 2 | 1 | 1 | 1 | 1 | 2 | 2 | 3 | 2 | 1 |
| 184 | 724 | 724 | 774 | 774 | 764 | | | 1 | 1 | 1 | 1 | 1 | 2 | 2 | 3 | 2 | 1 |
| 185 | 729 | 729 | 779 | 779 | 769 | 804 | 814 | 1 | 1 | 2 | 1 | 1 | 2 | 2 | 2 | 2 | 1 |
| 186 | 734 | 734 | 724 | 724 | 724 | 809 | 819 | 2 | 2 | 2 | 1 | 1 | 2 | 2 | 2 | 2 | 1 |
| 187 | 739 | 739 | 729 | 739 | 729 | 824 | 834 | 2 | 2 | 2 | 1 | 1 | 2 | 2 | 2 | 2 | 1 |
| 188 | | | 734 | 734 | 724 | 829 | 839 | 1 | 2 | 2 | 2 | 1 | 2 | 2 | 2 | 2 | 1 |
| 189 | | | 739 | 739 | 729 | 784 | 794 | 1 | 2 | 1 | 2 | 1 | 2 | 2 | 4 | 2 | 1 |
| 190 | | | | | | 789 | 799 | 2 | 1 | 1 | 2 | 1 | 2 | 2 | 4 | 2 | 1 |
| 191 | | | | | | 784 | 794 | 2 | 1 | 1 | 2 | 1 | 2 | 2 | 4 | 2 | 1 |
| 192 | | | | | | 789 | 799 | 1 | 1 | 1 | 2 | 1 | 2 | 2 | 4 | 2 | 1 |
| 193 | | | | | | * | * | 1 | 1 | 2 | 2 | 1 | 2 | | | | |
| 194 | | | | | | * | * | 2 | 2 | 2 | 2 | 1 | 1 | | | | |
| 195 | | | | | | * | * | 2 | 2 | 2 | 2 | 1 | 1 | | | | |
| 196 | 740 | 760 | | | | * | * | 1 | 2 | 2 | 1 | 1 | 1 | | | | |
| 197 | 745 | 765 | | | | * | * | 1 | 2 | 1 | 1 | 1 | 1 | | | | |
| 198 | 750 | 770 | 760 | 750 | 740 | * | * | 2 | 1 | 1 | 1 | 1 | 1 | | | | |
| 199 | 755 | 775 | 765 | 755 | 745 | * | * | 2 | 1 | 1 | 1 | 1 | 1 | | | | |
| 200 | 720 | 720 | 770 | 770 | 760 | * | * | 1 | 1 | 1 | 1 | 1 | 1 | | | | |
| 201 | 725 | 725 | 775 | 775 | 765 | 800 | 810 | 1 | 1 | 2 | 1 | 1 | 1 | | | | |
| 202 | 730 | 730 | 720 | 730 | 720 | 805 | 815 | 2 | 2 | 2 | 1 | 1 | 1 | | | | |

TABLE 15B-continued

| 203 | 735 | 735 | 725 | 735 | 725 | 820 | 830 | 2 | 2 | 2 | 1 | 1 | 1 |
| 204 | 742 | 762 | 730 | 730 | 720 | 825 | 835 | 1 | 2 | 2 | 2 | 1 | 1 |

TABLE 15C

| Time | EE | FF | GG | HH | II | JJ | KK | LL | MM | NN | PP | QQ | RR | SS | TT | UU | VV | WW | XX | YY |
|---|---|---|---|---|---|---|---|---|---|---|---|---|---|---|---|---|---|---|---|---|
| 205 | | | | | | | 578 | 578 | 576 | 626 | 628 | 608 | 626 | 606 | 717 | X | 677 | 717 | 697 | 747 |
| 206 | | | | | | | 583 | 583 | 581 | 631 | 633 | 613 | 631 | 611 | 681 | 661 | X | X | 662 | 752 |
| 207 | | | | | | | 588 | 588 | 586 | 636 | 638 | 618 | 636 | 616 | 686 | 666 | X | X | 667 | 757 |
| 208 | | | | | | | 593 | 593 | 591 | 641 | 643 | 623 | 641 | | 691 | 671 | X | X | 672 | 722 |
| 209 | | | | | | | 598 | 598 | 596 | 646 | 648 | | 646 | | 696 | 676 | X | X | 677 | 727 |
| 210 | | | | | | | | | 543 | 651 | 653 | | 651 | | 701 | X | 661 | 701 | 681 | 732 |
| 211 | | | | | | | | | | 656 | 658 | | 656 | | 706 | X | 666 | 706 | 686 | 737 |
| 212 | | | | | | | | | | | | 623 | 623 | 603 | 711 | X | 671 | 711 | 691 | 741 |
| 213 | | | | | | | | | | | | 628 | 628 | 608 | 716 | X | 676 | 716 | 696 | 746 |
| 214 | | | | | | | | | | | | 633 | 633 | 613 | 683 | 663 | X | X | 661 | 751 |
| 215 | | | | | | | | | | | | 638 | 638 | 618 | 688 | 668 | X | X | 666 | 756 |
| 216 | | | | | | | | | | | | 643 | 643 | | 693 | 673 | X | X | 671 | 721 |
| 217 | | | | | | | | | | | | 648 | 648 | | 698 | 678 | X | X | 676 | 726 |
| 218 | | | | | | | | | | | | 653 | 653 | | 703 | X | 663 | 703 | 683 | 731 |
| 219 | | | | | | | | | | | | 658 | 658 | | 708 | X | 668 | 708 | 688 | 736 |
| 220 | | | | | | | | | | | | | | | 713 | X | 673 | 713 | 693 | 743 |
| 221 | | | | | | | | | | | | | | | 718 | X | 678 | 718 | 698 | 748 |
| 222 | | | | | | | | | | | | | | | | | X | X | 663 | 753 |
| 223 | | | | | | | | | | | | | | | | | X | X | 668 | 758 |
| 224 | | | | | | | | | | | | | | | | | X | X | 673 | 723 |
| 225 | | | | | | | | | | | | | | | | | X | X | 678 | 728 |
| 226 | | | | | | | | | | | | | | | | | | | | 733 |
| 227 | | | | | | | | | | | | | | | | | | | | 738 |
| 228 | | | | | | | | | | | | | | | | | | | | |
| 229 | | | | | | | | | | | | | | | | | | | | |
| 230 | | | | | | | | | | | | | | | | | | | | |
| 231 | | | | | | | | | | | | | | | | | | | | |
| 232 | | | | | | | | | | | | | | | | | | | | |

| Time | ZZ | ZZZ | AAA | BBB | CCC | DDD | SW16 | SW15 | SW14 | SW13 | SW12 | SW11 | SW10 | SW9 | SW8 | SW7 |
|---|---|---|---|---|---|---|---|---|---|---|---|---|---|---|---|---|
| 205 | 767 | 735 | 735 | 725 | 780 | 790 | 1 | 2 | 1 | 2 | 1 | 1 | | | | |
| 206 | 772 | 762 | 752 | 742 | 785 | 795 | 2 | 1 | 1 | 2 | 1 | 1 | | | | |
| 207 | 777 | 767 | 757 | 747 | 780 | 790 | 2 | 1 | 1 | 2 | 1 | 1 | | | | |
| 208 | 722 | 772 | 772 | 762 | 785 | 795 | 1 | 1 | 1 | 2 | 1 | 1 | | | | |
| 209 | 727 | 777 | 777 | 767 | 802 | 812 | 1 | 1 | 2 | 2 | 1 | 1 | | | | |
| 210 | 732 | 722 | 732 | 722 | 807 | 817 | 2 | 2 | 2 | 2 | 1 | 2 | | | | |
| 211 | 737 | 727 | 737 | 727 | 822 | 832 | 2 | 2 | 2 | 2 | | | | | | |
| 212 | 761 | 732 | 732 | 722 | 827 | 837 | 1 | 2 | 2 | 1 | | | | | | |
| 213 | 766 | 737 | 737 | 727 | 782 | 792 | 1 | 2 | 1 | 1 | | | | | | |
| 214 | 771 | 761 | 751 | 741 | 787 | 797 | 2 | 1 | 1 | 1 | | | | | | |
| 215 | 776 | 766 | 756 | 746 | 782 | 792 | 2 | 1 | 1 | 1 | | | | | | |
| 216 | 721 | 771 | 771 | 761 | 787 | 797 | 1 | 1 | 1 | 1 | | | | | | |
| 217 | 726 | 776 | 776 | 766 | 801 | 811 | 1 | 1 | 2 | 1 | | | | | | |
| 218 | 731 | 721 | 731 | 721 | 806 | 816 | 2 | 2 | 2 | 1 | | | | | | |
| 219 | 736 | 729 | 736 | 726 | 821 | 831 | 2 | 2 | 2 | 1 | | | | | | |
| 220 | 763 | 731 | 731 | 721 | 826 | 836 | 1 | 2 | 2 | | | | | | | |
| 221 | 768 | 736 | 736 | 726 | 781 | 791 | 1 | 2 | 1 | | | | | | | |
| 222 | 773 | 763 | 753 | 743 | 786 | 796 | 2 | 1 | 1 | | | | | | | |
| 223 | 778 | 768 | 758 | 748 | 781 | 791 | 2 | 1 | 1 | | | | | | | |
| 224 | 723 | 773 | 773 | 763 | 786 | 796 | 1 | 1 | 1 | | | | | | | |
| 225 | 728 | 778 | 778 | 768 | 803 | 813 | 1 | 1 | | | | | | | | |
| 226 | 733 | 723 | 733 | 723 | 808 | 818 | 2 | | | | | | | | | |
| 227 | 738 | 728 | 738 | 728 | 823 | 833 | 2 | | | | | | | | | |
| 228 | | 733 | 733 | 723 | 828 | 838 | 1 | | | | | | | | | |
| 229 | | 738 | 738 | 728 | 783 | 793 | 1 | | | | | | | | | |
| 230 | | | | | 788 | 798 | 2 | | | | | | | | | |
| 231 | | | | | 783 | 793 | 2 | | | | | | | | | |
| 232 | | | | | 788 | 798 | | | | | | | | | | |

The relationship between the intermediate data points 360–419 and the intermediate data points 420–479 resulting from the multiplication operations is shown in the FIG. 11A hereabove. The PROM's 3 and 4 are programmed with the multiplication constants M1 through M60 and including the auxiliary multiplication constants in the order in which the intermediate data points are accessed from the RAM's.

The resultant data points from the set 420 through 479 begin appearing at the flow points EE and FF in their predesigned ordered pairs at the time T145 (see Table 15A). These ordered pairs continue to be serially provided to the flow points at EE and FF until the time T192. That portion of the 60-point pipeline processor embodiment from the flow points EE and FF until the flow points CCC and DDD constitute the data point information processing of the output section of the 60-point transform. The intermediate data point information provided at the flow points EE and FF serially is sequentially operated on by the various downstream butterfly sections through the clock pulse periods. However, during any one clock pulse period the information processing is conducted in a parallel fashion by all of the computing sections of the 60-point pipeline processor. Information begins to serially exit from the output flow points CCC and DDD of the pipeline starting at the clock pulse at time T185 and continues in ordered pairs during the subsequent clock pulses until the clock pulse at T232. The data point outputs denoted by 780 through 839 are representative of the output frequency harmonic array elements A0 through A59 in accordance with the relationship as shown in Table 10 hereabove.

It is understood that the set of output data points exited between the times T185 and until T232 are either all real or all imaginary as the case may be. In the subsequent clock pulse intervals the other set (real or imaginary) of the corresponding output frequency harmonic array elements are serially output at the points CCC and DDD in a similar order as the first set. The real and imaginary portions of each output frequency harmonic array element may be combined, where this is necessary, for additional information gathering purposes, in some known manner downstream of the pipeline processor points CCC and DDD. Also shown in the Tables 15A, 15B and 15C is the switching pattern of the switches SW7 through SW16. Details of the flow of signal information through the output section processing portion of the pipeline processor is shown comprehensively in the Tables 15A through 15C. Any questionable points in the operation of the 60-point pipeline processor embodiment may be cleared up by referring back to the more detailed description of the 30-pipeline processor provided hereinabove.

The mechanization of the 60-point pipeline processor embodiment may be constructed utilizing the same elemental electronic circuits as that described in connection with the 30-pipeline processor hereabove. It is understood that certain portions of memory may need to be increased two-fold because of the doubling of the number of data points being processed. However, this is a chore which is well known to anyone skilled in the pertinent art. It is further understood that while the multipoint pipeline processor has been described in connection with only a 30-point and 60-point pipeline processor, the principles of the invention may additionally include even higher order data point pipeline processors without deviating therefrom. Therefore, applicants' invention should not be limited to the embodiments as described hereabove, but rather be construed in connection with the breadth and broad scope of the claims heretofollow.

What is claimed is:

1. A pipeline processor for performing a discrete Fourier transformation (DFT) on an input array of N signal values to derive an output array of at most N signal values representative of the frequency transformation of said input array, said processor comprising:

an input processing section including a first plurality of cascadedly coupled computational elements, each operative individually to perform only additions and subtractions substantially in a butterfly-type arrangement, said input processing section including means for operating on said input array of N signal values with said first plurality of computational elements in a pipeline computational fashion and for propagating the resulting interelement computed signal values therethrough in a first predetermined signal flow pattern to render a first intermediate array of signal values;

an intermediate processing section for multiplying each signal value of said first intermediate array with at least one respectively corresponding predetermined transformation value to generate a second intermediate array of signal values;

an output processing section including a second plurality of cascadely coupled computational elements, each operative individually to perform only additions and subtractions substantially in a butterfly-type arrangement, said output processing section including means for operating on said second intermediate array of signal values with said second plurality of computational elements in a pipeline computational fashion and for propagating the resulting interelement computed signal values therethrough in a second predetermined signal flow pattern to render said output array of at most N signal values.

2. A pipeline processor in accordance with claim 1 wherein the processor comprises a radix-2 configuration having top and bottom signal propagation rails.

3. A pipeline processor of radix-2 in accordance with claim 2 wherein the signal values of the input array are sequentially input at the top and bottom rails of the input processing section in accordance with a first predetermined order of coupled pairs; wherein the signal values of the first intermediate array are rendered sequentially from the top and bottom rails of the input processing section in accordance with a second predetermined order of coupled pairs; wherein the signal values of the second intermediate array are generated sequentially by the intermediate processing section and correspondingly, input to the top and bottom rails of the output processing section in accordance with a third predetermined order of coupled pairs; and wherein the signal values of the output array are rendered sequentially from the top and bottom rails of the output processing section in accordance with a fourth predetermined order of coupled pairs.

4. A pipeline processor of radix-2 in accordance with claim 3 wherein the input, first intermediate, second intermediate and output arrays are comprised of all real signal values.

5. A pipeline processor of radix-2 in accordance with claim 3 wherein the input, first intermediate, second intermediate and output arrays are comprised of all imaginary signal values.

6. A pipeline processor of radix-2 in accordance with claim 3 wherein N is 30; wherein the first and second predetermined signal flow propagation patterns of the input and output processing sections, respectively, are based on a 30 point signal flow graph including a predetermined nesting configuration of selected 2-, 3-, and 5-point signal flow graphs, each including an input and an output section.

7. A pipeline processor of radix-2 in accordance with claim 6 wherein the first predetermined signal flow propagation pattern is based on a predetermined nesting configuration comprising a row of 15 similar input sections of the selected 2-point signal flow graph which is cascadedly interconnected with a row of 10 similar input sections of the selected 3-point signal flow graph which is cascadedly interconnected with a row of 6 similar input sections of the selected 5-point signal flow graph; and wherein the second predetermined signal flow propagation pattern is based primarily on a predetermined nesting configuration comprising a row of 6 similar output sections of the selected 5-point signal flow graph which is cascadely interconnected with a row of 10 similar output sections of the selected 3-point signal flow graph.

8. A pipeline processor of radix-2 in accordance with claim 6 wherein the predetermined transformation values of the intermediate processing section are representative of compositely formed multiplication factors of the 30-point signal flow graph in accordance with the predetermined nesting configuration of the selected 2-, 3- and 5-point signal flow graphs.

9. A pipeline processor of radix-2 in accordance with claim 6 wherein the first predetermined order of coupled pairs of the input array denoted as ax where x is the index thereof varying from 0 to 29, are sequentially input at the top and bottom rails of the input processing section in successive time intervals starting with time interval i as follows:

| Time Interval | Input Sequence | |
|---|---|---|
| | Top Rail | Bottom Rail |
| i | a26 | a11 |
| i + 1 | a16 | a1 |
| i + 2 | a6 | a21 |
| i + 3 | X | X |
| i + 4 | a8 | a23 |
| i + 5 | a28 | a13 |
| i + 6 | a18 | a3 |
| i + 7 | X | X |
| i + 8 | a2 | a17 |
| i + 9 | a22 | a7 |
| i + 10 | a12 | a27 |
| i + 11 | X | X |
| i + 12 | a14 | a29 |
| i + 13 | a4 | a19 |
| i + 14 | a24 | a9 |
| i + 15 | X | X |
| i + 16 | a20 | a5 |
| i + 17 | a10 | a25 |
| i + 18 | a0 | a15 | where the symbol X denotes a predetermined fixed value.

10. A pipeline processor of radix-2 in accordance with claim 9 wherein the predetermined fixed value is a zero value; and wherein for the subsequent successive five time intervals i+19 to i+23, data having a fixed zero value are input to the top and bottom rails of the input section.

11. A pipeline processor of radix-2 in accordance with claim 9 wherein the input array of a0-a29 is comprised of all real values.

12. A pipeline processor of radix-2 in accordance with claim 9 wherein the input array of a0-a29 is comprised of all imaginary values.

13. A pipeline processor of radix-2 in accordance with claim 6 wherein the fourth predetermined order of coupled pairs of the output array denoted as Ay where y is the index thereof, varying from 0 to 29, is output from the top and bottom rails of the output processing section in successive time intervals starting with time interval i as follows:

| Time Interval | Output Sequence | |
|---|---|---|
| | Top Rail | Bottom Rail |
| i | A20 | A10 |
| i + 1 | A5 | A25 |
| i + 2 | A0 | A0 |
| i + 3 | A15 | A15 |
| i + 4 | * | * |
| i + 5 | * | * |
| i + 6 | * | * |
| i + 7 | * | * |
| i + 8 | A2 | A22 |
| i + 9 | A17 | A7 |
| i + 10 | A12 | A12 |
| i + 11 | A27 | A27 |
| i + 12 | A8 | A28 |
| i + 13 | A23 | A13 |
| i + 14 | A18 | A18 |
| i + 15 | A3 | A3 |
| i + 16 | A14 | A4 |
| i + 17 | A29 | A19 |
| i + 18 | A24 | A24 |
| i + 19 | A9 | A9 |
| i + 20 | A26 | A16 |
| i + 21 | A11 | A1 |
| i + 22 | A6 | A6 |
| i + 23 | A21 | A21 | where the symbol * denotes data not relevant to the output array.

14. A pipeline processor of radix-2 in accordance with claim 13 wherein the output array of A0-A29 is comprised of all real values.

15. A pipeline processor of radix-2 in accordance with claim 13 wherein the output array of A0-A29 is comprised of all imaginary values.

16. A pipeline processor of radix-2 in accordance with claim 3 wherein N is 60; wherein the first and second predetermined signal flow propagation patterns of the input and output processing sections, respectively, are based on a 60 point signal flow graph including a predetermined nesting configuration of selected 4-, 3-, and 5-point signal flow graphs, each including an input and output section.

17. A pipeline processor of radix-2 in accordance with claim 16 wherein the first predetermined signal flow propagation pattern is based on a predetermined nesting configuration comprising a row of 15 similar input sections of the selected 4-point signal flow graph which is cascadedly interconnected with a row of 20 similar input sections of the selected 3-point signal flow graph which is cascadedly interconnected with a row of 12 similar input sections of the selected 5-point signal flow graph; and wherein the second predetermined signal flow propagation pattern is based on a predetermined nesting configuration comprising a row of 12 similar output sections of the selected 5-point signal flow path which is cascadedly interconnected with a row of 20 similar output sections of the selected 3-point signal flow graph which is cascadedly interconnected with a row of 15 similar output sections of the selected 4-point signal flow graph.

18. A pipeline processor of radix-2 in accordance with claim 16 wherein the predetermined transformation values of the intermediate processing section are representative of the compositely formed multiplication factors of the 60 point signal flow graph in accordance with the predetermined nesting configuration of the selected 4-, 3-, and 5-point signal flow graphs.

19. A pipeline processor of radix-2 in accordance with claim 16 wherein the first predetermined order of coupled pairs of the input array denoted as ax where x is the index thereof, varying from 0 to 59, are sequentially input at the top and bottom rails of the input processing section in successive time intervals starting with time interval i as follows:

| Time Interval | Input Sequence | |
|---|---|---|
| | Top Rail | Bottom Rail |
| i | a56 | a26 |
| i + 1 | a41 | a11 |
| i + 2 | a16 | a46 |
| i + 3 | a1 | a31 |
| i + 4 | a36 | a6 |
| i + 5 | a21 | a51 |
| i + 6 | X | X |
| i + 7 | X | X |
| i + 8 | a8 | a38 |
| i + 9 | a53 | a23 |
| i + 10 | a28 | a58 |
| i + 11 | a13 | a43 |
| i + 12 | a48 | a18 |
| i + 13 | a33 | a3 |
| i + 14 | X | X |
| i + 15 | X | X |
| i + 16 | a32 | a2 |
| i + 17 | a17 | a47 |
| i + 18 | a52 | a22 |
| i + 19 | a37 | a7 |
| i + 20 | a12 | a42 |
| i + 21 | a57 | a27 |
| i + 22 | X | X |
| i + 23 | X | X |
| i + 24 | a44 | a14 |
| i + 25 | a29 | a59 |
| i + 26 | a4 | a34 |
| i + 27 | a49 | a19 |
| i + 28 | a24 | a54 |
| i + 29 | a9 | a39 |
| i + 30 | X | X |
| i + 31 | X | X |
| i + 32 | a20 | a50 |
| i + 33 | a5 | a35 |
| i + 34 | a40 | a10 |
| i + 35 | a25 | a55 |
| i + 36 | a0 | a30 |
| i + 37 | a46 | a15 | where the symbol X denotes a predetermined fixed value.

20. A pipeline processor of radix-2 in accordance with claim 19 wherein the predetermined fixed value is a zero value; and wherein for the subsequent successive 10 time intervals i+38 to i+47, data having a fixed zero value are input to the top and bottom rails of the input section.

21. A pipeline processor of radix-2 in accordance with claim 19 wherein the input array of a0-a59 is comprised of all real values.

22. A pipeline processor of radix-2 in accordance with claim 19 wherein the input array of a0-a59 is comprised of all imaginary values.

23. A pipeline processor of radix-2 in accordance with claim 16 wherein the fourth predetermined order of coupled pairs of the output array denoted as Ay where y is the index thereof, varying from 0 to 59, are output from the top and bottom rail of the output processing section in successive time intervals starting with time interval i as follows:

| Time Interval | Output Sequence | |
|---|---|---|
| | Top Rail | Bottom Rail |
| i | A40 | A10 |
| i + 1 | A55 | A25 |
| i + 2 | A20 | A50 |
| i + 3 | A35 | A5 |
| i + 4 | A0 | A30 |
| i + 5 | A15 | A45 |
| i + 6 | * | * |
| i + 7 | * | * |
| i + 8 | * | * |
| i + 9 | * | * |
| i + 10 | * | * |
| i + 11 | * | * |
| i + 12 | * | * |
| i + 13 | * | * |
| i + 14 | * | * |
| i + 15 | * | * |
| i + 16 | A4 | A34 |
| i + 17 | A19 | A49 |
| i + 18 | A44 | A14 |
| i + 19 | A59 | A29 |
| i + 20 | A24 | A54 |
| i + 21 | A39 | A9 |
| i + 22 | * | * |
| i + 23 | * | * |
| i + 24 | A16 | A46 |
| i + 26 | A31 | A1 |
| i + 27 | A56 | A26 |
| i + 28 | A11 | A41 |
| i + 29 | A36 | A6 |
| i + 30 | A51 | A21 |
| i + 31 | * | * |
| i + 32 | * | * |
| i + 33 | A28 | A58 |
| i + 34 | A43 | A13 |
| i + 35 | A8 | A38 |
| i + 36 | A23 | A53 |
| i + 37 | A48 | A18 |
| i + 38 | A3 | A33 |
| i + 39 | * | * |
| i + 40 | * | * |
| i + 41 | A52 | A22 |
| i + 42 | A7 | A37 |
| i + 43 | A32 | A2 |
| i + 44 | A47 | A17 |
| i + 45 | A12 | A42 |
| i + 46 | A27 | A57 | where the symbol * denotes data insignificant to the output array.

24. A pipeline processor of radix-2 in accordance with claim 23 wherein the output array of A0-A59 is comprised of all real values.

25. A pipeline processor of radix-2 in accordance with claim 23 wherein the output array of A0-A59 is comprised of all imaginary values.

26. A pipeline processor of radix-2 for performing a discrete Fourier transformation (DFT) on an input array of N time related signal values to derive an array of at most N output signals representative of the frequency harmonics associated with said input array, said processor comprising:

an input processing section including a first plurality of cascadedly coupled computational elements which are operative individually to perform only additions and subtractions substantially in a butterfly-type arrangement, said input processing section being operative to sequentially input said N time related signal values in a first predetermined order of coupled pairs and to perform addition and subtraction computations thereon in a pipeline computational fashion propagating said computed signal values therethrough to render a plurality of first intermediate values of said transformation sequentially in a second predetermined order of coupled pairs;

an intermediate processing section operative to multiply each of said first intermediate values with at least one predetermined transformation value respectively associated therewith to compute a plurality of second intermediate values of said transformation sequentially in a third predetermined order of coupled pairs; and an output processing section including a second plurality of cascadedly coupled computational elements which are operative individually to perform only additons and subtractions substantially in a butterfly-type arrangement, said output processing section being operative to sequentially input said plurality of second intermediate values in a fourth predetermined order of coupled pairs and to perform addition and subtraction computations thereon in a pipeline computational fashion propagating said computed information therethrough to render an array of at most N signals representative of said array of output frequency harmonics of said discrete Fourier transformation sequentially in a fifth predetermined order of coupled pairs.

27. A pipeline processor in accordance with claim 26 wherein the third and fourth predetermined order of coupled pairs are equivalent.

28. A pipeline processor in accordance with claim 26 further including for interconnecting the cascadedly coupled computational elements of the input and output processing sections, apparatus comprising: a plurality of buffer registers for buffering the input and the output of the cascadedly coupled computational elements; a switch set for each interconnection coupled in the signal propagation path between the output and input buffer registers of the interconnected computational elements; and at least two delay registers for each interconnection, each having a predetermined time delay, with one delay register being coupled between said output buffer registers and said switch set and another delay register being coupled between said switch set and said input buffer registers for each interconnection.

29. A pipeline processor in accordance with claim 28 wherein the interconnecting switch sets of the input processing sections are governed to effect a first predetermined propagation pattern of the resulting interelement computed signal value through the input processing section, and wherein the interconnecting switch sets of the output processing section are governed to effect a second predetermined propagation pattern of the resulting interelement computed signal values through the output processing section.

30. A pipeline processor in accordance with claim 28 including a top and bottom rail for use in computing and propagating computed signal values therethrough;

wherein each butterfly-type computational element of the input and output processing section is buffered with a register at both of said top and bottom rails of the input and output thereof;

wherein a first delay register is coupled to the bottom rail output buffer register of each computational element and a second delay register is coupled to each bottom rail input buffer register of each computational element, except for the first cascaded computational element in both the input and output processing sections; and wherein each interconnecting switch set of the input and output processing sections comprises two single-pole-double-throw type switches which are operative (a) in a first position, to couple, at the top rail, the input and output buffer registers of the cascaded computational elements and to couple, at the bottom rail, the first and second delay registers; and (b) in a second position, to bridge the signal flow between the top and bottom rails by coupling the output buffer register of the top rail to the second delay register and by coupling the first delay register to the input buffer register of the top rail.

31. A pipeline processor in accordance with claim 30 wherein the interconnecting switch sets of the input and output processing sections are selectively operated between their first and second positions in prespecified time intervals to effect the first and second predetermined signal propagation patterns, for the input and output processing sections, respectively.

32. A pipeline processor in accordance with claim 30 including apparatus disclosed in the input processing at the top rail downstream of a final cascadedly coupled butterfly-type computational element, said apparatus comprising:

a first register having its input coupled to the top rail output buffer register of said final computational element;

a first delay register having its input also coupled to the top rail output buffer register of said final computational element;

a second register cascadedly coupled to said first delay register;

a single-pole-double-throw switch having one position coupled to a fixed potential and its other position coupled to the output of said second register;

an adder having at least two inputs and an output, said one input being coupled to the output of said first register, said another input coupled to the pole of said single-pole double-throw switch and said output being coupled to the top rail output of said input processing section.

33. A pipeline processor in accordance with claim 26 wherein the intermediate processing section comprises:

a memory having addressable registers for temporarily storing the plurality of first intermediate values rendered form the input processing section;

an addressing means coupled to said memory for storing and accessing the plurality of first intermediate values in addressable patterns corresponding to the second and third predetermined sequencing orders respectively; and a multiplication unit for multiplying each of the first intermediate values addressably accessed from said memory with the predetermined transformation value respectively associated therewith in a sequential manner corresponding to the third predetermined order to compute the plurality of second intermediate values.

34. A pipeline processor in accordance with claim 26 including a top and bottom rail for use in computing and propagating computed signal values therethrough; and wherein the intermediate processing section includes:

a first memory having addressable registers for temporarily storing the plurality of first intermediate values rendered from the top rail of the input processing action;

a second memory having addressable registers for temporarily storing the plurality of first intermediate values rendered from the bottom rail of the input processing section;

a first addressing means coupled to said first and second memories for selectively accessing the plurality of first intermediate values from said first and second memories in an addressable pattern corresponding to the predetermined third ordered input sequence for the top rail of the output processing section;

a second addressing means coupled to said first and second memories for selectively accessing the plurality of first intermediate values from said first and second memories in an addressable pattern corresponding to the predetermined third ordered input sequence for the bottom rail of the output processing section;

a first multiplication unit coupled to said first and second memories for sequentially multiplying each of the first intermediate values, accessed by said first addressing means from said first and second memories, by their respectively associated predetermined transformation values to compute the plurality of second intermediate values consistent with the predetermined third order; and a second multiplication unit coupled to said first and second memories for sequentially multiplying each of the first intermediate values, accessed by said second addressing means from said first and second memories, by their respectively associated predetermined transformation values to compute the plurality of second intermediate values consistent with the predetermined third order.

35. A pipeline processor in accordance with claim 34 wherein the pipeline is a digital processor and the signal values propagated therethrough are represented by digitally coded words; and wherein the first and second memories are random access memories for storage of the digitally coded words representative of the first intermediate values rendered from the top and bottom rails, respectively, of the input processing section.

36. A pipeline processor in accordance with claim 35 wherein the first and second addressing means each include:
   a read only memory preprogrammed with a set of digitally coded words representative of the access addressing pattern corresponding to the respective first and second memories coupled thereto; and
   means for addressably sequencing said read only memory through its addressing pattern.

37. A pipeline processor in accordance with claim 35 wherein the first and second multiplication units each include:
   a digital multiplier having one input coupled to the output of the first and second memories and an output coupled to the respective rail of the output processing section;
   a read only memory coupled to another input of said respective digital multiplier and preprogrammed with a set of digitally coded words representative of the predetermined transformation values corresponding to the first intermediate values accessibly sequenced from the first and second memory; and
   means for sequencing said read only memory in an addressable pattern to render concomitantly at the one and another inputs of said respective digital multiplier each accessibly sequenced first intermediate value and the predetermined transformation value associated therewith, respectively.

38. A pipeline processor in accordance with claim 26 including a top and bottom rail for use in computing and propagating computed signal values therethrough; and wherein the first computational element of the output processing section comprises:

a first adder, having at least two inputs and an output, said one input being coupled to the top input rail of the output processing section;

a first single-pole-double-throw switch having its pole connection coupled to the another input of said first adder, its one switch position coupled to a fixed reference potential and its other switch position coupled to the bottom input rail of the output processing section;

a first delay register having its input coupled to the output of said first adder;

a second delay register cascadedly coupled with the output of said first delay register;

a third delay register having its input coupled to the bottom input rail of the output processing section;

a fourth delay register cascadedly coupled to the output of said third delay register;

a single-pole-four-throw switch having its first position coupled to the output of said second delay register, its second position coupled to the interconnection of said third and fourth delay registers, its third position coupled to the output of said fourth delay register and its fourth position coupled to the interconnection of said first and second registers;

an inverter having its input connected to the bottom input rail of the output processing section;

a second single-pole-double-throw switch having one and the other positions thereof coupled to the bottom and top input rails of the output processing section, respectively;

a second adder having at least two inputs and an output, said one input being coupled to the output of said second delay register and said another input being coupled to the pole of said second single-pole-double-throw switch, said output being the top rail output of said first computational element;

a third adder having at least two inputs and an output, said one input being coupled to the output of said inverter and said another input being coupled to the pole of said single-pole-four-throw switch; and a third single-pole-double-throw switch having its one position coupled to the output of said third adder and its other position coupled to the bottom input rail of the output processing section, said pole being the bottom rail output of said first computational element.

39. A pipeline processor in accordance with claim 38 wherein said switches of said first computational element of the output processing section being governed in their operation in accordance with a predetermined propagation pattern for the signal values computed therein.

40. A method of performing a discrete Fourier transformation (DFT) on an input array of N signal values, each signal value thereof including a first and second portion, to derive first and second output arrays, compositely representative of the frequency transformation components of said input array, said method comprising the steps of:
   processing said input array of first portions of the N signal values and said input array of second portions of the N signal values, individually, in an input section of a pipeline processor by performing only additions and subtractions thereon with a first set of cascadedly coupled computational elements in accordance with a first predetermined signal propagation pattern to render first and second intermediate arrays of signal values, respectively;

forming first and second composite arrays of signal values by selecting signal values from both said rendered first and second intermediate arrays in an intermediate processing section of said pipeline processor;

multiplying the signal values of said first and second composite arrays with predetermined transformation values respectively associated therewith to generate third and fourth intermediate arrays of signal values, respectively, in said intermediate processing section; and processing said generated third array of signal values and said generated fourth array of signal values, individually, in an output section of said pipeline processor by performing only additions and subtractions thereon with a second set of cascadedly coupled computational elements in accordance with a second predetermined signal propogation pattern to render said first and second output arrays of signal values, respectively.

41. The method in accordance with claim 40 wherein the step of forming further includes:

storing the rendered first and second intermediate arrays in first and second sets of addressable memory registers in the intermediate processing section, respectively;

accessing a first composite array of signal values from a first selected plurality of addressable memory registers of the first and second sets; and accessing a second composite array of signal values from a second selected plurality of addressable memory registers of the first and second sets.

42. The method in accordance with claim 41 wherein the step of multiplying further includes the steps of:

multiplying the accessed first composite array, individually in the intermediate processing section, with a first fixed array of predetermined transformation values, which respectively correspond to the signal values of the first composite array, to generate separately the third intermediate array; and multiplying the accessed second composite array, individually in the intermediate processing section, with a second fixed array of predetermined transformation values, which respectively correspond to the signal values of the second composite array, to generate separately the fourth intermediate array.

43. The method in accordance with claim 42 wherein the steps of accessing and multiplying the signal values of each of the first and second composite arrays are respectively performed sequentially in a predetermined order.

44. The method in accordance with claim 42 wherein the respectively corresponding predetermined transformation values of the first and second fixed arrays are equivalent.

45. The method in accordance with claim 40 wherein the first and second portions of the N signal values of the input array are real and imaginary portions, respectively; wherein the rendered first and second intermediate arrays are comprised solely of real and imaginary signal values, respectively; wherein the generated third and fourth intermediate arrays are comprised solely of real and imaginary signal values, respectively; and wherein the rendered first and second output arrays are representative of the real and imaginary frequency components of the transformation, respectively.

46. The method in accordance with claim 40 further including the steps of:

sequentially inputting the first portions of the N signal values of the input array to the input processing section of the pipeline processor with a first predetermined order;

sequentially inputting the second portions of the N signal values of the input array to the input processing section of the pipeline processor with said first predetermined order;

rendering the first and second intermediate arrays separately from the input processing section, the signal values of each array rendered sequentially in accordance with a second predetermined order;

generating the third and fourth arrays separately from the intermediate processing section, each signal value of the third and fourth arrays generated sequentially in accordance with a third predetermined order;

inputting the third and fourth arrays into the output processing section, separately, the signal values of each of the third and fourth arrays being input sequentially in accordance with a fourth predetermined order; and rendering the first and second output arrays from the output processing section, separately, the signal values of each of the first and second output arrays being rendered sequentially in accordance with a fifth order.

47. The method in accordance with claim 46 wherein the third and fourth predetermined orders are equivalent.

48. The method in accordance with claim 46 wherein the signal values of the pipeline processor are sequentially input to and rendered from the input processing section, sequentially generated from the intermediate processing section and sequentially input to and rendered from the output processing section in coupled pairs over top and bottom rails of the pipeline processor for each case in accordance with their respectively corresponding predetermined orders.

* * * * *